US008853931B2

(12) United States Patent
Hafidi et al.

(10) Patent No.: US 8,853,931 B2
(45) Date of Patent: Oct. 7, 2014

(54) ELECTRODELESS PLASMA LAMP WITH MODIFIED POWER COUPLING

(75) Inventors: Abdeslam Hafidi, Cupertino, CA (US);
Dan O'Hare, Livermore, CA (US);
Marc DeVincentis, Palo Alto, CA (US)

(73) Assignee: Luxim Corporation, Sunnyvale, CA (US)

( * ) Notice: Subject to any disclaimer, the term of this patent is extended or adjusted under 35 U.S.C. 154(b) by 177 days.

(21) Appl. No.: 12/972,143

(22) Filed: Dec. 17, 2010

(65) Prior Publication Data
US 2011/0148316 A1 Jun. 23, 2011

Related U.S. Application Data

(60) Provisional application No. 61/288,233, filed on Dec. 18, 2009, provisional application No. 61/405,540, filed on Oct. 21, 2010.

(51) Int. Cl.
*H01J 1/50* (2006.01)
*H01J 1/00* (2006.01)

(52) U.S. Cl.
USPC .................. 313/153; 313/160; 313/164

(58) Field of Classification Search
None
See application file for complete search history.

(56) References Cited

U.S. PATENT DOCUMENTS

| | | |
|---|---|---|
| 3,787,705 A | 1/1974 | Bolin et al. |
| 3,826,950 A | 7/1974 | Hruda et al. |
| 4,001,631 A | 1/1977 | McNeill et al. |
| 4,206,387 A | 6/1980 | Kramer et al. |
| 4,485,332 A | 11/1984 | Ury et al. |
| 4,498,029 A | 2/1985 | Yoshizawa et al. |
| 4,633,140 A | 12/1986 | Lynch et al. |
| 4,749,915 A | 6/1988 | Lynch et al. |
| 4,795,658 A | 1/1989 | Kano et al. |
| 4,864,194 A | 9/1989 | Kobayashi et al. |

(Continued)

FOREIGN PATENT DOCUMENTS

| | | |
|---|---|---|
| CN | 102714908 A | 10/2012 |
| JP | 8148127 | 6/1996 |

(Continued)

OTHER PUBLICATIONS

"Chapter 4—Cavity Resonators, Army Technical Manual, TM 11-673—Generation and Transmission of Microwave Energy", (Jun. 1953), 12 pgs.

(Continued)

*Primary Examiner* — Natalie Walford
(74) *Attorney, Agent, or Firm* — Schwegman, Lundberg & Woessner, P.A.

(57) ABSTRACT

An electrodeless plasma lamp having a lamp body and a power source configured to provide radio-frequency (RF) power via a feed to the lamp body is provided. The lamp includes a first conductive element and a second conductive element. The first conductive element has a first side with a first protrusion. The second conductive element has a second side with a second protrusion. The first side and second side face each other and spaced apart by a first distance and configured to couple the RF power via an electric field to a fill to form at least one plasma arc. The first protrusion and the second protrusion extend towards each other and are spaced apart by a second distance that is less than the first distance. The first and second protrusions may provide localized enhancement of the electric field at the first side and the second side.

40 Claims, 37 Drawing Sheets

(56) References Cited

U.S. PATENT DOCUMENTS

| | | | |
|---|---|---|---|
| 4,887,192 A | 12/1989 | Simpson et al. | |
| 4,950,059 A | 8/1990 | Roberts | |
| 4,975,625 A | 12/1990 | Lynch et al. | |
| 4,978,891 A | 12/1990 | Ury | |
| 5,039,903 A | 8/1991 | Farrall | |
| 5,070,277 A | 12/1991 | Lapatovich | |
| 5,072,157 A | 12/1991 | Greb et al. | |
| 5,086,258 A | 2/1992 | Mucklejohn et al. | |
| 5,361,274 A | 11/1994 | Simpson et al. | |
| 5,438,242 A | 8/1995 | Simpson | |
| 5,448,135 A | 9/1995 | Simpson | |
| 5,498,937 A | 3/1996 | Korber et al. | |
| 5,525,865 A | 6/1996 | Simpson | |
| 5,545,953 A | 8/1996 | Lapatovich et al. | |
| 5,594,303 A | 1/1997 | Simpson et al. | |
| 5,786,667 A | 7/1998 | Simpson et al. | |
| 5,910,710 A | 6/1999 | Simpson | |
| 5,910,754 A | 6/1999 | Simpson et al. | |
| 5,923,116 A | 7/1999 | Mercer et al. | |
| 6,020,800 A | 2/2000 | Arakawa et al. | |
| 6,031,333 A | 2/2000 | Simpson | |
| 6,049,170 A | 4/2000 | Hochi et al. | |
| 6,137,237 A | 10/2000 | MacLennan et al. | |
| 6,246,160 B1 | 6/2001 | MacLennan et al. | |
| 6,252,346 B1 | 6/2001 | Turner et al. | |
| 6,265,813 B1 | 7/2001 | Knox et al. | |
| 6,313,587 B1 | 11/2001 | MacLennan et al. | |
| 6,424,099 B1 | 7/2002 | Kirkpatrick et al. | |
| 6,566,817 B2 | 5/2003 | Lapatovich | |
| 6,617,806 B2 | 9/2003 | Kirkpatrick et al. | |
| 6,666,739 B2 | 12/2003 | Pothoven et al. | |
| 6,737,809 B2 | 5/2004 | Espiau et al. | |
| 6,856,092 B2 | 2/2005 | Pothoven et al. | |
| 6,922,021 B2 | 7/2005 | Espiau et al. | |
| 7,034,464 B1 | 4/2006 | Izadian et al. | |
| 7,291,985 B2 | 11/2007 | Espiau et al. | |
| 7,348,732 B2 | 3/2008 | Espiau et al. | |
| 7,358,678 B2 | 4/2008 | Espiau et al. | |
| 7,362,054 B2 | 4/2008 | Espiau et al. | |
| 7,362,055 B2 | 4/2008 | Espiau et al. | |
| 7,362,056 B2 | 4/2008 | Espiau et al. | |
| 7,372,209 B2 | 5/2008 | Espiau et al. | |
| 7,391,158 B2 | 6/2008 | Espiau et al. | |
| 7,429,818 B2 | 9/2008 | Chang et al. | |
| 7,719,195 B2* | 5/2010 | DeVincentis et al. | 315/39 |
| 7,830,092 B2 | 11/2010 | Espiau et al. | |
| 8,188,662 B2 | 5/2012 | Hafidi et al. | |
| 8,294,382 B2* | 10/2012 | DeVincentis et al. | 315/248 |
| 8,436,546 B2* | 5/2013 | DeVincentis et al. | 315/248 |
| 8,487,543 B2* | 7/2013 | DeVincentis et al. | 315/248 |
| 2001/0035720 A1 | 11/2001 | Guthrie et al. | |
| 2002/0011802 A1* | 1/2002 | Espiau et al. | 315/246 |
| 2002/0079845 A1 | 6/2002 | Kirkpatrick et al. | |
| 2002/0079854 A1 | 6/2002 | Kitamura et al. | |
| 2005/0212456 A1 | 9/2005 | Espiau et al. | |
| 2005/0286263 A1 | 12/2005 | Champion et al. | |
| 2006/0250090 A9 | 11/2006 | Guthrie et al. | |
| 2007/0109069 A1 | 5/2007 | Espiau et al. | |
| 2007/0211990 A1 | 9/2007 | Espiau et al. | |
| 2007/0222352 A1* | 9/2007 | DeVincentis et al. | 313/231.71 |
| 2007/0241688 A1* | 10/2007 | DeVincentis et al. | 315/111.21 |
| 2008/0211971 A1 | 9/2008 | Pradhan | |
| 2008/0258627 A1* | 10/2008 | DeVincentis et al. | 315/39 |
| 2009/0284166 A1 | 11/2009 | DeVincentis et al. | |
| 2010/0156310 A1* | 6/2010 | Hollingsworth et al. | 315/248 |
| 2010/0171436 A1* | 7/2010 | DeVincentis et al. | 315/248 |
| 2011/0148293 A1 | 6/2011 | Hafidi et al. | |

FOREIGN PATENT DOCUMENTS

| | | | |
|---|---|---|---|
| JP | 2001266803 A | 9/2001 | |
| JP | 2003249197 A | 9/2003 | |
| KR | 1020050018587 A | 2/2005 | |
| WO | WO-2006070190 A1 | 7/2006 | |
| WO | WO-2006129102 A2 | 12/2006 | |
| WO | WO-2007138276 A2 | 12/2007 | |
| WO | WO-2011075679 A1 | 6/2011 | |

OTHER PUBLICATIONS

"Chapter 6.3—Rectangular Waveguide Cavities", in: Microwave Engineering, Pozar, D. M., Editor (John Wiley & Sons, Inc.), (Jul. 1997), pp. 313-318.

Espiau, F. M., et al., "Plasma Lamp", U.S. Appl. No. 60/022,028, filed Jul. 31, 2000, 28 pgs.

Guthrie, C., et al., "A Corregated Wave-Guide Used for the Excitation of an Electrode-Less Metal Halide Plasma Lamp Incorporating a Solid Dielectric Material", U.S. Appl. No. 60/224,060, filed Aug. 9, 2000, 9 pgs.

Guthrie, C., et al., "A Method for Connecting the Antenna on a Printed Wiring Board to a Wave-Guide in a Light Source in Which an Electrode-Less Lamp Is Built Into the Wave-Guide Structure", U.S. Appl. No. 60/224,061, filed Aug. 9, 2000, 9 pgs.

Guthrie, C., "D.R.I. Drawings—Wave Guide Lamp Concept 8 (WGC008); Wave Guide Lamp Concept 9 (WGC009); and Wave Guide Lamp Concept 10 (WGC010)", Guthrie Exhibit 2173, Board of Patent Appeals and Interferences (Interference No. 105,393), (Jun. 28, 2000), 3 pgs.

Guthrie, Charles, et al., "Electrodeless Incandescent Bulb", U.S. Appl. No. 60/639,857, filed Dec. 27, 2004, 16 pgs.

Guthrie, Charles, "Lamp", U.S. Appl. No. 60/687,458, filed Jun. 6, 2005, 12 pgs.

Guthrie, Charles, et al., "Lamp", U.S. Appl. No. 60/687,280, filed Jun. 3, 2005, 17 pgs.

Inventors Not Listed, "Lamp", International Application Serial No. PCT_GB2007_001935, International filing date May 24, 2007, GB Application Serial No. 0610580.3, filed May 30, 2006.

Izadian, J. S., et al., "Generating Light From Electromagnetic Energy", U.S. Appl. No. 60/337,057, filed Nov. 6, 2001, 120 pgs.

Pozar, D. M., "Section 5.8, Tapered Lines", In: Microwave Engineering, 3rd Edition, 2005 (John Wiley & Sons, Inc.), (2005), 9 pgs.

Pozar, D. M., "Section 6.4, Circular Waveguide Cavities", in: Microwave Engineering, 3rd Edition, 2005 (John Wiley & Sons, Inc.), (2005), 8 pgs.

Prior, G., et al., "Quartz Bulb Enclosed in a Wave-Guide", U.S. Appl. No. 60/234,415, filed Sep. 21, 2000, 5 pgs.

Prior, G., et al., "Wave-Guide Used for the Excitation of an Electrode-Less Metal Halide Plasma Lamp Incorporating a Solid Dielectric Material", U.S. Appl. No. 60/224,059, filed Aug. 9, 2000, 7 pgs.

Prior, G., et al., "Wave-Guide Used for the Excitation of an Electrode-Less Metal Halide Plasma Lamp Incorporating a Solid Dielectric Material", U.S. Appl. No. 60/224,298, filed Aug. 10, 2000, 5 pgs.

Sandberg, E., et al., "A Mechanical Means of Sealing the Window to an Electrode-Less Metal Halide Bulb That Is Integrated Into a Waveguide", U.S. Appl. No. 60/262,536, filed Jan. 17, 2001, 6 pgs.

Sandberg, E., "An Improved Drive Circuit for an Electrode-Less Plasma Lamp That Is Embedded in a Waveguide", U.S. Appl. No. 60/241,198, filed Oct. 17, 2000, 7 pgs.

Sandberg, E., "Light Source for Use in Microdisplay Based Light Engines", U.S. Appl. No. 60/192,731, filed Mar. 27, 2000, 31 pgs.

Smoler, D., "E-Mail to C. Guthrie re: Ridged Waveguide Ideas", (Jun. 27, 2000), 2 pgs.

Wharmby, D. O., "Chapter 11—Electrodeless Lamps", In: Lamps & Lighting, 4th Edition, 1997 (Arnold & John Wiley & Sons, Inc., (1997), 13 pgs.

Wharmby, D. O., "Electrodeless Lamps for Lighting: A Review", IEEE Proceedings-A, vol. 140 (6), (Nov. 1993), 9 pgs.

Wilson, D,, et al., "Use of a Coating to Prevent the Reduction of Ceramic to Elemental Metal in the Bulb of a Wave-Guide Lamp", U.S. Appl. No. 60/224,866, filed Aug. 11, 2000, 3 pgs.

Wilson, D., et al., "Electrode-Less Metal Halide Plasma Lamp With Integrated Electronics", U.S. Appl. No. 60/224,290, filed Aug. 10, 2000, 9 pgs.

Wilson, D., et al., "High Temperature, Low Cost Window Sealing Technique for Plasma Lamps", U.S. Appl. No. 60/224,291, filed Aug. 10, 2000, 5 pgs.

(56) References Cited

OTHER PUBLICATIONS

Wilson, D., et al., "Light Source Consisting of an Electrode-Less Metal Halide Plasma Bulb That Is Integrated Into a Wave-Guide", U.S. Appl. No. 60/224,289, filed Aug. 10, 2000, 6 pgs.

Wilson, D., et al., "Means to Reduce Emi in a Wave-Guide", U.S. Appl. No. 60/224,503, filed Aug. 10, 2000, 20 pgs.

Wilson, D., et al., "R.F. Wave-Guide Into Which an Insert of a Hermetric Material That Has Been Either Molded or Plasma Deposited", U.S. Appl. No. 60/224,257, filed Aug. 10, 2000, 5 pgs.

Wilson, D., et al., "Use of a Heat Sink in a Plasma Light Source (Located Between a Wave Guide That Incorporates the Bulb and the Drive Electronics", U.S. Appl. No. 60/224,961, filed Aug. 11, 2000, 6 pgs.

Wilson, D., et al., "Use of a Heat Sink in a Plasma Light Source (Located Externally and Surrounding the Lamp Assembly)", U.S. Appl. No. 60/224,617, filed Aug. 11, 2000, 20 pgs.

"U.S. Appl. No. 12/972,041, Non Final Office Action mailed Dec. 23, 2011", 8 pgs.

"U.S. Appl. No. 12/972,041, Notice of Allowance mailed Mar. 26, 2012", 10 pgs.

"U.S. Appl. No. 12/972,041, Response filed Feb. 20, 2012 to Non Final Office Action mailed Dec. 23, 2011", 10 pgs.

"U.S. Appl. No. PCT/US10/61110, International Preliminary Report on Patentability mailed Feb. 10, 2012", 17 pgs.

"International Application Serial No. PCT/US2010/0611010, Search Report mailed Feb. 16, 2011", 3 pgs.

"International Application Serial No. PCT/US2010/061110, Written Opinion mailed Feb. 16, 2011", 6 pgs.

McLeod, H. A., "Chapter 5: Multilayer High-Reflectance Coatings", Thin-Film Optical Filters, 3rd Edition, Institute of Physics Publishing, (2001), 158-187.

McLeod, H. A, "Chapter 7: Band-Pass Filters", Thin-Film Optical Filters, 3rd Edition, Institute of Physics Publishing, (2001), 234-313.

"U.S. Appl. No. 12/972,041, Response to Rule 312 Communication mailed May 7, 2012", 2 pgs.

"Chinese Application Serial No. 201080052327.3, Amendment filed Mar. 20, 2013", w/English Claims, 47 pgs.

"Chinese Application Serial No. 201080052327.3, Office Action mailed Jan. 6, 2014", w/English Translation, 11 pgs.

"Russian Application Serial No. 2012112356, Office Action mailed Jan. 16, 2014", w/English Translation 2 pgs.

"Chinese Application Serial No. 201080052327.3, Response filed Apr. 17, 2014 to Office Action mailed Jan. 6, 2014", 8 pgs.

"Russian Application Serial No. 2012112356, Office Action mailed Apr. 22, 2014", 2 pgs.

"Russian Application Serial No. 2012112356, Response filed Mar. 11, 2014 to Office Action mailed Jan. 16, 2014", 1 pg.

\* cited by examiner

ELECTRODELESS PLASMA LAMP WITH MODIFIED POWER COUPLING

RELATED APPLICATIONS

The present application claims the benefit under 35 U.S.C. 119(e) of U.S. Provisional Patent Application Ser. No. 61/288,233, filed Dec. 18, 2009, and U.S. Provisional Patent Application Ser. No. 61/405,540, filed Oct. 21, 2010, which applications are incorporated herein by reference.

FIELD

The field relates to systems and methods for generating light and, more particularly, to electrodeless plasma lamps.

BACKGROUND

Electrodeless plasma lamps may be used to provide bright, white light sources. Because electrodes are not used, they may have longer useful lifetimes than other lamps. In many applications, it is desirable to have a lamp capable of high light collection efficiency. Collection efficiency can be expressed as the percentage of light that can be collected from a source into a given Etendue compared to the total light emitted by that source. High collection efficiency means that most of the power consumed by the lamp is going toward delivering light where it needs to be. In microwave energized electrodeless plasma lamps, the need for high collection efficiency is elevated due to the losses incurred by converting DC power to RF power. In many applications, it is also desirable to have a lamp with high luminous efficiency. Luminous efficiency can be expressed as lumens output per watt of input power to the lamp.

SUMMARY

Example methods, electrodeless plasma lamps, and systems are described. In one example embodiment, an electrodeless plasma lamp comprises a source of radio frequency (RF) power, a bulb containing a fill that forms a plasma when the RF power is coupled to the fill, and a dipole antenna proximate the bulb. The dipole antenna may comprise a first dipole arm and a second dipole arm spaced apart from the first dipole arm. The source of RF power may be configured to couple the RF power to the dipole antenna such that an electric field is formed between the first dipole arm and the second dipole arm. The dipole antenna may be configured such that a portion of the electric field extends into the bulb and the RF power is coupled from the dipole antenna to the plasma.

In one example embodiment, a method of generating light is described. The method may comprise providing a bulb containing a fill that forms a plasma when the RF power is coupled to the fill and providing a dipole antenna proximate the bulb, the dipole antenna comprising a first dipole arm and a second dipole arm spaced apart from the first dipole arm. The RF power may be coupled to the dipole antenna such that an electric field is formed between the first dipole arm and the second dipole arm, and RF power is coupled from the dipole antenna to the plasma.

Some example embodiments provide systems and methods for increasing the amount of collectable light into a given Etendue from an electrodeless plasma lamp, such as a plasma lamp using a solid dielectric lamp body. A maximum (or substantially maximum) electric field may be deliberately transferred off center to a side (or proximate a side) of a dielectric structure that serves as the body of the lamp. A bulb of the electrodeless lamp may be maintained at the side (or proximate the side) of the body, coinciding with the offset electric field maximum. In an example embodiment, a portion of the bulb is inside the body, and the rest of the bulb protrudes out the side in such a way that an entire (or substantially entire) plasma arc is visible to an outside half-space.

In some example embodiments, the electric field is substantially parallel to the length of a bulb and/or the length of a plasma arc formed in the bulb. In some example embodiments, 40% to 100% (or any range subsumed therein) of the bulb length and/or arc length is visible from outside the lamp and is in line of sight of collection optics. In some example embodiments, the collected lumens from the collection optics are 20% to 50% (or any range subsumed therein) or more of the total lumens output by the bulb.

In some examples, the orientation of the bulb allows a thicker bulb wall to be used while allowing light to be efficiently transmitted out of the bulb. In one example, the thickness of the side wall of the lamp is in the range of about 2 mm to 10 mm or any range subsumed therein. In some examples, the thicker walls allow a higher power to be used without damaging the bulb walls. In one example, a power of greater than 150 watts may be used to drive the lamp body. In one example, a fill of a noble gas, metal halide, and Mercury is used at a power of 150 watts or more with a bulb wall thickness of about 3 mm to 5 mm.

In some examples, a reflector or reflective surface is provided on one side of an elongated bulb. In some examples, the reflector may be a specular reflector. In some embodiments, the reflector may be provided by a thin film, multi-layer dielectric coating. In some examples, the other side of the bulb is exposed to the outside of the lamp. In some embodiments, substantial light is transmitted through the exposed side without internal reflection and substantial light is reflected from the other side and out of the exposed side with only one internal reflection. In example embodiments, light with a minimal number (e.g., one or no internal reflections) comprises the majority of the light output from the bulb. In some embodiments, the total light output from the bulb is in the range of about 5,000 to 20,000 lumens or any range subsumed therein.

In some examples, power is provided to the lamp at or near a resonant frequency for the lamp. In some examples, the resonant frequency is determined primarily by the resonant structure formed by electrically conductive surfaces in the lamp body rather than being determined primarily by the shape, dimensions, and relative permittivity of the dielectric lamp body. In some examples, the resonant frequency is determined primarily by the structure formed by electrically conductive field concentrating and shaping elements in the lamp body. In some examples, the field concentrating and shaping elements substantially change the resonant waveform in the lamp body from the waveform that would resonate in the body in the absence of the field concentrating and shaping elements. In some embodiments, an electric field maxima would be positioned along a central axis of the lamp body in the absence of the electrically conductive elements. In some examples, the electrically conductive elements move the electric field maxima from a central region of the lamp body to a position adjacent to a surface (e.g., a front or upper surface) of the lamp body. In some examples, the position of the electric field maxima is moved by 20% to 50% of the diameter or width of the lamp body or any range subsumed therein. In some examples, the position of the electric field maxima is moved by 3 mm to 50 mm (or any range subsumed therein) or more relative to the position of the electric field maxima in the absence of the conductive elements. In some examples, the orientation of the primary electric field at the bulb is substantially different than the orientation in the absence of the electrically conductive elements. In one example, a fundamental resonant frequency in a dielectric body without the electrically conductive elements would be oriented substantially orthogonal to the length of the bulb. In the example embodiments described herein, a fundamental resonant frequency for the resonant structure formed by the electrically conductive elements in the lamp body results in an electric field at the bulb that is substantially parallel to the length of the bulb.

In some examples, the length of the bulb is substantially parallel to a front surface of the lamp body. In some embodiments, the bulb may be positioned within a cavity formed in the lamp body or may protrude outside of the lamp body. In some examples, the bulb is positioned in a recess formed in the front surface of the lamp body. In some examples, a portion of the bulb is below the plane defined by the front surface of the lamp body and a portion protrudes outside the lamp body. In some examples, the portion below the front surface is a cross section along the length of the bulb. In some examples, the portion of the front surface adjacent to the bulb defines a cross section through the bulb along the length of the bulb. In some examples, the cross-section substantially bisects the bulb along its length. In other examples, 30% to 70% (or any range subsumed therein) of the interior of the bulb may be below this cross section and 30% to 70% (or any range subsumed therein) of the interior of the bulb may be above this cross section.

In example embodiments, the volume of lamp body may be less than that achieved with the same dielectric lamp bodies without conductive elements in the lamp body, where the resonant frequency is determined primarily by the shape, dimensions, and relative permittivity of the dielectric body. In some examples, a resonant frequency for a lamp with the electrically conductive resonant structure according to an example embodiment is lower than a fundamental resonant frequency for a dielectric lamp body of the same shape, dimensions, and relative permittivity. In example embodiments, it is believed that a lamp body using electrically conductive elements according to example embodiments with a dielectric material having a relative permittivity of 10 or less may have a volume less than about 3 $cm^3$ for operating frequencies less than about 2.3 GHz, less than about 4 $cm^3$ for operating frequencies less than about 2 GHz, less than about 8 $cm^3$ for operating frequencies less than about 1.5 GHz, less than about 11 $cm^3$ for operating frequencies less than about 1 GHz, less than about 20 $cm^3$ for operating frequencies less than about 900 MHz, less than about 30 $cm^3$ for operating frequencies less than about 750 MHz, less than about 50 $cm^3$ for operating frequencies less than about 650 MHz, and less than about 100 $cm^3$ for operating frequencies less than about 650 MHz. In one example embodiment, a volume of about 13.824 $cm^3$ was used at an operating frequency of about 880 MHz. It is believed that similar sizes may be used even at frequencies below 500 MHz.

In some examples, the volume of the bulb may be less than the volume of the lamp body. In some examples, the volume of the lamp body may be 3 to 100 times (or any range subsumed therein) of the volume of the bulb.

In example embodiments, the field concentrating and shaping elements are spaced apart from the RF feed(s) that provide RF power to the lamp body. In example embodiments, the RF feed is a linear drive probe and is substantially parallel to the direction of the electric field at the bulb. In some examples, the shortest distance from the end of the RF feed to an end of the bulb traverses at least one metal surface in the body that is part of the field concentrating and shaping elements. In some examples, a second RF feed is used to obtain feedback from the lamp body. In some examples, the shortest distance from the end of the drive probe to an end of the feedback probe does not traverse an electrically conductive material in the lamp body. In some examples, the shortest distance from the end of the feedback probe to an end of the bulb traverses at least one metal surface in the body that is part of the field concentrating and shaping elements. In some examples, the RF feed for providing power to the lamp body is coupled to the lamp body through a first side surface and the RF feed for obtaining feedback from the lamp body is coupled to the lamp body through an opposing side surface. In example embodiments, the bulb is positioned adjacent to a different surface of the lamp body than the drive probe and feedback probe.

In some example embodiments, the field concentrating and shaping elements are formed by at least two conductive internal surfaces spaced apart from one another in the lamp body. In some examples, these electrically conductive surfaces form a dipole. In example embodiments, the closest distance between the first internal surface and the second internal surface is in the range of about 1 mm to 15 mm or any range subsumed therein. In one example, portions of these internal surfaces are spaced apart by about 3 mm. In one example, the internal surfaces are spaced apart from an outer front surface of the lamp body. The front surface of the lamp body may be coated with an electrically conductive material. In some example embodiments, the inner surfaces are spaced from the outer front surface by a distance of less than about 1 mm to 10 mm or any range subsumed therein. In one example, the inner surfaces are spaced from the outer front surface by a distance less than an outer diameter or width of the bulb. In some examples this distance is less than 2 mm to 5 mm or any range subsumed therein.

In some examples, the bulb is positioned adjacent to an uncoated surface (e.g., a portion without a conductive coating) of the lamp body. In example embodiments, power is coupled from the lamp body to the bulb through an uncoated dielectric surface adjacent to the bulb. In example embodiments, the surface area through which power is coupled to the bulb is relatively small. In some embodiments, the surface area is in the range of about 5% to 100% of the outer surface area of the bulb or any range subsumed therein. In some examples, the surface area is less than 60% of the outer surface area of the bulb. In some example embodiments, the surface area is less than 200 $mm^2$. In other examples, the surface area is less than 100 $mm^2$, 75 $mm^2$, 50 $mm^2$ or 35 $mm^2$. In some embodiments, the surface area is disposed asymmetrically adjacent to one side of the bulb. In some embodiments, power is concentrated in the middle of the bulb, and a small plasma arc length is formed that does not impinge on the ends of the bulb. In some examples, the plasma arc length is less than about 20% to 95% of the interior length of the bulb or any range subsumed therein. In some examples, the plasma arc length is within the range of 2 mm to 5 mm or any range subsumed therein.

It is understood that each of the above aspects of example embodiments may be used alone or in combination with other aspects described above or in the detailed description below. A more complete understanding of example embodiments and other aspects and advantages thereof will be gained from a consideration of the following description read in conjunction with the accompanying drawing figures provided herein. In the figures and description, numerals indicate the various features of example embodiments, like numerals referring to like features throughout both the drawings and description.

BRIEF DESCRIPTION OF THE DRAWINGS

FIG. 16AA shows the front vertical (or upper) face of the lamp body as viewed from position "A" in the perspective exploded of FIG. 16A;

FIG. 18AA is a front elevational view of a portion of a dipole metal pattern;

FIG. 19CC is an illustration of single and double plasma arc distributions within a vertical-up orientation of a bulb;

DETAILED DESCRIPTION

Figure 1:
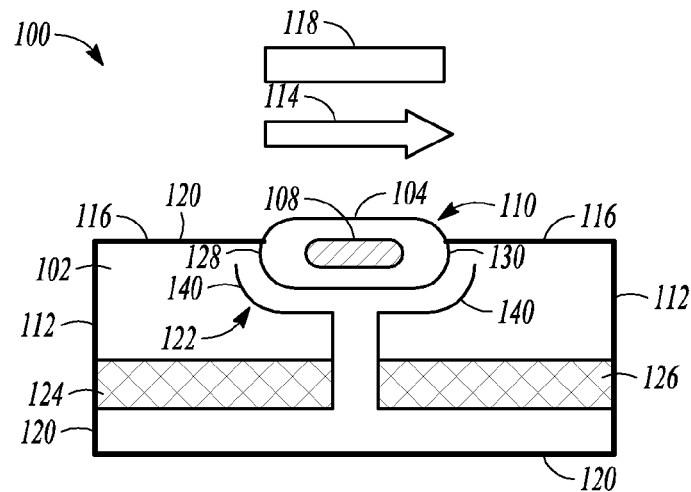
FIG. 1 shows a cross-section and schematic views of a plasma lamp, according to an example embodiment, in which a bulb of the lamp is orientated to enhance an amount of collectable light.

While the present invention is open to various modifications and alternative constructions, the example embodiments shown in the drawings will be described herein in detail. It is to be understood, however, there is no intention to limit the invention to the particular example forms disclosed. On the contrary, it is intended that the invention cover all modifications, equivalences and alternative constructions falling within the spirit and scope of the invention as expressed in the appended claims.

FIG. 1 is a cross-section and schematic view of a plasma lamp 100, according to an example embodiment. The plasma lamp 100 may have a lamp body 102 formed from one or more solid dielectric materials and a bulb 104 positioned adjacent to the lamp body 102. The bulb 104 contains a fill that is capable of forming a light emitting plasma. A lamp drive circuit (e.g., a lamp drive circuit 106 shown by way of example in FIG. 9) couples RF power into the lamp body 102 which, in turn, is coupled into the fill in the bulb 104 to form the light emitting plasma. In example embodiments, the lamp body 102 forms a structure that contains and guides the RF power.

The bulb 104 is positioned or oriented in the plasma lamp 100 so that a length of a plasma arc 108 generally faces a lamp opening 110 (as opposed to facing side walls 112) to increase an amount of collectable light emitted from the plasma arc 108 in a given Etendue. Since the length of plasma arc 108 orients in a direction of an applied electric field, the lamp body 102 and the coupled RF power are configured to provide an electric field 114 that is aligned or substantially parallel to the length of the bulb 104 and a front or upper surface 116 of the lamp body 102. Thus, in an example embodiment, the length of the plasma arc 108 may be substantially (if not completely) visible from outside the lamp body 102. In example embodiments, collection optics 118 may be in the line of sight of the full length of the bulb 104 and plasma arc 108. In other examples, about 40% to 100% (or any range subsumed therein) of the plasma arc 108 may be visible to the collection optics 118 in front of the lamp 100. Accordingly, the amount of light emitted from the bulb 104 and received by the collection optics 118 may be enhanced. In example embodiments, a substantial amount of light may be emitted out of the lamp 100 from the plasma arc 108 through a front side wall of the lamp 100 without any internal reflection.

As described herein, the lamp body 102 is configured to realize the necessary resonator structure such that the light emission of the lamp 100 is enabled while satisfying Maxwell's equations.

In FIG. 1, the lamp 100 is shown to include a lamp body 102 including a solid dielectric body and an electrically conductive coating 120, which extends to the front or upper surface 116. The lamp 100 is also shown to include dipole arms 122 and conductive elements 124, 126 (e.g., metallized cylindrical holes bored into the lamp body 102) to concentrate the electric field present in the lamp body 102. The dipole arms 122 may thus define an internal dipole. In an example embodiment, a resonant frequency applied to a lamp body 102 without dipole arms 122 and conductive elements 124, 126 would result in a high electric field at the center of the solid dielectric lamp body 102. This is based on the intrinsic resonant frequency response of the lamp body due to its shape, dimensions, and relative permittivity. However, in the example embodiment of FIG. 1, the shape of the standing waveform inside the lamp body 102 is substantially modified by the presence of the dipole arms 122 and conductive elements 124, 126 and the electric field maxima is brought out to ends portions 128, 130 of the bulb 104 using the internal dipole structure. This results in the electric field 114 near the upper surface 116 of the lamp 100 that is substantially parallel to the length of the bulb 104. In some example embodiments, this electric field is also substantially parallel to a drive probe 170 and feedback probe 172 (see FIG. 9 below).

The fact that the plasma arc 108 in lamp 100 is oriented such that it presents a long side to the lamp exit aperture or opening 110 may provide several advantages. The basic physical difference relative to an "end-facing" orientation of the plasma arc 108 is that much of the light can exit the lamp 100 without suffering multiple reflections within the lamp body 102. Therefore, a specular reflector may show a significant improvement in light collection performance over a diffuse reflector that may be utilized in a lamp with an end-facing orientation. An example embodiment of a specular reflector geometry that may be used in some embodiments is a parabolic line reflector, positioned such that the plasma arc lies in the focal-line of the reflector.

Another advantage may lie in that the side wall of the bulb 104 can be relatively thick, without unduly inhibiting light collection performance. Again, this is because the geometry of the plasma arc 108 with respect to the lamp opening 110 is such that most of the light emanating from the plasma arc 108 will traverse thicker walls at angles closer to normal and will traverse them only once or twice (or at least a reduced number of times). In example embodiments, the side wall of the bulb 104 may have a thickness in the range of about 1 mm to 10 mm or any range subsumed therein. In one example, a wall thickness greater than the interior diameter or width of the bulb may be used (e.g., 2 mm to 4 mm in some examples). Thicker walls may allow higher power to be coupled to the bulb 104 without damaging the wall of the bulb 104. This is an example only and other embodiments may use other bulbs. It will be appreciated that the bulb 104 is not restricted to a circular cylindrical shape and may have more than one side wall.

In FIG. 1, the dipole arms 122 extend from a central portion of the bulb 104 in opposite directions out toward the ends of the bulb 128 and 130. In the central portion, the dipole arms 122 are closely spaced from one another and extend parallel to one another down to conductive elements 124 and 126. In the central portion, the dipole arms 122 may be 2 mm to 10 mm apart, or 2 mm to 5 mm in some embodiments. In a particular example, the dipole arms 122 are 3 mm apart in the central region. These closely spaced dipole arms 122 provide a capacitance and concentrate a high electric field near the bulb 104. The arms extend to end portions 140, which spreads the electric field along the length of the bulb 104. The central conductors and extending arms form a dipole antenna structure and power is near-field coupled from the dipole antenna to the bulb. The electrically conductive coating 120 helps prevent far-field radiation and electromagnetic interference, as further described below. While the central conductors of the dipole arms 122 provide a capacitance in the lamp body, the conductive elements 124 and 126 provide an inductance and tend to concentrate the magnetic field. The dipole arms 122 and conductive elements 124 and 126 form a resonant structure in some embodiments. A probe may be used to provide RF power to the dielectric lamp body, which is received by the resonant structure and coupled to the load in the bulb 104 by the dipole antenna. In example embodiments, the RF power is provided at a resonant frequency for the resonant antenna structure (comprising the dipole arms 122, conductive elements 124 and 126, and dielectric material between these elements). This power coupling may be referred to as antenna coupling of RF power to the load in the bulb. In example embodiments, the RF power may be applied at a resonant frequency or in a range of from 0% to 10% above or below the resonant frequency or any range subsumed therein. In some embodiments, RF power may be applied in a range of from 0% to 5% above or below the resonant frequency. In some embodiments, power may be provided at one or more frequencies within the range of about 0 to 50 MHz above or below the resonant frequency or any range subsumed therein. In another example, the power may be provided at one or more frequencies within the resonant bandwidth for at least one resonant mode. The resonant bandwidth is the full frequency width at half maximum of power on either side of the resonant frequency (on a plot of frequency versus power for the resonant cavity).

In the example shown in FIG. 1, the dipole arms 122 extend toward the ends of the bulb 128 and 130, but end before reaching the upper surface 116 of the lamp body 102, which is covered with an electrically conductive coating 120 that is grounded. In this example, the end portions 140 of the dipole arms 122 form antenna electrodes. These end portions 140 end before crossing the mid-point of the bulb (taken along the axis of the bulb's length) and do not surround the furthest end points on the bulb at 128 and 130.

Figure 1B:
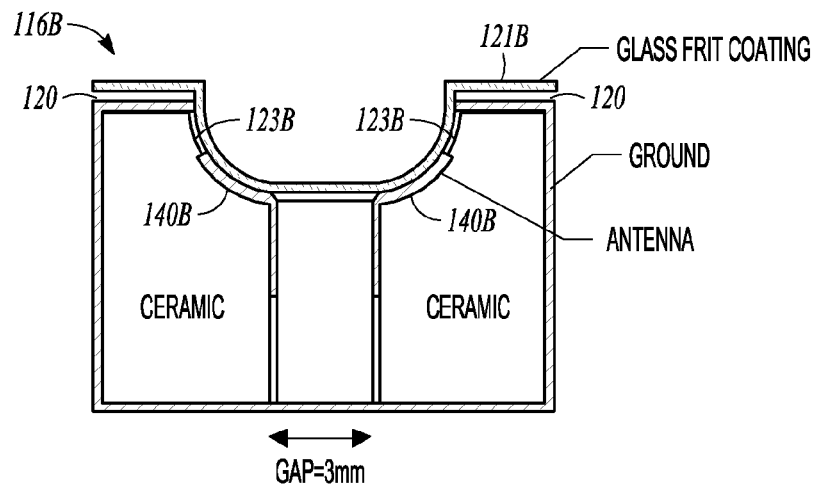
FIG. 1B shows a first example antenna configuration for coupling power to a bulb.

FIG. 1B shows another example lamp with this antenna configuration. The bulb is received in a recess on the outer surface of the lamp body. The end portions 140b or electrodes extend only part way up the recess toward the upper surface 116b of the lamp body. A space 123b along the wall of the recessed region separates the electrodes 140b from the upper surface 116b. In some embodiments, this space 123b may range from about 1 mm to 5 mm or any range subsumed therein. In an example embodiment, the space is about 2 mm. A high breakdown material, such as a layer of glass frit 121b or other dielectric material, may be coated on the outside of the electrically conductive coating 120 to prevent arcing across the space. The high breakdown material extends from the upper surface 116b, across space 123b, and over the antenna electrodes 140b along the bulb recess.

Figure 1C:
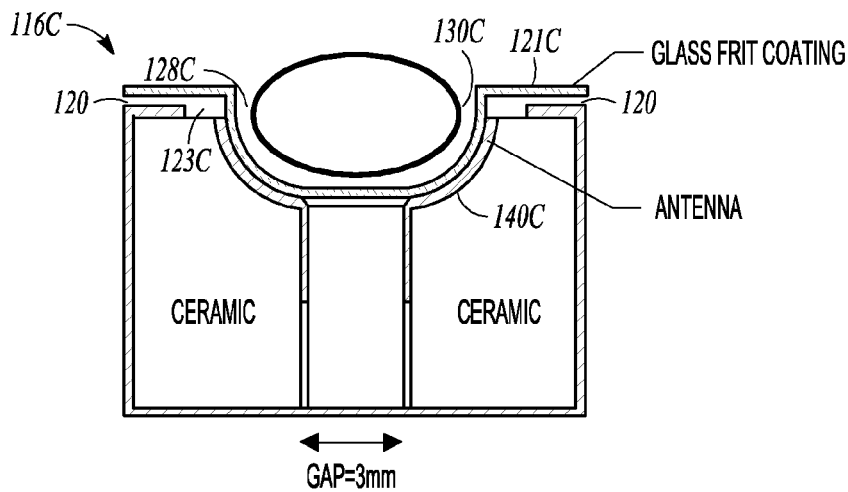
FIG. 1C shows a second example antenna configuration for coupling power to a bulb.

FIG. 1C shows an example embodiment where the electrodes 140c continue to the upper surface 116c of the lamp body. A space 123c separates the antenna from the electrically conductive coating 120 on the upper surface 116c. The space 123c is on the top surface 116c of the lamp body. In this example, the electrodes 140c extend to or past the mid-point of the bulb (taken along its lengthwise axis) and surround the distal ends 128c and 130c of the bulb. In other examples, the antenna arms may extend up to 40%, 45%, 50%, 55%, 60% or more of the distance along the diameter of the bulb or extend laterally along the length of the bulb to within 20%, 10%, 5% of the distal ends of the bulb or extend to or past the distal ends of the bulb. As in FIG. 1B, a glass frit 121c or other high breakdown material may be coated over the top surface 116c, space 123c, and electrodes 140c along the bulb recess.

In some embodiments, the antenna arms form cup shaped electrodes that surround the bottom half of the bulb (other than the region where there is a gap between the two dipole arms). The cup shape electrodes may be closely spaced to the bulb surface. In some example, the space between the cup shaped electrodes and bulb surface is in the range of between 1 mm to 5 mm or any range subsumed therein. In some examples, the spacing is less than 2 mm or less than 1 mm. In some embodiments, the electrodes contact the bulb surface. In other embodiments, the cup shaped electrodes may extend around a portion of the top half of the bulb. In other examples, the electrodes may form a complete cup encircling the ends of the bulb. In another example, a ring or strip of the conductive electrode may circle the bulb between the central region of the bulb and the elongate ends of the bulb.

Figure 1D:
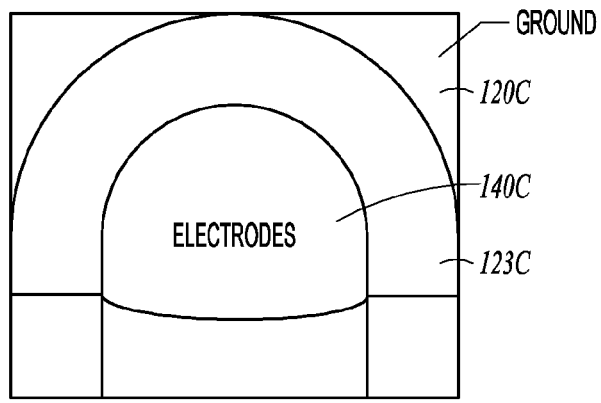
FIG. 1D shows the spacing between an antenna electrode and a grounded outer coating of a lamp body, according to an example embodiment, using the antenna configuration of FIG. 1C.

FIG. 1D shows the spacing 123c between the coating 120c on the upper surface 116c of the lamp body and the antenna electrode 140c formed in the bulb recess in the configuration of FIG. 1C.

Figure 1E:
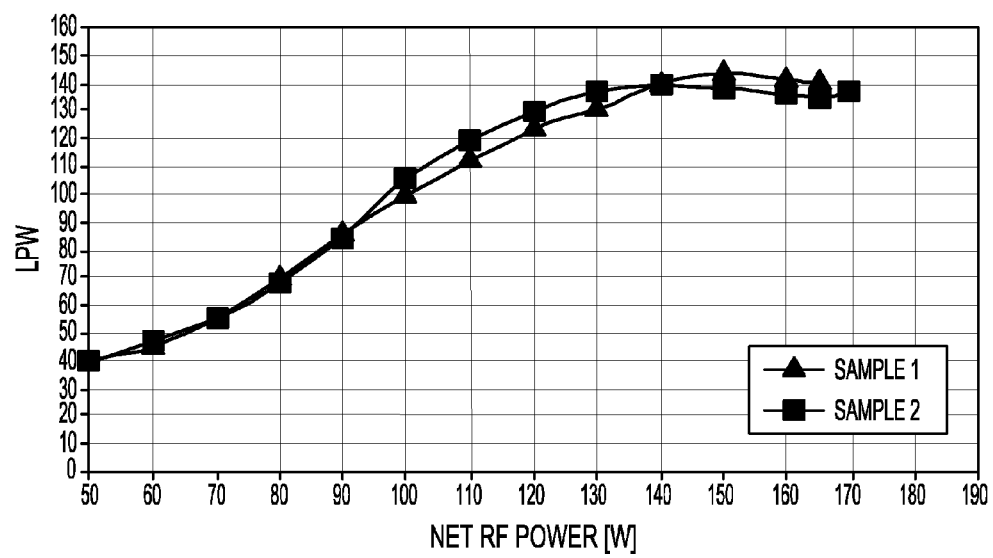
FIG. 1E is a graph showing luminous efficiency in lumens per watt (LPW) for two sample lamps using the antenna configuration of FIG. 1C.
Figure 1F:
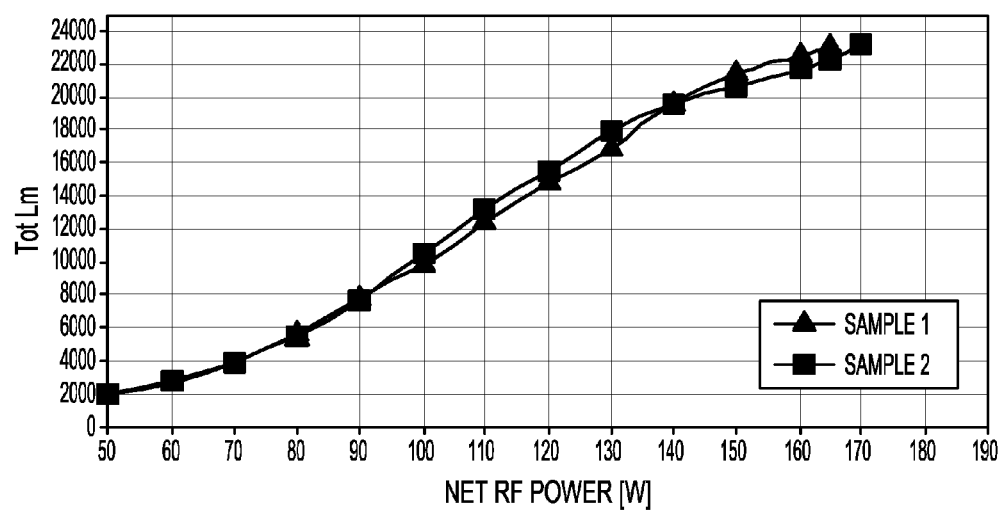
FIG. 1F is a graph showing total lumens output for two sample lamps using the antenna configuration of FIG. 1C.

Extending the electrodes up to or past the mid-point of the bulb, as shown in FIGS. 1C and 1D, improves power coupling to the bulb and can be used to provide high luminous efficiency. FIG. 1E shows the luminous power output for two sample lamps using the antenna configuration shown in FIG. 1C. The gap between the central conductors was about 3 mm and the bulb was about 7 mm long and about 3 mm in diameter. The lamp body comprised alumina. In example embodiments, the fill may include holmium, argon, and mercury, as described further below. In FIG. 1E, the luminous power output is graphed against the net RF power provided by the amplifier to the lamp body. As shown in FIG. 1E, the luminous power output may be more than 100 watts per lumen at a net power of 100 watts, more than 110 watts per lumen at a net power of 110 watts, more than 120 watts per lumen at a net power of 120 watts luminous efficiency and more than 130 watts per lumen at a net power of 130 watts. As shown in FIG. 1E, the peak luminous power output exceeds 140 LPW. FIG. 1F shows total lumens output for the two sample lamps. The total lumens output at 165 watts exceeds 23,000 lumens in this example.

Figure 1G:
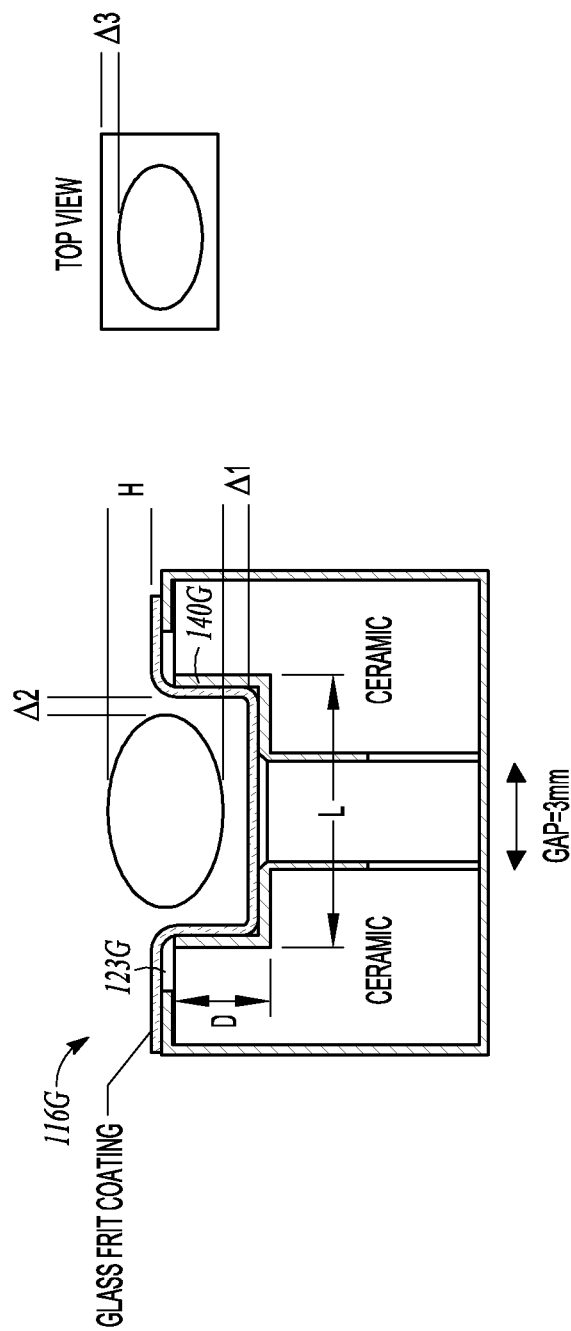
FIG. 1G shows an example embodiment in which alumina powder is packed around the bulb and over a portion of the top of the bulb.

FIG. 1G shows another example antenna configuration. In this configuration, the electrodes 140g are rectangular instead of curved. Alumina powder is packed in the space between the bulb and electrodes 140g to provide additional heat sinking. In this example, the distance between the dipole arms in the central region is about 3 mm (in other examples, the distance is 1 mm to 10 mm) and the electrodes 140g extend out to a distance L. The end of the electrodes 140g extend up a distance D. The bulb protrudes above the upper surface by a distance H. The distance between the bulbs and the electrodes is $\Delta 1$, $\Delta 2$, and $\Delta 3$, and alumina powder is packed in these spaces. In example embodiments, D is in the range of about 2 mm to 10 mm or any range subsumed therein, L is in the range of 5 mm to 20 mm or any range subsumed therein, the gap is in the range of 2 mm to 15 mm or any range subsumed therein, H is in the range of 2 mm to 5 mm or any range subsumed therein, and $\Delta 1$, $\Delta 2$, and $\Delta 3$ are in the range of 0.25 mm to 3 mm or any range subsumed therein. In a particular example, D is 5 mm, L is 12 mm, the bulb outer diameter is 5 mm, the bulb inner length is 5 mm, the protrusion of the bulb H is 1 mm, $\Delta 1$ is 0.25 mm, $\Delta 2$ is 0.5 mm, and $\Delta 3$ is 0.5 mm. In another example, D is 5 mm, L is 12 mm, the bulb outer diameter is 5 mm, the bulb inner length is 5 mm, the protrusion of the bulb H is 0 mm, $\Delta 1$ is 1 mm, $\Delta 2$ is 0.5 mm, and $\Delta 3$ is 0.5 mm. In another example, D is 5 mm, L is 14 mm, the bulb outer diameter is 5 mm, the bulb inner length is 5 mm, the protrusion of the bulb H is −1 mm, $\Delta 1$ is 0.25 mm, $\Delta 2$ is 0.5 mm and $\Delta 3$ is 0.5 mm. In another example, D is 5 mm, L is 11 mm, the bulb outer diameter is 5 mm, the bulb inner length is 4 mm, the protrusion of the bulb H is 0 mm, $\Delta 1$ is 0.25 mm, $\Delta 2$ is 0.5 mm and $\Delta 3$ is 0.5 mm.

Figure 1H:
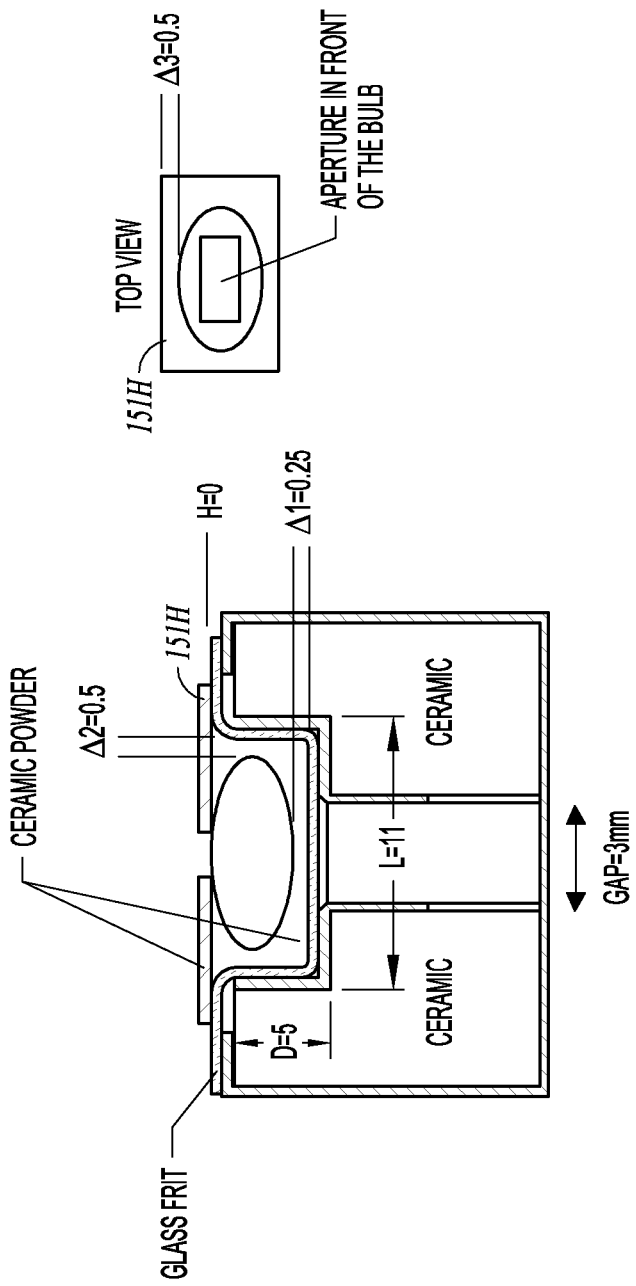
FIG. 1H shows an example embodiment in which a plate with an aperture is placed over the bulb.

FIG. 1H shows another example antenna configuration. In this example, a top plate 151h with an aperture is placed over the bulb. The aperture forms a small window (less than the size of the bulb) through which light escapes. In an alternate embodiment, the aperture is formed by packing alumina powder over the bulb, except for an aperture region from which light can escape.

Figure 1I:
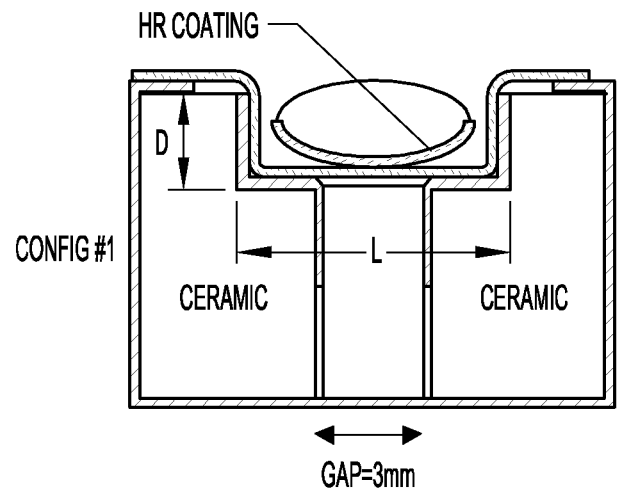
FIGS. 1I and 1J show example embodiments with a reflective coating on the bulb.
Figure 1J:
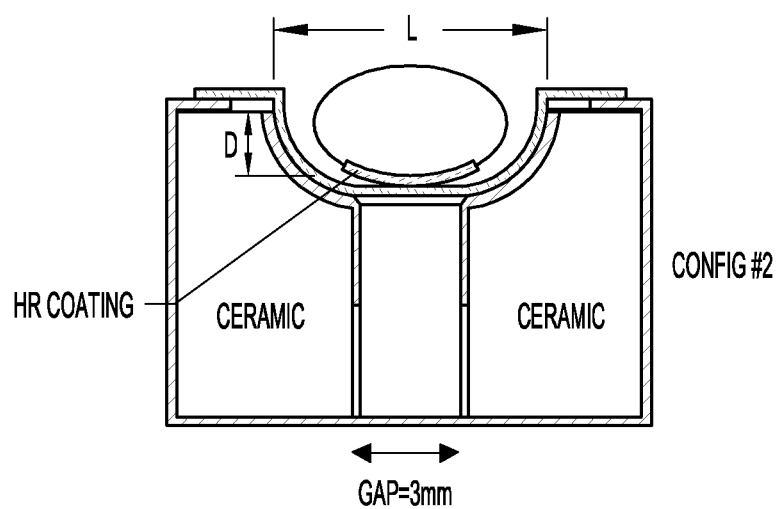

FIGS. 1I and 1J show additional examples in which a highly reflective coating (shown as HR) is included on the outer surface of the bulb to reflect light out of the lamp. The reflective coating may surround the bottom half of the bulb or a portion of the bottom half of the bulb. In example embodiments, a reflective material may be deposited on the inside or outside surface of the bulb. In some embodiments, the interface between the bulb and the electrode may be alumina or other ceramic material and have a polished surface for reflection. In other embodiments, a thin-film, multi-layer dielectric coating may be used.

Figure 2:
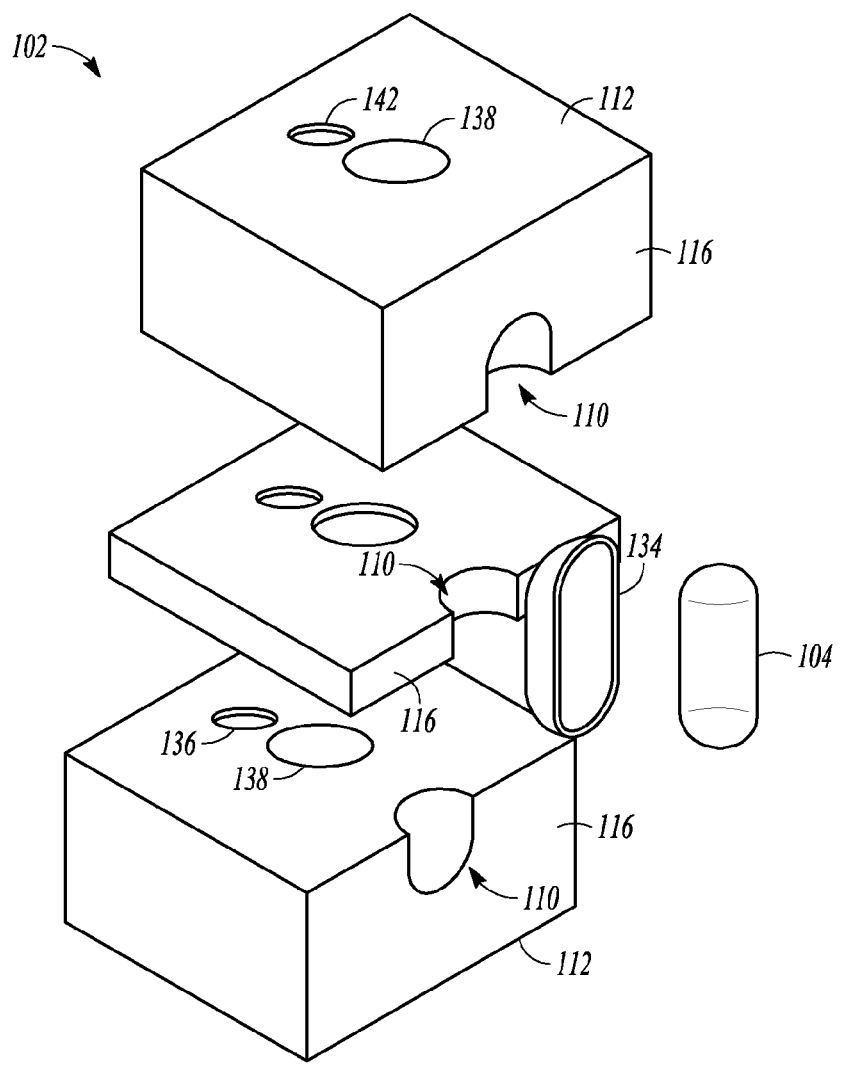
FIG. 2 is a perspective exploded view of a lamp body, according to an example embodiment, and a bulb positioned horizontally relative to an outer upper surface of the lamp body.
Figure 3:
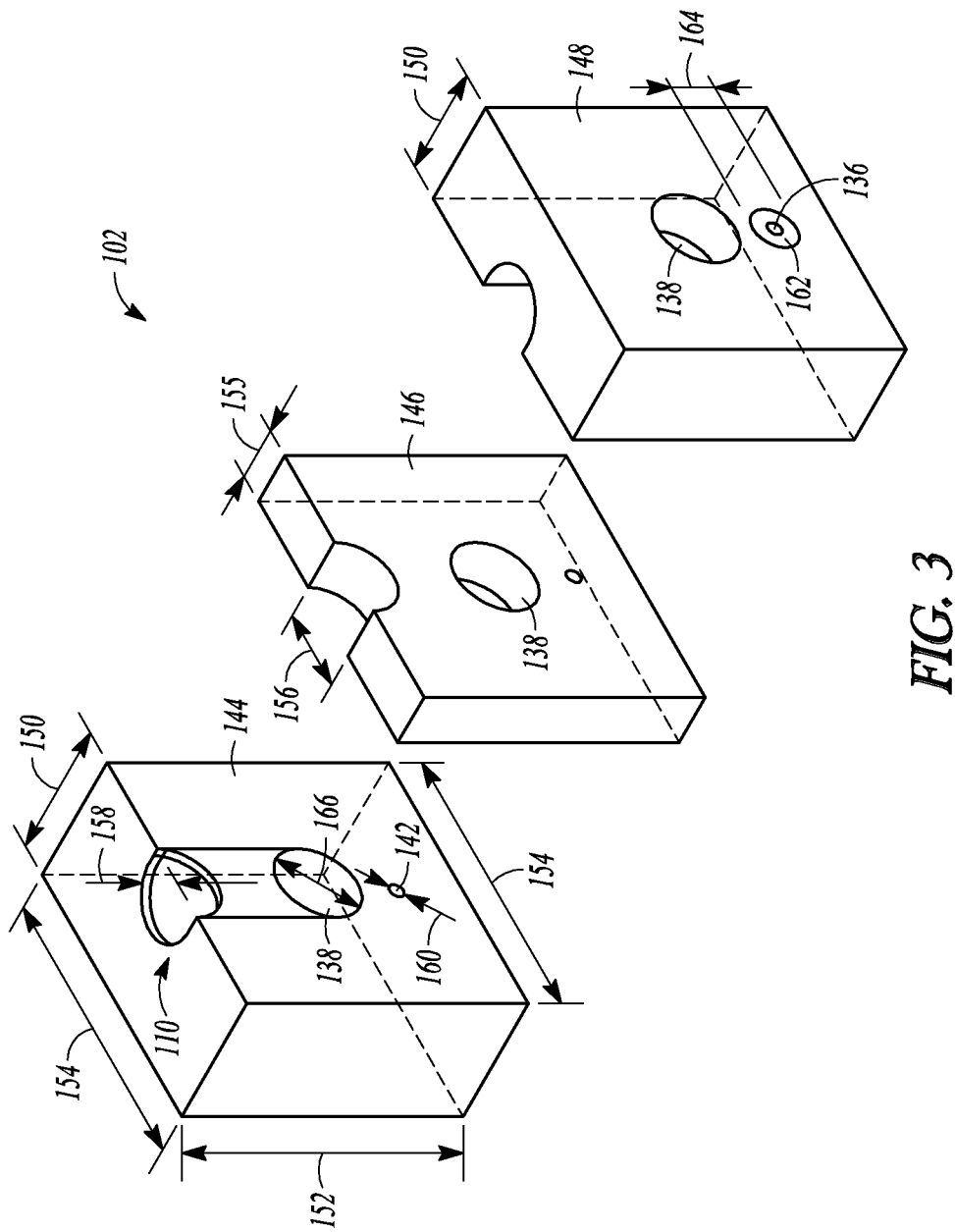
FIG. 3 shows another perspective exploded view of the lamp body of FIG. 2.
Figure 4:
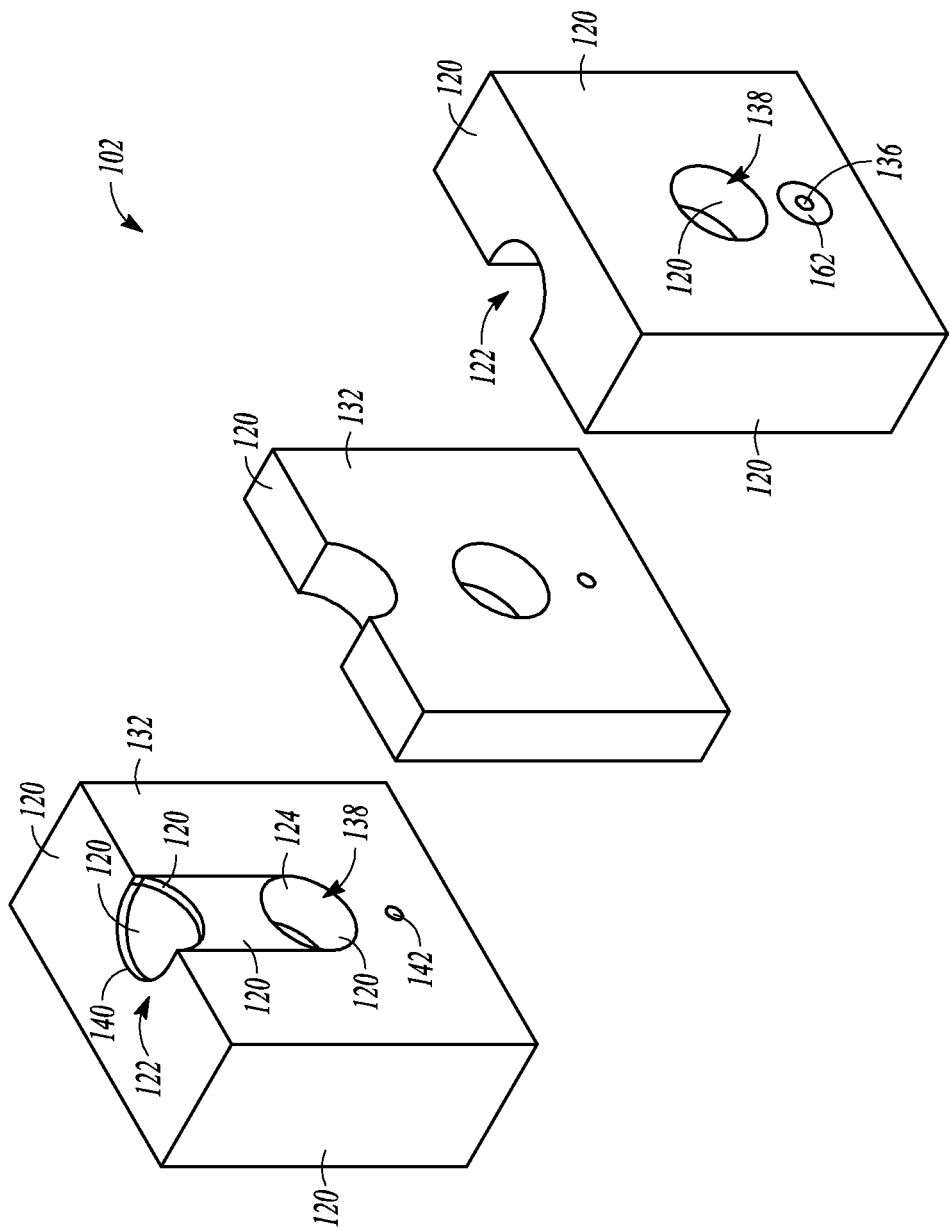
FIG. 4 shows conductive and non-conductive portions of the lamp body of FIG. 2.

FIGS. 2 through 4 show more detailed diagrams of the example plasma lamp 100 shown in FIG. 1. The lamp 100 is shown in exploded view and includes the electrically conductive coating 120 (see FIG. 4) provided on an internal solid dielectric 132 defining the lamp body 102. The oblong bulb 104 and surrounding interface material 134 (see FIG. 2) are also shown. Power is fed into the lamp 100 with an electric monopole probe closely received within a drive probe passage 136. The two opposing conductive elements 124, 126 are formed electrically by the metallization of the bore 138 (see FIG. 4), which extend toward the center of the lamp body 102 (see also FIG. 1) to concentrate the electric field and build up a high voltage to energize the bulb 104. The dipole arms 122, connected to the conductive elements 124, 126 by conductive surfaces, transfer the voltage out towards the bulb 104. The cup-shaped terminations or end portions 140 on the dipole arms 122 partially enclose the bulb 104. The conductive coating for the dipole arms may be provided on the outer pieces of the lamp body assembly as shown in FIG. 4. In an alternate embodiment, the conductive coating for the central portion of the dipole arms 122 extending from the bore 138 to the end portions 140 are coated on the center portion of the lamp body. A silver paint may be used and fired onto the center piece before assembly. This helps prevent arcing across an air gap between the outer pieces of the body and the center piece. In an alternate embodiment, the body may be molded around conductive elements that form the conductive elements 124 and 126 and the dipole arms 122.

Figure 9:
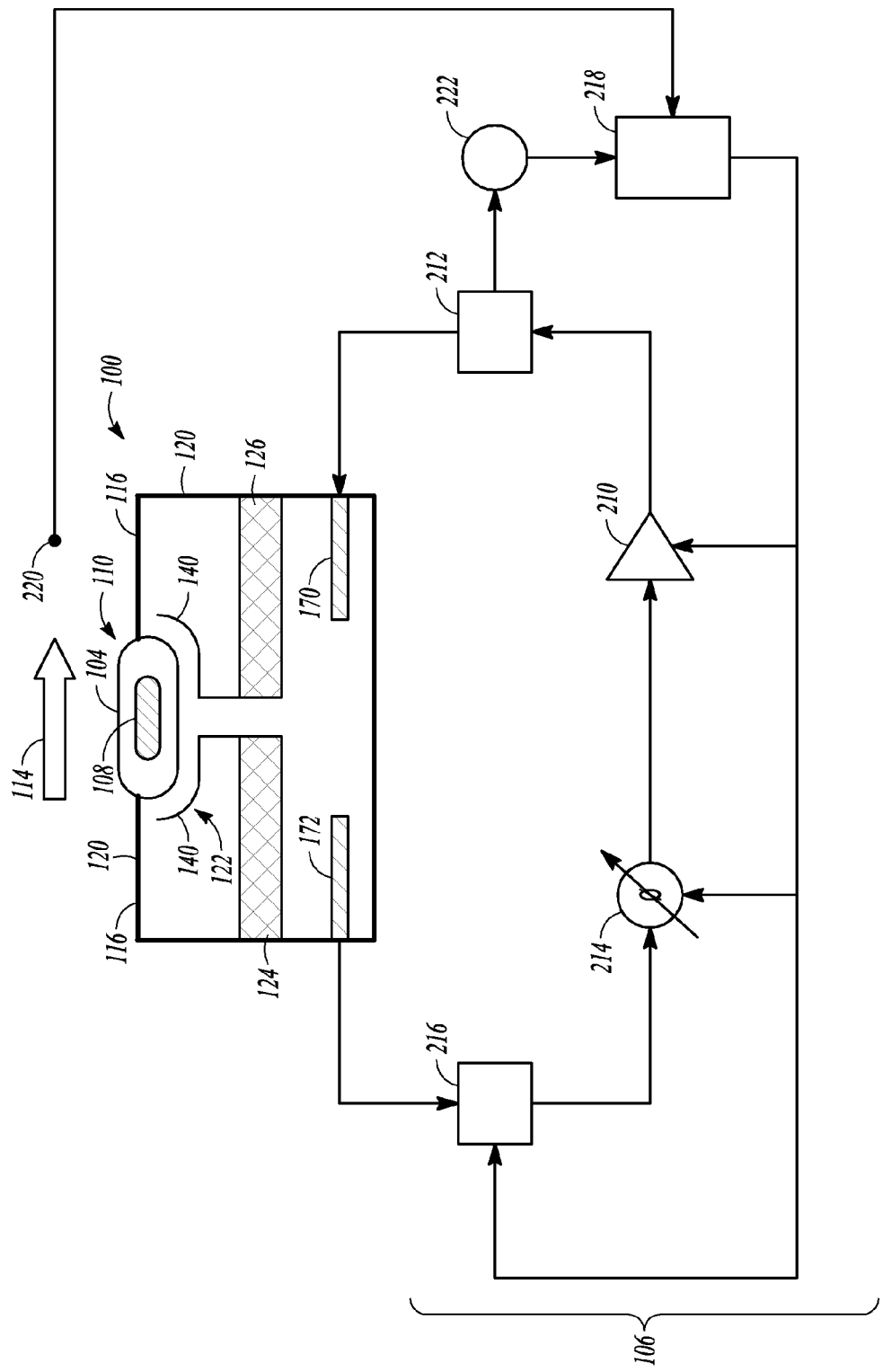
FIG. 9 is a schematic diagram of an example lamp drive circuit coupled to the lamp shown in FIG. 1.

A feedback probe passage 142 is provided in the lamp body 102 to snugly receive a feedback probe that connects to a drive circuit (e.g. a lamp drive circuit 106 shown by way of example in FIG. 9). In an example embodiment, the interface material 134 may be selected so as to act as a specular reflector to reflect light emitted by the plasma arc 108.

In an example embodiment, the lamp body 102 is shown to include three body portions 144, 146 and 148. The body portions 144 and 148 are mirror images of each other and may each have a thickness 150 of about 11.2 mm, a height 152 of about 25.4 mm, and a width 154 of about 25.4 mm. The inner portion 146 may have a thickness 155 of about 3 mm. The lamp opening 110 in the upper surface 116 may be partly circular cylindrical in shape, having a diameter 156 of about 7 mm and have a bulbous end portion with a radius 158 of about 3.5 mm. The drive probe passage 136 and the feedback probe passage 142 may have a diameter 160 of about 1.32 mm. A recess 162 with a diameter 164 is provided in the body portion 148. The bores 138 of the conductive elements 124, 126 may have a diameter 166 of about 7 mm.

An example analysis of the lamp 100 using three-dimensional (3-D) electromagnetic simulation based on the finite-integral-time-domain (FITD) method is described below with reference to FIGS. 5-7. The electric (E) field (see FIG. 7), the magnetic (H) field (see FIG. 6), and the power flow (which is the vectoral product of the E and H fields—see FIG. 5), are separately displayed for insight, although they are simply three aspects of the total electromagnetic behavior of the lamp 100. In the example embodiment simulated in the three figures, a drive probe 170 couples power into the lamp body 102 and a feedback probe 172 is placed on the same side of the lamp body 102 as the drive probe 170. This is an alternative embodiment representing only a superficial difference from the configuration of drive and feedback probes for use in the example embodiment shown in FIGS. 2 through 4.

Figure 5:
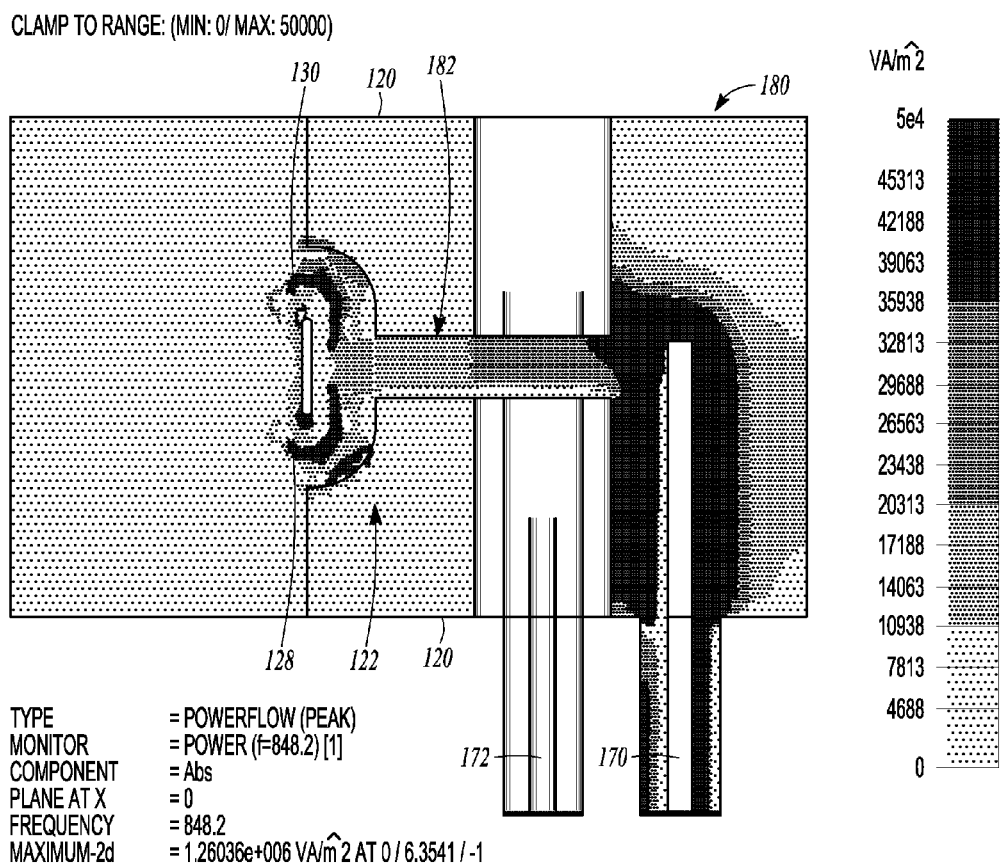
FIG. 5 shows a three-dimensional electromagnetic simulation of power transfer to the bulb in an example embodiment.

FIG. 5 shows a simulation 180 of power transfer to the bulb 104, in an example embodiment. Input power is provided via the drive probe 170 (not shown in FIG. 1) and is incident onto the bulb 104 utilizing the dipole arms 122. It should be noted that power is concentrated near the bulb 104. In an example embodiment, the power proximate the ends portions of the bulb 128 and 130 may be about 39063 to 45313 W/m$^2$. Power along the parallel central portions 182 of the dipole arms 122 may vary from about 10938 to 35938 W/m$^2$. It should be noted that power near the electrically conductive coating 120 and proximate the bulb 104 is minimal in the example simulation 180.

Figure 6:
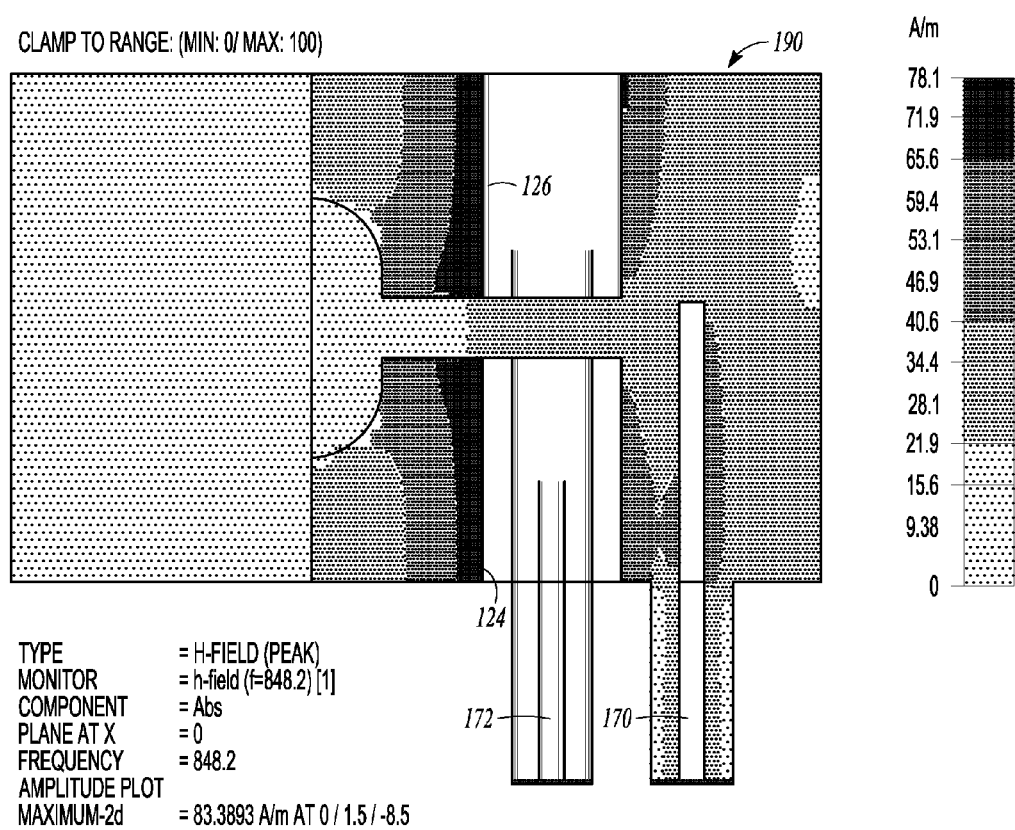
FIG. 6 shows simulated operation of an example embodiment of the lamp showing concentration of the magnetic fields around center posts.

As shown in a simulation 190 of FIG. 6, the conductive elements 124, 126 shape the magnetic field such that it is concentrated near the elements themselves, rather than near the walls as is the case if RF power was provided to the lamp body 102 at a resonant frequency without the embedded conductive elements 124, 126. Regions of high magnetic field concentration correspond to regions of high AC current. Therefore, the current flow near the outer walls of the present example embodiments is small compared to a lamp without the embedded conductive elements. The significance of this will be discussed below. The simulation 190 of FIG. 6 shows at every point the magnitude of the H-field only, ignoring the vectoral nature of the field.

Figure 7:
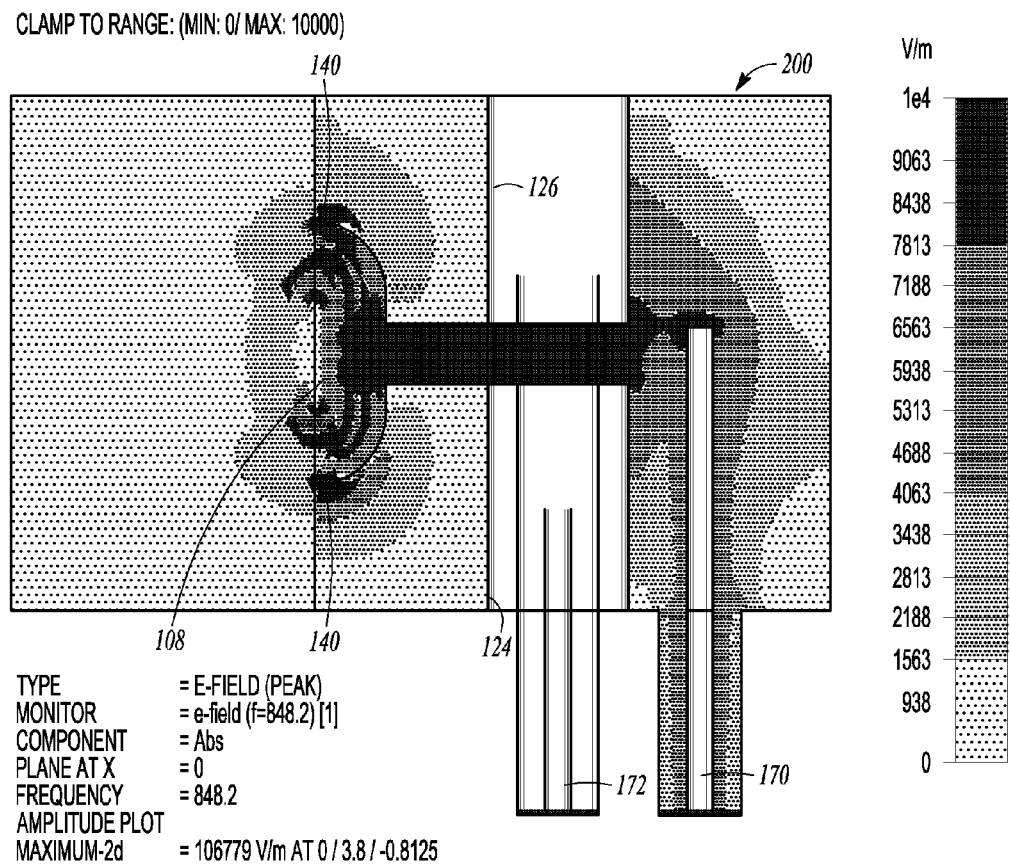
FIG. 7 shows simulated operation of an example embodiment of the lamp showing concentration of electric fields around dipole arms.

As shown in a simulation 200 of FIG. 7, the electric field is strongly concentrated between the dipole arms 122 (see FIG. 1), and between the dipole endcaps or end portions 140. The weaker electric field in the remainder of the lamp body 102 is confined by the outer electrically conductive coating 120 or layer (metallization), except near the discontinuity in the electrically conductive coating 120 brought about by the opening 110 (see FIG. 1) for the bulb 104. Like FIG. 6, FIG. 7 shows at every point the magnitude of the E-field only, ignoring the vectoral nature of the field.

In addition to the improved light collection efficiency as a consequence of the orientation of the plasma arc 108 with respect to the lamp body 102, the E and H field patterns may provide several advantages. The resonant frequency of the structure may be decoupled and be substantially independent of the physical extent or size of the lamp body 102. This can be seen in two aspects. The concentration of the magnetic field near the conductive elements 124 and 126 indicates that the inductance of those elements, and to a lesser extent the connected dipole arms 122, strongly influence the operational frequency (e.g., a resonant frequency). The concentration of the electric field between the dipole arms 122 indicates that the capacitance of those elements strongly influences the operational frequency (e.g., resonant frequency). Taken together, this means the lamp body 102 can be reduced in size relative to a lamp with a lamp body of the same dimensions but without the conductive elements 124 and 126 and dipole arms 122 (even for a relatively low frequency of operation, and even compared to both simple and specially-shaped geometries of lamp bodies where the resonant frequency is determined primarily by the shape, dimensions, and relative permittivity of the dielectric body). In example embodiments, the volume of lamp body 102 may be less than those achieved with the same dielectric lamp bodies without conductive elements 124 and 126 and dipole arms 122, where the resonant frequency is determined primarily by the shape, dimensions, and relative permittivity of the dielectric body. In example embodiments, it is believed that a lamp body 102 with a relative permittivity of 10 or less may have a volume less than about 3 cm$^3$ for operating frequencies less than about 2.3 GHz, less than about 4 cm$^3$ for operating frequencies less than about 2 GHz, less than about 8 cm$^3$ for operating frequencies less than about 1.5 GHz, less than about 11 cm$^3$ for operating frequencies less than about 1 GHz, less than about 20 cm$^3$ for operating frequencies less than about 900 MHz, less than about 30 cm$^3$ for operating frequencies less than about 750 MHz, less than about 50 cm$^3$ for operating frequencies less than about 650 MHz, and less than about 100 cm$^3$ for operating frequencies less than about 650 MHz. In one example embodiment, a lamp body 102 with a volume of about 13.824 cm$^3$ was used at an operating frequency of about 880 MHz. It is believed that similar sizes may be used even at lower frequencies below 500 MHz.

Low frequency operation may provide several advantages in some example embodiments. For example, at low frequencies, especially below 500 MHz, very high power amplifier efficiencies are relatively easily attained. For example, in silicon transistors formed as laterally diffused metal oxide semiconductors (LDMOS), typical efficiencies at 450 MHz are about 75% or higher, while at 900 MHz they are about 60% or lower. In one example embodiment, a lamp body is used with a relative permittivity less than 15 and volume of less than 30 cm$^3$ at a resonant frequency for the lamp structure of less than 500 MHz, and the lamp drive circuit uses an LDMOS amplifier with an efficiency of greater than 70%. High amplifier efficiency enables smaller heat sinks, since less DC power is required to generate a given quantity of RF power. Smaller heat sinks mean smaller overall packages, so the net effect of the example embodiment is to enable more compact lamp designs at lower frequencies. For example, compact lamps may be more affordable and more easily integrated into projection systems, such as front projection and rear projection televisions.

Figure 8:
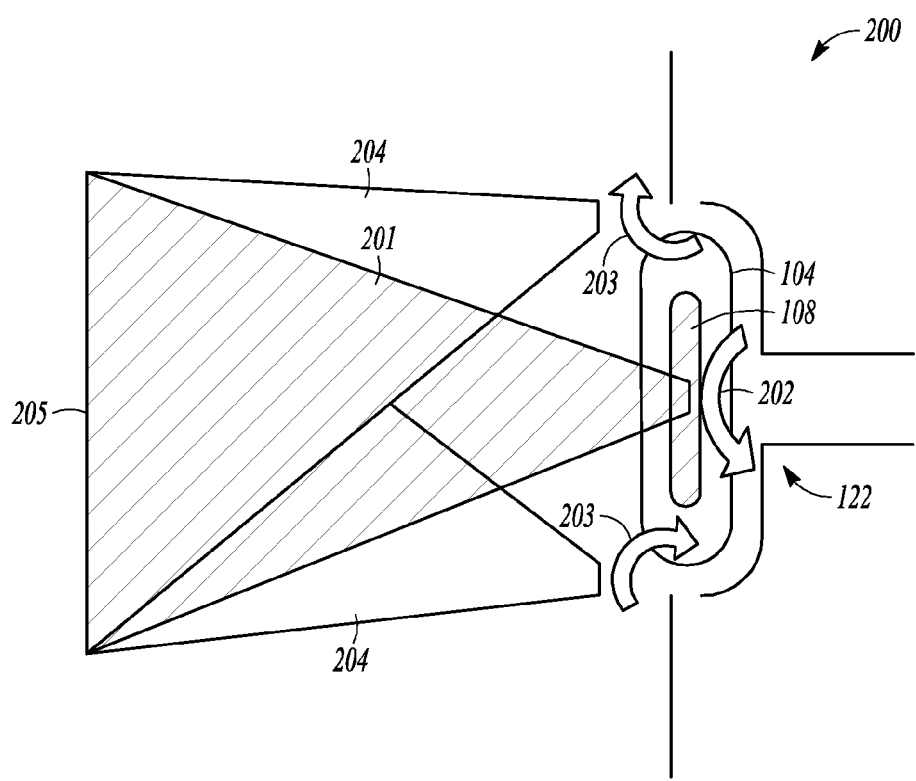
FIG. 8 is a line drawing adaptation of the example electric fields shown in FIG. 7.

A second possible advantage in some example embodiments is the relative immunity to electromagnetic interference (EMI). Again, this effect can be appreciated from the point of view of examining either the E or H field. Loosely, EMI is created when disturbances in the current flow force the current to radiate ("jump off") from the structure supporting it. Because the magnetic field is concentrated at conductive structures (e.g., the dipole arms 122) inside the lamp body 102, current flow near the surface of the lamp body 102 and, most significantly, near the disturbance represented by the lamp opening 110, is minimized, thereby also minimizing EMI. The E-field point of view is more subtle. FIG. 8 shows a line drawing adaptation of the electric fields of the simulation 200 shown in FIG. 7, indicating electric dipole moments 202, 203 of the field omitted for the sake of clarity in the magnitude-only depiction of FIG. 7. The dipole moment 202 of the main input field delivered by the dipole arms 122 has the opposite sign as the dipole moments 203 of the parasitic field induced on the outer electrically conductive coating 120 of the lamp body 102. By "opposite sign," we mean that the vector of the electric fields for each dipole arm extends in opposing directions (e.g., the Right Hand Rule as applied to dipole moment 202 yields, in this example, a vector pointing out of the page, where as the Right Hand Rule as applied to dipole moments 203 yields, in this example, a vector pointing into the page). The net effect is that the field 201 radiated by the main-field dipole moment 202 cancels out the field 204 radiated by the parasitic dipole moments 203 in the far-field region 205, thus minimizing EMI.

A further possible advantage in some example embodiments is increased resistance to the dielectric breakdown of air near the bulb 104. As shown in FIG. 7, the peak of the electric field distribution in this example design is contained within the lamp body 102, which has a higher breakdown voltage than air.

In an example embodiment, the lamp 100 is fabricated from alumina ceramic and metallized to provide the electrically conductive coating 120 using a silver paint fired onto the ceramic components or body portions 144-148. In this example embodiment, the resonant frequency is close to the predicted value of about 880 MHz for an external dimension of about 25.4×25.4×25.4 mm, or 1 cubic inch (see FIG. 3). The bulb fill in this example embodiment is a mixture of mercury, metal halide, and argon gas. Ray-tracing simulations indicate that collection ratios of about 50% are achievable with minimal modifications to this example embodiment.

In example embodiments, the lamp body 102 has a relative permittivity greater than air. In an example embodiment, the lamp body 102 is formed from solid alumina having a relative permittivity of about 9.2. In some embodiments, the dielectric material may have a relative permittivity in the range of from 2 to 100 or any range subsumed therein, or an even higher relative permittivity. In some embodiments, the lamp body 102 may include more than one such dielectric material, resulting in an effective relative permittivity for the lamp body 102 within any of the ranges described above. The lamp body 102 may be rectangular (e.g., a rectangular prism), cylindrical, or other shape.

As mentioned above, in example embodiments, the outer surfaces of the lamp body 102 may be coated with the electrically conductive coating 120, such as electroplating or a silver paint or other metallic paint which may be fired onto an outer surface of the lamp body 102. The electrically conductive coating 120 may be grounded to form a boundary condition for RF power applied to the lamp body 102. The electrically conductive coating 120 may help contain the RF power in the lamp body 102. Regions of the lamp body 102 may remain uncoated to allow power to be transferred to or from the lamp body 102. For example, the bulb 104 may be positioned adjacent to an uncoated portion of the lamp body 102 to receive RF power from the lamp body 102.

The bulb 104 may be quartz, sapphire, ceramic or other desired bulb material and may be cylindrical, pill shaped, spherical or other desired shape. In the example embodiment shown in FIGS. 1-4, the bulb 104 is cylindrical in the center and forms a hemisphere at each end. In one example, the outer length (from tip to tip) is about 11 mm and the outer diameter (at the center) is about 5 mm. In this example, the interior of the bulb 104 (which contains the fill) has an interior length of about 7 mm and an interior diameter (at the center) of about 3 mm. The wall thickness is about 1 mm along the sides of the cylindrical portion and about 2.25 mm on both ends. In other examples, a thicker wall may be used. In other examples, the wall may be between 2 mm to 10 mm thick or any range subsumed therein. In other example embodiments, the bulb 104 may have an interior width or diameter in a range between about 2 mm and 30 mm or any range subsumed therein, a wall thickness in a range between about 0.5 mm and 4 mm or any range subsumed therein, and an interior length between about 2 mm and 30 mm or any range subsumed therein. In example embodiments, the interior of the bulb has a volume in the range of about 10 mm$^3$ to 750 mm$^3$ or any range subsumed therein. In some examples, the bulb has an interior volume of less than about 100 mm$^3$ or less than about 50 mm$^3$. These dimensions are examples only and other embodiments may use bulbs having different dimensions.

In one example, the interior bulb volume is about 31.42 mm$^3$. In example embodiments where power is provided during steady state operation at between about 150 to 200 watts (or any range subsumed therein), this results in a power density in the range of about 4.77 watts per mm$^3$ to 6.37 watts per mm$^3$ (4770 to 6370 watts per cm$^3$) or any range subsumed therein. In this example, the interior surface area of the bulb is about 62.2 mm$^2$ (0.622 cm$^2$) and the wall loading (power over interior surface area) is in the range of about 2.41 watts per mm$^2$ to 3.22 watts per mm$^2$ (241 to 322 watts per cm$^2$) or any range subsumed therein.

Figure 1K:
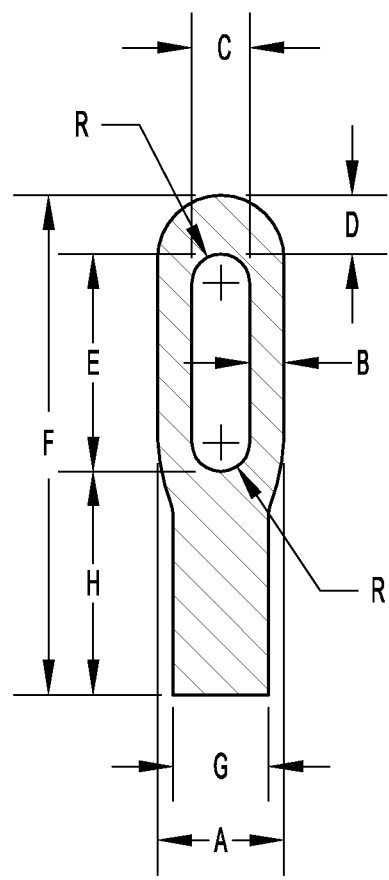
FIG. 1K shows an example bulb with a tail.

In an example shown in FIG. 1K, the bulb may have a tail extending from one end of the bulb. In some embodiments, the length of the tail (indicated at H in FIG. 2G) may be between about 5 mm and 25 mm or any range subsumed therein. In some embodiments, a longer or shorter tail may be used. In one example, the length of the tail, H, is about 9.5 mm. In this example, the outer length F (from tip to tip) is about 15 mm and the outer diameter A (at the center) is about 5 mm. In this example, the interior of the bulb (which contains the fill) has an interior length E of about 9 mm and an interior diameter C at the center of about 2.2 mm. The wall thickness B is about 1.4 mm along the sides of the cylindrical portion. The wall thickness D at the front end is about 2.25 mm. The radius R is about 1.1 mm. In this example, the interior bulb volume is about 31.42 mm$^3$. The tail may be formed by using a quartz tube to form the bulb. The tube is sealed at one end, which forms the front end of the bulb. The bulb is filled through the open end of the tube and sealed. The sealed tube is then placed in a liquid nitrogen bath, and a torch is used to collapse the tube at the other end of the lamp, which seals the bulb and forms the tail. The collapsed tube is then cut for the desired tail length.

In some embodiments, the tail may be used to align the bulb and mount it in position. For example, a groove may be provided as shown in FIGS. 10B and 11A for aligning the tail. In some example embodiments, a photodiode or other photosensor may be placed near the end of the tail to sense light from the bulb. The tail may be enclosed by a cover as shown in FIG. 10B, and the photodiode may be shielded by the cover from external light. The photodiode can be used to determine when the lamp has ignited for purposes of controlling the driver circuit and can also be used for dimming and other control functions.

In example embodiments, the bulb 104 contains a fill that forms a light emitting plasma when RF power is received from the lamp body 102. The fill may include a noble gas and a metal halide. Additives such as Mercury may also be used. An ignition enhancer may also be used. A small amount of an inert radioactive emitter such as $Kr_{85}$ may be used for this purpose. In other embodiments, different fills such as Sulfur, Selenium or Tellurium may also be used. In some example embodiments, a metal halide such as Cesium Bromide may be added to stabilize a discharge of Sulfur, Selenium or Tellurium.

In some example embodiments, a high pressure fill is used to increase the resistance of the gas at startup. This can be used to decrease the overall startup time required to reach full brightness for steady state operation. In one example embodiment, a noble gas such as Neon, Argon, Krypton or Xenon is provided at high pressures between 200 Torr to 3000 Torr or any range subsumed therein. Pressures less than or equal to 760 Torr may be desired in some embodiments to facilitate filling the bulb 104 at or below atmospheric pressure. In certain embodiments, pressures between 100 Torr and 600 Torr are used to enhance starting. Example high pressure fills may also include metal halide and Mercury which have a relatively low vapor pressure at room temperature. In example embodiments, the fill includes about 1 to 100 micrograms of metal halide per $mm^3$ of bulb volume, or any range subsumed therein, and 10 to 100 micrograms of Mercury per $mm^3$ of bulb volume, or any range subsumed therein. An ignition enhancer such as $Kr_{85}$ may also be used. In some embodiments, a radioactive ignition enhancer may be used in the range of from about 5 nanoCurie to 1 microCurie, or any range subsumed therein. In one example embodiment, the fill includes 1.608 mg Mercury, 0.1 mg Indium Bromide and about 10 nanoCurie of $Kr_{85}$. In this example, Argon or Krypton is provided at a pressure in the range of about 100 Torr to 600 Torr, depending upon desired startup characteristics. Initial breakdown of the noble gas is more difficult at higher pressure, but the overall warm up time required for the fill to fully vaporize and reach peak brightness is reduced. The above pressures are measured at 22° C. (room temperature). It is understood that much higher pressures are achieved at operating temperatures after the plasma is formed. For example, the lamp may provide a high intensity discharge at high pressure during operation (e.g., much greater than 2 atmospheres and 10 to 80 atmospheres or more in example embodiments).

Some embodiments may use a combination of metal halides to produce a desired spectrum and lifetime characteristics. In some examples, a first metal halide is used in combination with a second metal halide. In some examples, the first metal halide is Aluminum Halide, Gallium Halide, Indium Halide, Thallium Halide and Cesium Halide and the second metal halide is a halide of a metal from the Lanthanide series. In example embodiments, the dose amount of the first metal halide is in the range of from about from 1 to 50 micrograms per cubic millimeter of bulb volume, or any range subsumed therein, and the dose amount of the second metal halide is in the range of from about from 1 to 50 micrograms per cubic millimeter of bulb volume, or any range subsumed therein. In some embodiments, the dose of the first metal halide and the dose of the second metal halide are each in the range of from about 10 to 10,000 micrograms or any range subsumed therein. In example embodiments, these dose amounts result in a condensed pool of metal halide during lamp operation. A noble gas and additives such as Mercury may also be used. In example embodiments, the dose amount of Mercury is in the range of 10 to 100 micrograms of Mercury per $mm^3$ of bulb volume, or any range subsumed therein. In some embodiments, the dose of Mercury may be in the range of from about 0.5 mg to 5 mg or any range subsumed therein. An ignition enhancer may also be used. A small amount of an inert radioactive emitter such as $Kr_{85}$ may be used for this purpose. In some examples, $Kr_{85}$ may be provided in the range of about 5 nanoCurie to 1 microCurie or any range subsumed therein.

In a particular example embodiment, the fill includes the first metal halide as an Iodide or Bromide in the range from about 0.05 mg to 0.3 mg or any range subsumed therein, and the second metal halide as an Iodide or Bromide in the range from about 0.05 mg to 0.3 mg or any range subsumed therein. Chlorides may also be used in some embodiments. In some embodiments, the first metal halide and the second metal halide are provided in equal amounts. In other embodiments, the ratio of the first metal halide to the second metal halide may be 10:90, 20:80, 30:70, 40:60, 60:40, 70:30, 80:20 or 90:10.

In some embodiments, the first metal halide is Aluminum Halide, Gallium Halide, Indium Halide or Thallium Halide (or a combination of Aluminum Halide, Gallium Halide, Indium Halide and/or Thallium Halide). In some embodiments, the first metal halide may be Cesium Halide (or Cesium Halide in combination with Aluminum Halide, Gallium Halide, Indium Halide and/or Thallium Halide). In other embodiments, the dose does not include any Alkalai metals. In some embodiments, the second metal halide is Holmium Halide, Erbium Halide or Thulium Halide (or a combination of one or more of these metal halides). In these examples, the first metal halide may be provided in a dose amount in the range of about 0.3 mg/cc to 3 mg/cc or any range subsumed therein, and the second metal halide may be provided in a dose amount in the range of about 0.15 mg/cc to 1.5 mg/cc or any range subsumed therein. In some examples, the first metal halide may be provided in a dose amount in the range of about 0.9 mg/cc to 1.5 mg/cc or any range subsumed therein, and the second metal halide may be provided in a dose amount in the range of about 0.3 mg/cc to 1 mg/cc or any range subsumed therein. In some examples, the first metal halide is provided in a larger dose amount than the second metal halide. In some examples, the first metal halide is Aluminum Bromide or Indium Bromide and the second metal halide is Holmium Bromide. In some embodiments, the fill also includes Argon or another noble gas at a pressure in the range of about 50 to 760 Torr or any range subsumed therein. In some embodiments, the pressure is 100 Torr or more or 150 Torr or more or may be at higher pressures as described below. In one example, Argon at 150 Torr may be used. Mercury and an inert radioactive emitter such as $Kr_{85}$ may also be included in the fill. In some examples, a power of 100 watts or more may be provided to the lamp. In some embodiments, the power is in the range of about 150 to 200 watts, with 170 watts being used in a particular example. The wall loading may be 1 watts per $mm^2$ (100 watts per $cm^2$) or more. A thermally conductive material, such as alumina powder, may be in contact with the bulb to allow high wall loading to be used as described below. In some examples, as described further below, these fills may be used to provide 15,000 to 23,000 lumens (or any range subsumed therein) when operated at 150 to 200 watts (or any range subsumed therein). This can provide a luminous efficiency of 100 lumens per watt, 120 lumens per watt, or more, in some embodiments.

In an example used with lamps of the type shown in FIGS. 10A-B, 11A-D, and 13A-D, a bulb may have a cylindrical body with two hemispherical ends with an inner diameter of 10 mm and inner length of 14 mm, with a wall thickness of 2 mm on the cylinder and 3 mm at the end. The outer dimensions are 14 mm OD with a 20 mm length. A 10 mm tail is added to one end. An example fill for this bulb is 0.2 mg InBr, 0.1 mg HoBr3, and 2.4 μl of Hg, 50 hPa of argon (712 nCi Kr85). In another example, the inner diameter of the bulb is 4 mm, the outer diameter is 8 mm, the inner length is 10 mm, the outer length is 16 mm, the tail diameter G (see FIG. 1K) is (nominal) 5 mm and the tail length is 10 mm. In this example, the fill is 0.2 mg InBr/0.1 mg HoBr3/0.4 uL Hg.

These bulbs, pressures and fills are examples only and other pressures and fills may be used in other embodiments.

The layer of interface material 134 may be placed between the bulb 104 and the dielectric material of lamp body 102. In example embodiments, the interface material 134 may have a lower thermal conductivity than the lamp body 102 and may be used to optimize thermal conductivity between the bulb 104 and the lamp body 102. In an example embodiment, the interface material 134 may have a thermal conductivity in the range of about 0.5 to 10 Watts/meter-Kelvin (W/mK) or any range subsumed therein. For example, alumina powder with 55% packing density (45% fractional porosity) and thermal conductivity in a range of about 1 to 2 (W/mK may be used. In some embodiments, a centrifuge may be used to pack the alumina powder with high density. In an example embodiment, a layer of alumina powder is used with a thickness within the range of about ⅛ mm to 1 mm or any range subsumed therein. Alternatively, a thin layer of a ceramic-based adhesive or an admixture of such adhesives may be used. Depending on the formulation, a wide range of thermal conductivities is available. In practice, once a layer composition is selected having a thermal conductivity close to the desired value, fine-tuning may be accomplished by altering the layer thickness. Some example embodiments may not include a separate layer of material around the bulb 104 and may provide a direct conductive path to the lamp body 102. Alternatively, the bulb 104 may be separated from the lamp body 102 by an air-gap (or other gas filled gap) or vacuum gap.

In example embodiments, a reflective material may be deposited on the inside or outside surface of the bulb 104 adjacent to the lamp body 102, or a reflector may be positioned between the lamp and interface material 134 (see FIG. 2) or a reflector may be embedded inside or positioned below interface material 134 (for example, if interface material 134 is transparent). Alternatively, the interface material 134 may be a reflective material or have a reflective surface. In some embodiments, the interface material 134 may be alumina or other ceramic material and have a polished surface for reflection. In other embodiments, a thin-film, multi-layer dielectric coating may be used. Other materials may be used in other embodiments. In some examples, the reflective surface is provided by a thin-film, multi-layer dielectric coating. In this example, the coating is made of a reflective material that would not prevent microwave power from heating the light-emitting plasma. In this example, tailored, broadband reflectivity over the emission range of the plasma is instead achieved by interference among electromagnetic waves propagating through thin-film layers presenting refractive index changes at length-scales on the order of their wavelength. The number of layers and their individual thicknesses are the primary design variables. See Chapters 5 and 7, H. A. McLeod, "Thin-Film Optical Filters," 3rd edition, Institute of Physics Publishing (2001). For ruggedness in the harsh environment proximate to bulb 104, example coatings may consist of layers of silicon dioxide (SiO.sub.2), which is transparent for wavelengths between 0.12 .mu.m and 4.5 .mu.m. Another example embodiment consists of layers of titanium dioxide (TiO.sub.2), which is transparent to wavelengths between 0.43 .mu.m and 6.2 .mu.m. Example coatings may have approximately 10 to 100 layers with each layer having a thickness in a range between 0.1 .mu.m and 10 .mu.m.

One or more heat sinks may also be used around the sides and/or along the bottom surface of the lamp body 102 to manage temperature. Thermal modeling may be used to help select a lamp configuration providing a high peak plasma temperature resulting in high brightness, while remaining below the working temperature of the bulb material. Example thermal modeling software includes the TAS software package available commercially from Harvard Thermal, Inc. of Harvard, Mass.

An example lamp drive circuit 106 is shown by way of example FIG. 9. The lamp drive circuit 106 is connected to the drive probe 170 inserted into the lamp body 102 to provide RF power to the lamp body 102. In the example of FIG. 9, the lamp 100 is also shown to include the feedback probe 172 inserted into the lamp body 102 to sample power from the lamp body 102 and provide it as feedback to the lamp drive circuit 106. In an example embodiment, the probes 170 and 172 may be brass rods glued into the lamp body 102 using silver paint. In other embodiments, a sheath or jacket of ceramic or other material may be used around the probes 170, 172, which may change the coupling to the lamp body 102. In an example embodiment, a printed circuit board (PCB) may be positioned transverse to the lamp body 102 for the lamp drive circuit 106. The probes 170 and 172 may be soldered to the PCB and extend off the edge of the PCB into the lamp body 102 (parallel to the PCB and orthogonal to the lamp body 102). In other embodiments, the probes 170, 172 may be orthogonal to the PCB or may be connected to the lamp drive circuit 106 through sub-miniature A (SMA) connectors or other connectors. In an alternative embodiment, the probes 170, 172 may be provided by a PCB trace and portions of the PCB containing the trace may extend into the lamp body 102. Other RF feeds may be used in other embodiments, such as microstrip lines or fin line antennas.

Various positions for the probes 170, 172 are possible. The physical principle governing their position is the degree of desired power coupling versus the strength of the E-field in the lamp body 102. For the drive probe 170, the desire is for strong power coupling. Therefore, the drive probe 170 may be located near a field maximum in some embodiments. For the feedback probe 172, the desire is for weak power coupling. Therefore, the feedback probe 172 may be located away from a field maximum in some embodiments.

The lamp drive circuit 106 including a power supply, such as amplifier 210, may be coupled to the drive probe 170 to provide the RF power. The amplifier 210 may be coupled to the drive probe 170 through a matching network 212 to provide impedance matching. In an example embodiment, the lamp drive circuit 106 is matched to the load (formed by the lamp body 102, the bulb 104 and the plasma) for the steady state operating conditions of the lamp 100.

A high efficiency amplifier may have some unstable regions of operation. The amplifier 210 and phase shift imposed by a feedback loop of the lamp circuit 106 should be configured so that the amplifier 210 operates in stable regions even as the load condition of the lamp 100 changes. The phase shift imposed by the feedback loop is determined by the length of the feedback loop (including the matching network 212) and any phase shift imposed by circuit elements, such as a phase shifter 214. At initial startup before the noble gas in the bulb 104 is ignited, the load appears to the amplifier 210 as an open circuit. The load characteristics change as the noble gas ignites, the fill vaporizes, and the plasma heats up to steady state operating conditions. The amplifier 210 and feedback loop may be designed so the amplifier 210 will operate within stable regions across the load conditions that may be presented by the lamp body 102, bulb 104 and plasma. The amplifier 210 may include impedance matching elements such as resistive, capacitive and inductive circuit elements in series and/or in parallel. Similar elements may be used in the matching network. In one example embodiment, the matching network is formed from a selected length of PCB trace that is included in the lamp drive circuit 106 between the amplifier 210 and the drive probe 170. These elements may be selected both for impedance matching and to provide a phase shift in the feedback loop that keeps the amplifier 210 within stable regions of its operation. The phase shifter 214 may be used to provide additional phase shifting as needed to keep the amplifier 210 in stable regions.

The amplifier 210 and phase shift in the feedback loop may be designed by looking at the reflection coefficient Γ, which is a measure of the changing load condition over the various phases of lamp operation, particularly the transition from cold gas at start-up to hot plasma at steady state. Γ, defined with respect to a reference plane at the amplifier output, is the ratio of the "reflected" electric field $E_{in}$ heading into the amplifier 210, to the "outgoing" electric field $E_{out}$ traveling out. Being a ratio of fields, Γ is a complex number with a magnitude and phase. A useful way to depict changing conditions in a system is to use a "polar-chart" plot of Γ's behavior (termed a "load trajectory") on the complex plane. Certain regions of the polar chart may represent unstable regions of operation for the amplifier 210. The amplifier 210 and phase shift in the feedback loop should be designed so the load trajectory does not cross an unstable region. The load trajectory can be rotated on the polar chart by changing the phase shift of the feedback loop (by using the phase shifter 214 and/or adjusting the length of the circuit loop formed by the lamp drive circuit 106 to the extent permitted while maintaining the desired impedance matching). The load trajectory can be shifted radially by changing the magnitude (e.g., by using an attenuator).

In example embodiments, RF power may be provided at a frequency in the range of between about 0.1 GHz and about 10 GHz or any range subsumed therein. The RF power may be provided to the drive probe 170 at or near a resonant frequency for the overall lamp 100. The resonant frequency is most strongly influenced by, and may be selected based on, the dimensions and shapes of all the field concentrating and shaping elements (e.g., the conductive elements 124, 126 and the dipole arms 122). High frequency simulation software may be used to help select the materials and shape of the field concentrating and shaping elements, as well as the lamp body 102 and the electrically conductive coating 120, to achieve desired resonant frequencies and field intensity distribution. Simulations may be performed using software tools such as HFSS, available from Ansoft, Inc. of Pittsburgh, Pa., and FEMLAB, available from COMSOL, Inc. of Burlington, Mass. The desired properties may then be fine-tuned empirically.

In example embodiments, RF power may be provided at a frequency in the range of between about 50 MHz and about 10 GHz or any range subsumed therein. The RF power may be provided to the drive probe 170 at or near a resonant frequency for the overall lamp. The frequency may be selected based primarily on the field concentrating and shaping elements to provide resonance in the lamp (as opposed to being selected primarily based on the dimensions, shape and relative permittivity of the lamp body). In example embodiments, the frequency is selected for a fundamental resonant mode of the lamp 100, although higher order modes may also be used in some embodiments. In example embodiments, the RF power may be applied at a resonant frequency or in a range of from 0% to 10% above or below the resonant frequency or any range subsumed therein. In some embodiments, RF power may be applied in a range of from about 0% to 5% above or below the resonant frequency. In some embodiments, power may be provided at one or more frequencies within the range of about 0 to 50 MHz above or below the resonant frequency or any range subsumed therein. In another example, the power may be provided at one or more frequencies within the resonant bandwidth for at least one resonant mode. The resonant bandwidth is the full frequency width at half maximum of power on either side of the resonant frequency (on a plot of frequency versus power for the resonant cavity).

In example embodiments, the RF power causes a light emitting plasma discharge in the bulb 100. In example embodiments, power is provided by RF wave coupling. In example embodiments, RF power is coupled at a frequency that forms a standing wave in the lamp body 102 (sometimes referred to as a sustained waveform discharge or microwave discharge when using microwave frequencies), although the resonant condition is strongly influenced by the structure formed by the field concentrating and shaping elements, in contrast to lamps where the resonant frequency is determined primarily by the shape, dimensions and relative permittivity of the microwave cavity.

In example embodiments, the amplifier 210 may be operated in multiple operating modes at different bias conditions to improve starting and then to improve overall amplifier efficiency during steady state operation. For example, the amplifier 210 may be biased to operate in Class A/B mode to provide better dynamic range during startup and in Class C mode during steady state operation to provide more efficiency. The amplifier 210 may also have a gain control that can be used to adjust the gain of the amplifier 210. The amplifier 210 may include either a plurality of gain stages or a single stage.

The feedback probe 172 is shown to be coupled to an input of the amplifier 210 through an attenuator 216 and the phase shifter 214. The attenuator 216 is used to adjust the power of the feedback signal to an appropriate level for input to the phase shifter 214. In some example embodiments, a second attenuator may be used between the phase shifter 214 and the amplifier 210 to adjust the power of the signal to an appropriate level for amplification by the amplifier 210. In some embodiments, the attenuator(s) may be variable attenuators controlled by control electronics 218. In other embodiments, the attenuator(s) may be set to a fixed value. In some embodiments, the lamp drive circuit 106 may not include an attenuator. In an example embodiment, the phase shifter 214 may be a voltage-controlled phase shifter controlled by the control electronics 218.

The feedback loop automatically oscillates at a frequency based on the load conditions and phase of the feedback signal. This feedback loop may be used to maintain a resonant condition in the lamp body 102 even though the load conditions change as the plasma is ignited and the temperature of the lamp 100 changes. If the phase is such that constructive interference occurs for waves of a particular frequency circulating through the loop, and if the total response of the loop (including the amplifier 210, the lamp 100, and all connecting elements) at that frequency is such that the wave is amplified rather than attenuated after traversing the loop, the loop will oscillate at that frequency. Whether a particular setting of the phase shifter 214 induces constructive or destructive feedback depends on frequency. The phase shifter 214 can be used to finely tune the frequency of oscillation within the range supported by the lamp's frequency response. In doing so, it also effectively tunes how well RF power is coupled into the lamp 100 because power absorption is frequency-dependent. Thus, the phase shifter 214 may provide fast, finely-tunable control of the lamp output intensity. Both tuning and detuning may be useful. For example, tuning can be used to maximize intensity as component aging changes the overall loop phase; and detuning can be used to control lamp dimming. In some example embodiments, the phase selected for steady state operation may be slightly out of resonance, so maximum brightness is not achieved. This may be used to leave room for the brightness to be increased and/or decreased by the control electronics 218.

In the example lamp drive circuit 106 shown in FIG. 9, the control electronics 218 is connected to the attenuator 216, the phase shifter 214 and the amplifier 210. The control electronics 218 provide signals to adjust the level of attenuation provided by the attenuator 216, the phase of phase shifter 214, the class in which the amplifier 210 operates (e.g., Class A/B, Class B or Class C mode) and/or the gain of the amplifier 210 to control the power provided to the lamp body 102. In one example, the amplifier 210 has three stages, a pre-driver stage, a driver stage, and an output stage, and the control electronics 218 provide a separate signal to each stage (drain voltage for the pre-driver stage and gate bias voltage of the driver stage and the output stage). The drain voltage of the pre-driver stage can be adjusted to adjust the gain of the amplifier 210. The gate bias of the driver stage can be used to turn on or turn off the amplifier 210. The gate bias of the output stage can be used to choose the operating mode of the amplifier 210 (e.g., Class A/B, Class B or Class C). The control electronics 218 can range from a simple analog feedback circuit to a microprocessor/microcontroller with embedded software or firmware that controls the operation of the lamp drive circuit 106. The control electronics 218 may include a lookup table or other memory that contains control parameters (e.g., amount of phase shift or amplifier gain) to be used when certain operating conditions are detected. In example embodiments, feedback information regarding the lamp's light output intensity is provided either directly by the optical sensor 220 (e.g., a silicon photodiode sensitive in the visible wavelengths) or indirectly by the RF power sensor 222 (e.g., a rectifier). The RF power sensor 222 may be used to determine forward power, reflected power or net power at the drive probe 170 to determine the operating status of the lamp 100. Matching network 212 may be designed to also include a directional coupler section, which may be used to tap a small portion of the power and feed it to the RF power sensor 222.

The RF power sensor 222 may also be coupled to the lamp drive circuit 106 at the feedback probe 172 to detect transmitted power for this purpose. In some example embodiments, the control electronics 218 may adjust the phase shifter 214 on an ongoing basis to automatically maintain desired operating conditions.

The phase of the phase shifter 214 and/or gain of the amplifier 210 may also be adjusted after startup to change the operating conditions of the lamp 100. For example, the power input to the plasma in the bulb 104 may be modulated to modulate the intensity of light emitted by the plasma. This can be used for brightness adjustment or to modulate the light to adjust for video effects in a projection display. For example, a projection display system may use a microdisplay that controls intensity of the projected image using pulse-width modulation (PWM). PWM achieves proportional modulation of the intensity of any particular pixel by controlling, for each displayed frame, the fraction of time spent in either the "ON" or "OFF" state. By reducing the brightness of the lamp 100 during dark frames of video, a larger range of PWM values may be used to distinguish shades within the frame of video. The brightness of the lamp 100 may also be modulated during particular color segments of a color wheel for color balancing or to compensate for green snow effect in dark scenes by reducing the brightness of the lamp 100 during the green segment of the color wheel.

In another example embodiment, the phase shifter 214 can be modulated to spread the power provided by the lamp circuit 106 over a larger bandwidth. This can reduce EMI at any one frequency and thereby help with compliance with Federal Communications Commission (FCC) regulations regarding EMI. In example embodiments, the degree of spectral spreading may be from 5% to 30% or any range subsumed therein. In one example embodiment, the control electronics 218 may include circuitry to generate a sawtooth voltage signal and sum it with the control voltage signal to be applied to the phase shifter 214. In another example, the control electronics 218 may include a microcontroller that generates a Pulse Width Modulated (PWM) signal that is passed through an external low-pass filter to generate a modulated control voltage signal to be applied to the phase shifter 214. In example embodiments, the modulation of the phase shifter 214 can be provided at a level that is effective in reducing EMI without any significant impact on the plasma in the bulb 104.

In example embodiments, the amplifier 210 may also be operated at different bias conditions during different modes of operation for the lamp 100. The bias condition of the amplifier 210 may have a large impact on DC-RF efficiency. For example, an amplifier biased to operate in Class C mode is more efficient than an amplifier biased to operate in Class B mode, which in turn is more efficient than an amplifier biased to operate in Class A/B mode. However, an amplifier biased to operate in Class A/B mode has a better dynamic range than an amplifier biased to operate in Class B mode, which in turn has better dynamic range than an amplifier biased to operate in Class C mode.

In one example, when the lamp 100 is first turned on, the amplifier 210 is biased in a Class A/B mode. Class A/B provides better dynamic range and more gain to allow amplifier 210 to ignite the plasma and to follow the resonant frequency of the lamp 100 as it adjusts during startup. Once the lamp 100 reaches full brightness, amplifier bias is removed, which puts amplifier 210 into a Class C mode. This may provide improved efficiency. However, the dynamic range in Class C mode may not be sufficient when the brightness of the lamp 100 is modulated below a certain level (e.g., less than about 70% of full brightness). When the brightness is lowered below the threshold, the amplifier 210 may be changed back to Class A/B mode. Alternatively, Class B mode may be used in some embodiments.

Figure 10A:
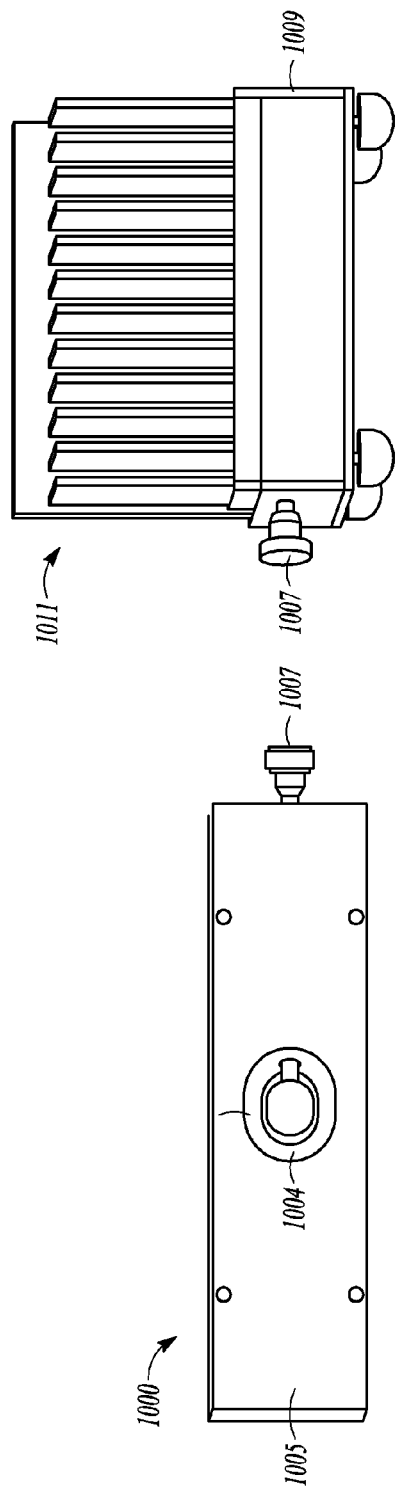
FIGS. 10A, 10B, 11A, 11B, 11C, and 11D show an example embodiment of a lamp designed to operate at 150 MHz.
Figure 10B:
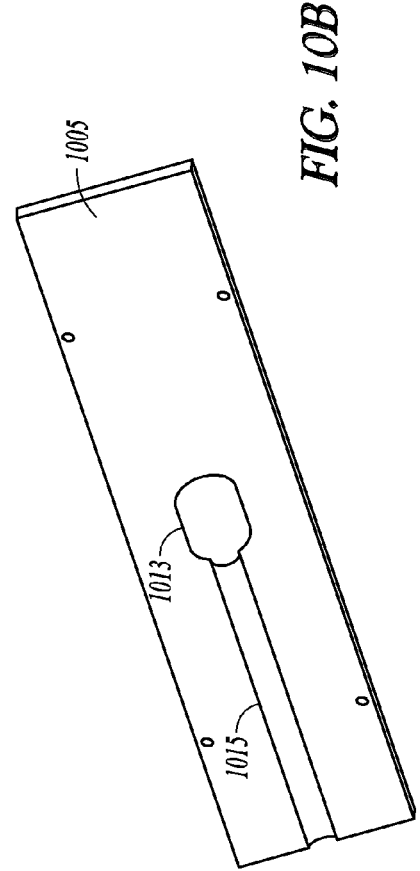
Figure 11A:
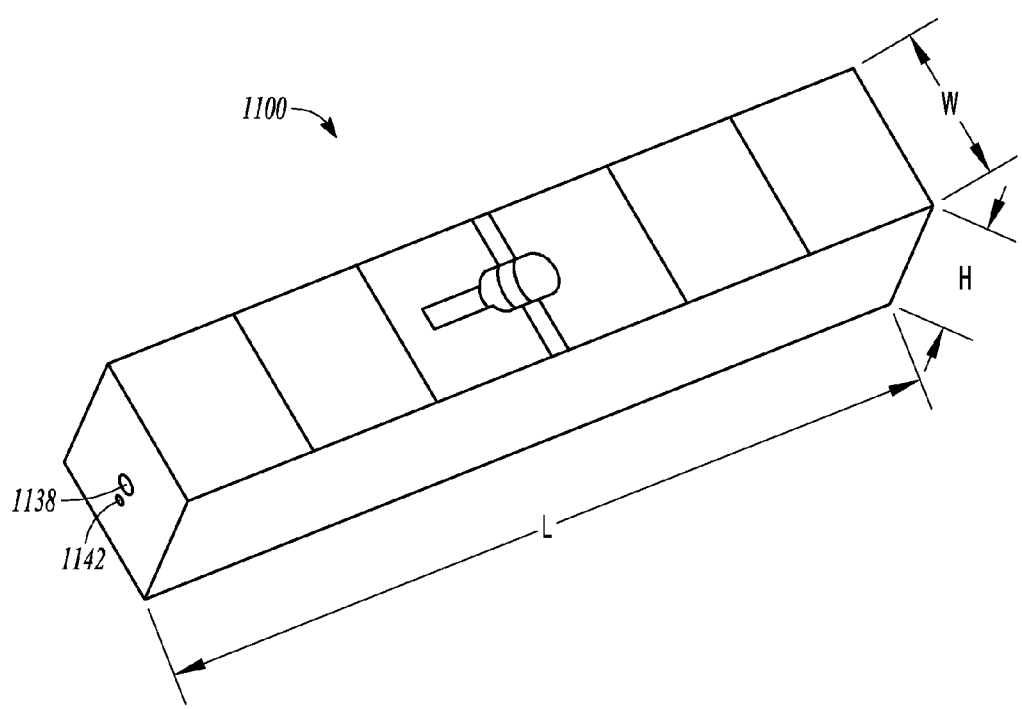

FIGS. 10A-B and 11A-D show another example embodiment. The example in FIGS. 10 and 11 is designed to operate at about 150 MHz, which permits use of a high efficiency amplifier. In example embodiments, the amplifier may have an efficiency of 80% or 90% or more. The example lamp 1000 has a lamp body separate from the drive circuit and electronics. The drive circuit (including voltage controlled oscillator, amplifier, microprocessor and printed circuit board) are enclosed in a separate housing 1009 with a heat sink 1011. Power is provided from the drive circuit to the probe of the lamp body through a coaxial cable. The connectors for the coaxial cable are shown at 1007. The power is provided into the lamp body and is received by the resonant antenna structure in the lamp body. The power is coupled by the antenna structure to the bulb 1004. The lamp body is a ceramic material such as alumina or other solid dielectric material in this example. The lamp body acts as a heat sink for the bulb as well as a conduit for power from the probe to the bulb. The lamp body is enclosed in a metal housing. The front cover 1005 of the housing is shown in FIG. 10A and has a cutout (shown at 1013 in FIG. 10B) to allow light to escape from the bulb. FIG. 10B shows the back side of the front cover 1005. The cover has a groove 1015 to receive the tail of the bulb, which helps align and mount the bulb. In some embodiments, the groove may also provide a channel for light to be sensed by a photodiode or other photosensor. Light travels through the tail into the groove where it may be sensed.

FIG. 11A shows the dielectric lamp body 1100. The conductive elements (corresponding to 124 and 126 in FIG. 1) are formed by a bore 1138 in the lamp body that is coated with a conductive material. The bore is centered 22.5 mm from the top of the lamp body and has a diameter of about 5 mm. Another opening 1142 is also formed for receiving the probe that provides the RF power to the lamp body. The opening 1142 is about 29.5 mm from the top surface and has a diameter of about 2.5 mm. In one example, lamp body 1100 is designed to operate at about 150 MHz. In this example, the lamp body has a length L of about 180 mm, a width W of about 35 mm and a height H of about 45 mm. This length is used to provide a length for conductive elements (formed by bore 1138 and a corresponding bore on the other side) that will provide a resonant structure at about 150 MHz. In this example, the length L is more than three times the width W or height H. In other embodiments, the width W or height H or other dimensions of the conductive elements and lamp body may be adjusted to provide for different lengths L. High frequency simulation software may be used to determine the combination of dimensions to provide a resonant structure at the desired frequency. In this embodiment, the volume of the lamp body is about 283 cm$^3$ and the bulb volume may be in the range of about 500 to 1500 mm$^3$. In this example, the bulb has a volume more than one hundred times less than the lamp body. In other examples, the lamp may have a volume in the range of from about 100 cm$^3$ to 1000 cm$^3$ and may operate at frequencies of 300 MHz or less down to 30 MHz or less or any range subsumed therein. At lower frequencies, lumped elements may be combined with the lamp body to add capacitance and inductance to reduce frequency while maintaining a small size.

Figure 11D:
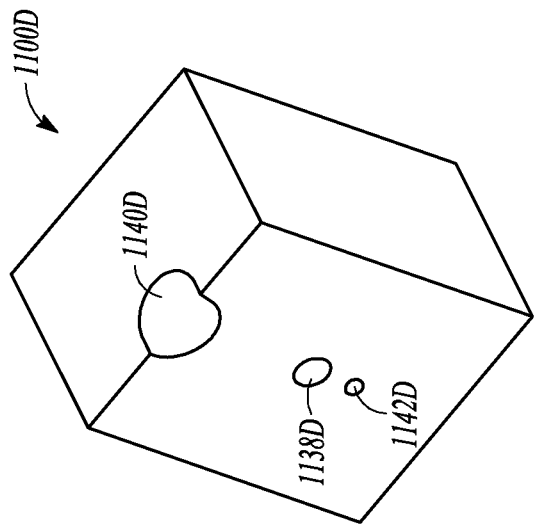
Figure 11C:
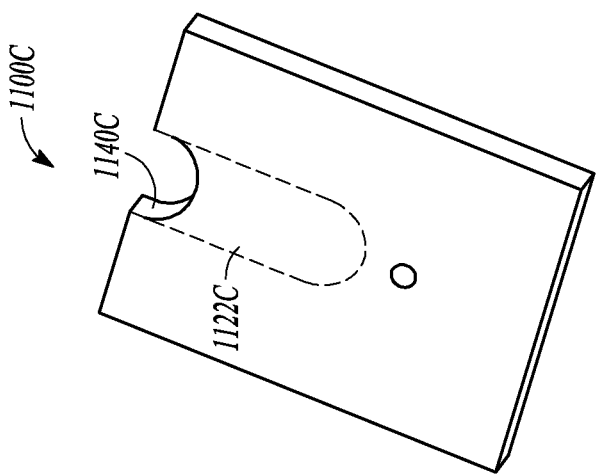
Figure 11B:
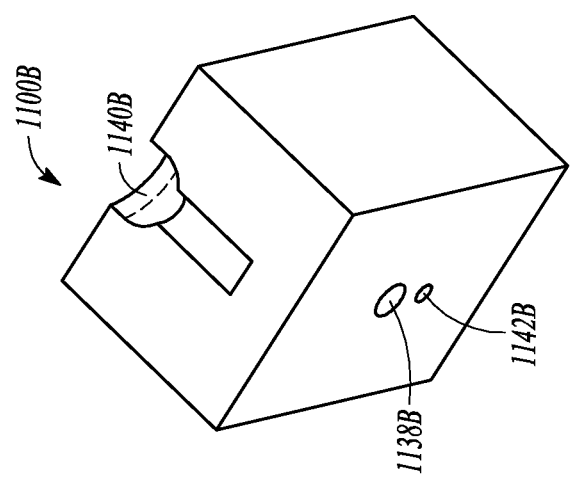

Lamp body 1100 is assembled from seven pieces of alumina (or other ceramic or solid dielectric material). The two pieces on each end have through holes for bore 1138 and probe opening 1142. The pieces have a length of about 30 mm. The three center pieces are shown in FIGS. 11B, 11C and 11D. Section 1100B has a conductive antenna electrode 1140B and a conductive top surface, separated by a small gap of about 2 mm. The length is about 28 mm. The conductive antenna electrode 1140B has a width of about 10 mm and a length of about 7 mm (a 2 mm section ending in a 5 mm radius). The center section 1100C has a length of about 4 mm and is not coated in the recess that separates the electrodes 1140B and 1140D. The surface 1122C (and the opposing surface) is coated to provide the central section of the dipole antenna structure and makes an electrical connection with the bore holes in sections 1100B and 1100C. The coated region extends about 25 mm down from the top surface and ends in a 5 mm radius portion. Section 1100C has a conductive antenna electrode 1140C and a conductive top surface, separated by a small gap of about 2 mm. The length is about 28 mm. The conductive antenna electrode 1140C has a width of about 10 mm and a length of about 7 mm (a 2 mm section ending in a 5 mm radius).

Figure 13A:
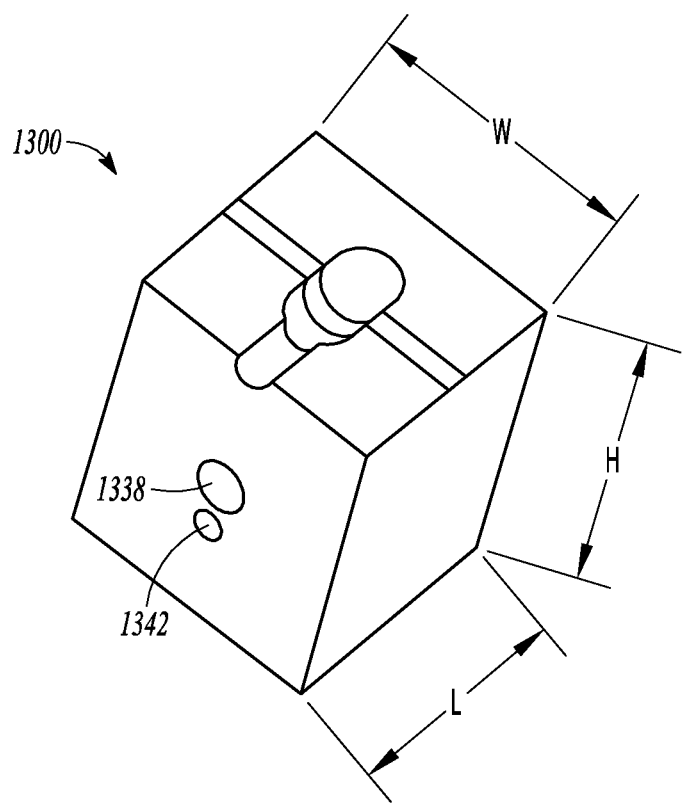
FIGS. 13A, 13B, 13C, and 13D show an example embodiment of a lamp designed to operate at 450 MHz.

FIG. 13A shows a lamp body 1300, according to another example embodiment. The lamp body is designed to operate at 450 MHz and may be used with amplifiers having efficiency of more than 70%, 75% or 80% in some embodiments. The lamp body 1300 is assembled from three sections of alumina (or other ceramic or solid dielectric material). The length L is about 33 mm, the width W is about 35 mm and the height H is about 45 mm. The bore 1338 is about 22 mm from the top surface and has a diameter of about 6 mm. The probe opening 1342 is about 29 mm from the top surface and has a diameter of about 2.5 mm. In this example, the length L is less than the height H and width W. In this example, the volume of the lamp body is about 51.98 cm$^3$. In other examples, frequencies between 300 to 600 MHz may be used with volumes in the range of about 30 cm$^3$ to 100 cm$^3$.

Figure 13D:
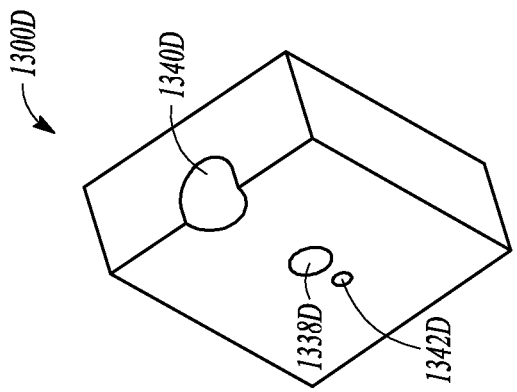
Figure 13C:
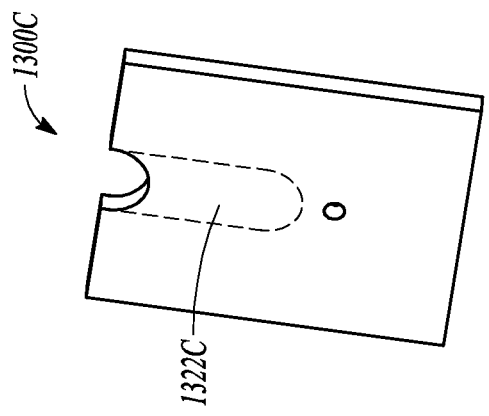
Figure 13B:
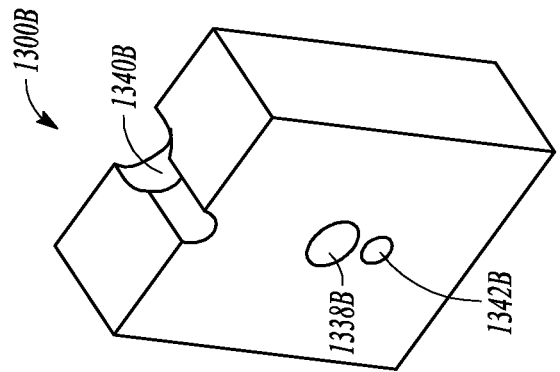

The sections of lamp 1300 are shown in FIGS. 13B, 13C, and 13D. Section 1300B has a conductive antenna electrode 1340B and a conductive top surface, separated by a small gap of about 2 mm. The length is about 15 mm. The center section 1300C has a length of about 3 mm and is not coated in the recess that separates the electrodes 1340B and 1340D. The surface 1322C (and the opposing surface) is coated to provide the central section of the dipole antenna structure and makes an electrical connection with the bore holes in sections 1300B and 1300C. The coated region extends about 25 mm down from the top surface and ends in a 4.5 mm radius portion. The bulb recess is about 9 mm wide. Section 1300D has a conductive antenna electrode 1340D and a conductive top surface, separated by a small gap of about 2 mm. The length is about 15 mm.

Figure 12:
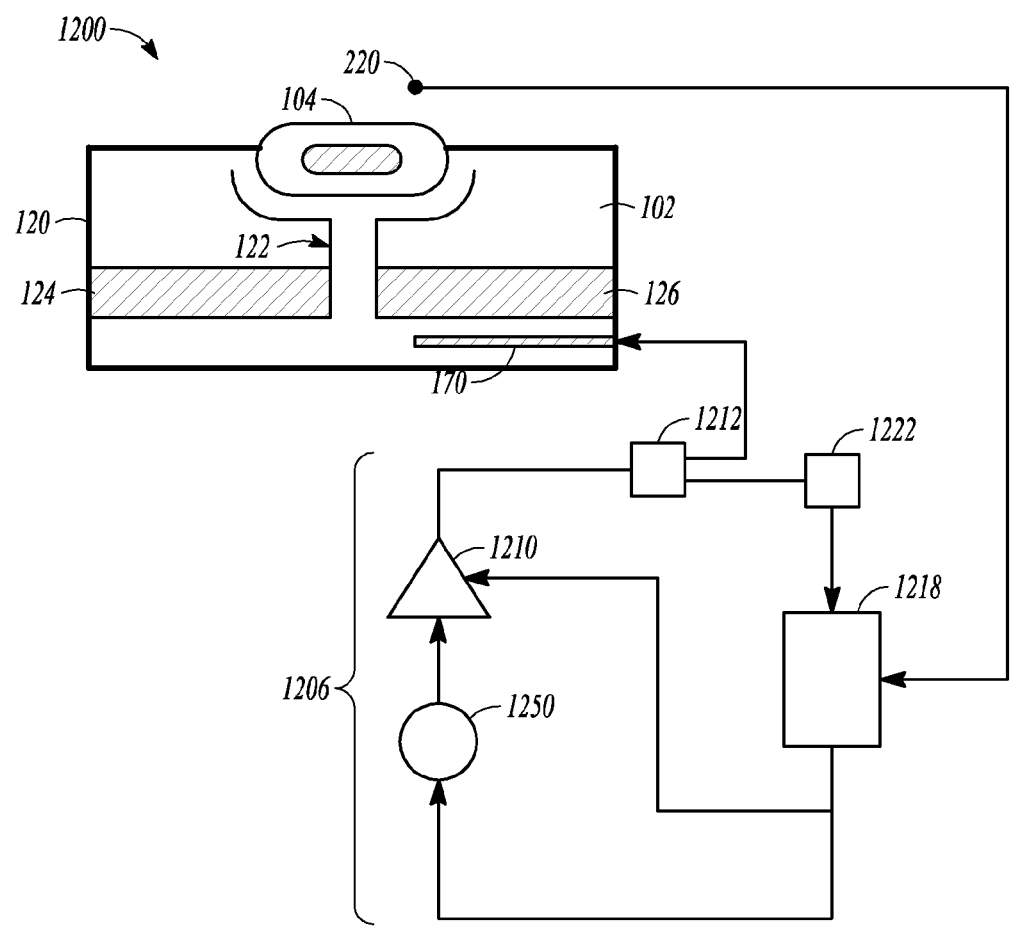
FIG. 12 is a schematic diagram of an example lamp and lamp drive circuit according to an example embodiment.

FIG. 12 is a cross-sectional view of a lamp 1200, according to another example embodiment. The lamp 1200 is similar to the lamp of FIG. 9 except that it does not have a feedback probe and uses a different power circuit. The lamp 1200 includes a bulb 104, a lamp body 102, conductive elements 124 and 126, an electrically conductive coating 120, dipole arms 122, a drive probe 170 and a sensor 220. As shown in FIG. 12, a lamp drive circuit 1206 is shown to include an oscillator 1250 and an amplifier 1210 (or other source of RF power) that may be used to provide RF power to the drive probe 170. The drive probe 170 is embedded in the solid dielectric body of the lamp 1200. Control electronics 1218 control the frequency and power level provided to the drive probe 170. Control electronics 1218 may include a microprocessor or microcontroller and memory or other circuitry to control the lamp drive circuit 1206. The control electronics 1218 may cause power to be provided at a first frequency and power level for initial ignition, a second frequency and power level for startup after initial ignition, and a third frequency and power level when the lamp 1200 reaches steady state operation. In some example embodiments, additional frequencies may be provided to match the changing conditions of the load during startup and heat up of the plasma. For example, in some embodiments, more than sixteen different frequencies may be stored in a lookup table, and the lamp 1200 may cycle through the different frequencies at preset times to match the anticipated changes in the load conditions. In other embodiments, the frequency may be adjusted based on detected lamp operating conditions. The control electronics 1218 may include a lookup table or other memory that contains control parameters (e.g., frequency settings) to be used when certain operating conditions are detected. In example embodiments, feedback information regarding the lamp's light output intensity is provided either directly by an optical sensor 220 (e.g., a silicon photodiode sensitive in the visible wavelengths) or indirectly by an RF power sensor 1222 (e.g., a rectifier). The RF power sensor 1222 may be used to determine forward power, reflected power, or net power at the drive probe 170 to determine the operating status of the lamp 1200. A directional coupler 1212 may be used to tap a small portion of the power and feed it to the RF power sensor 1222. In some embodiments, the control electronics 1218 may adjust the frequency of the oscillator 1250 on an ongoing basis to maintain automatically desired operating conditions. For example, reflected power may be minimized in some embodiments, and the control electronics 1218 may rapidly toggle the frequency to determine whether an increase or decrease in frequency will decrease reflected power. In other examples, a brightness level may be maintained and the control electronics 1218 may rapidly toggle the frequency to determine whether the frequency should be increased or decreased to adjust for changes in brightness detected by sensor 220.

Figure 14:
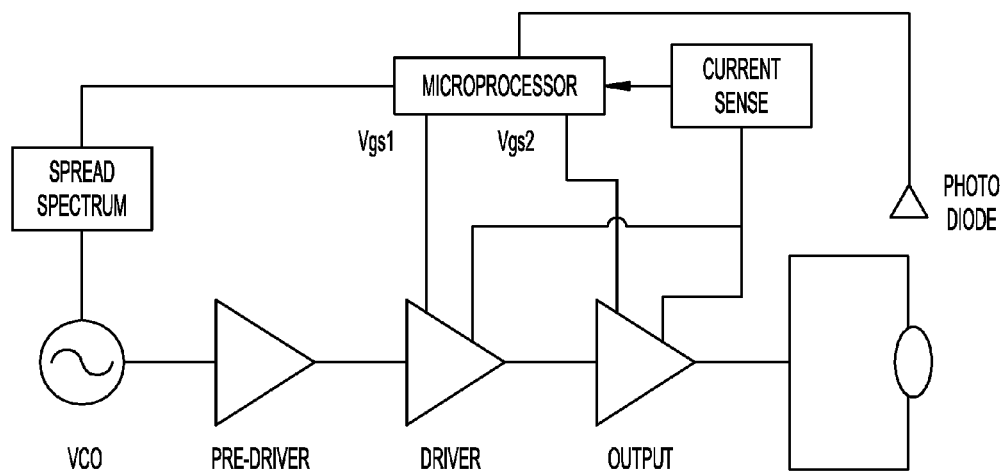
FIG. 14 is a schematic diagram of an example lamp drive circuit, according to an example embodiment.

FIG. 14 shows another lamp driver circuit that can be used with example embodiments. In some examples, the drive circuit shown in FIG. 14 is used with lamps of the type shown in FIGS. 10, 11 and 13. As shown in FIG. 14, the circuit has a voltage controlled oscillator (VCO) that provides RF power at a desired frequency. The RF power is provided to a three stage amplifier (shown as pre-driver, driver and output stages in FIG. 14). The amplified RF power is provided from the output stage to the probe inserted into the lamp body. A current sense circuit samples current in the drive circuit and provides information regarding the current to a microprocessor. A photodiode senses light output from the bulb and provides information regarding the light intensity to the microprocessor. The microprocessor uses these inputs to control the gain Vgs1 and Vgs2 of the driver stage and output stage of the amplifier. The microprocessor also uses this information to control the frequency of the VCO. A spread spectrum circuit between the microprocessor and VCO can be used to adjust the signal to the VCO to spread the frequencies over a range to reduce EMI, as described above. However, instead of using a phase shifter to spread the power, the signal to the VCO is modulated.

During ignition, the microprocessor in FIG. 14 ramps the VCO through a series of frequencies until ignition is detected from the photodiode. The microprocessor also adjusts Vgs1 and Vgs2 based on the current sense to maintain the desired current level in the circuit. Once a threshold level of light is detected indicating ignition, the microprocessor enters a warm up state. During warm up, the microprocessor ramps the VCO frequency down through a pre-defined range and keeps track of the light output intensity from the photodiode at each frequency. It then adjusts the frequency to the level determined to have the highest intensity. Once the photodiode senses another threshold level of light indicating completion of warm up, the microprocessor enters run state. In run state, the microprocessor adjusts the frequency up and down in small increments to determine whether the frequency should be adjusted to achieve a target light level with the minimum current. The lamp can also be dimmed to low light levels less than 10%, 5% or 1% of peak brightness or even less in some embodiments. Upon receiving the dimming command, the microprocessor can adjust Vgs1 and Vgs2 to adjust the gain of the amplifiers to dim the lamp. The microprocessor also continues to make small adjustments in frequency to optimize the frequency for the new target light output level.

Figure 15:
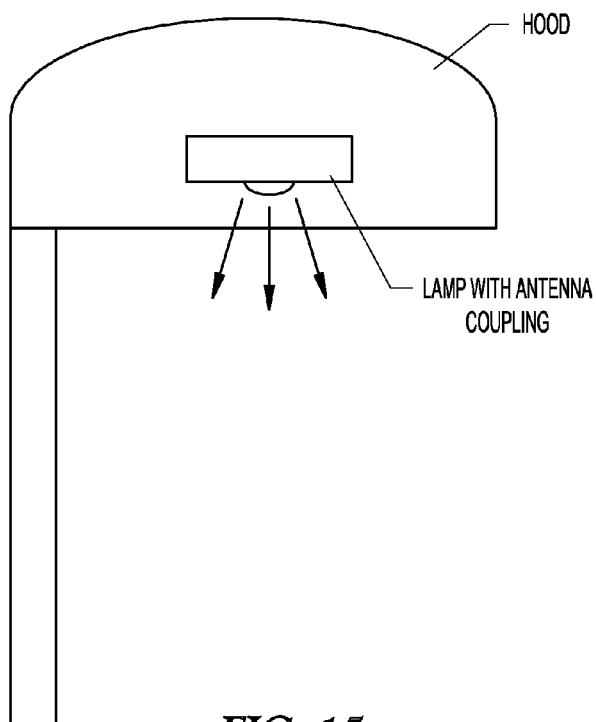
FIG. 15 shows a lamp fixture with a hood for street or area lighting that includes a lamp, according to an example embodiment.

Example embodiments may be used in connection with street and area lighting fixtures. In example embodiments, lamps as shown in FIGS. 11 and 13 are used in connection with street or area lighting fixtures that are directional, such as overhead fixtures with a hood that directs light toward the ground, an example of which is shown in FIG. 15. Some of these fixtures may have a fixture efficiency with conventional metal halide arc lamps of less than 60% or less than 50%. In many cases, the light from a conventional bulb may not be highly directional, but the fixture may be directional. In these fixtures, where the light is directional due to a hood or other cover, using a lamp as shown in FIG. 11 or 13 instead of a conventional bulb can achieve fixture efficiency of more than 80% or 90%. Fixture efficiency is measured as the amount of light output from the lamp relative to the amount of light output from the fixture on the target area. In addition, lamp efficiency for example lamps may exceed 120 or 130 lumens per watt (measured as lumens output per watt input to the lamp from the ballast or amplifier). As a result a high lamp and fixture efficiency can be achieved for directional street and area lighting fixture by using lamps according to example embodiments.

Figure 16A:
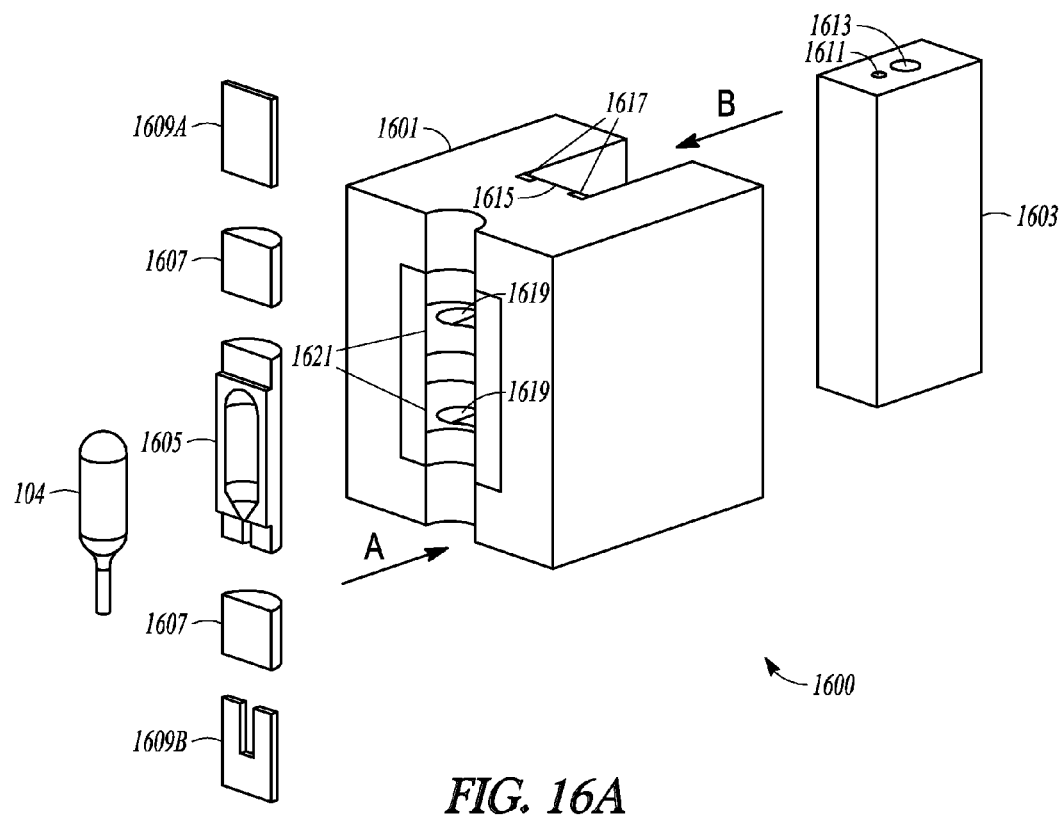
FIG. 16A shows a perspective exploded view and two elevational views of a lamp body, according to another example embodiment, and a bulb positioned vertically relative to an outer vertical front surface of the lamp body.
Figure 16A:
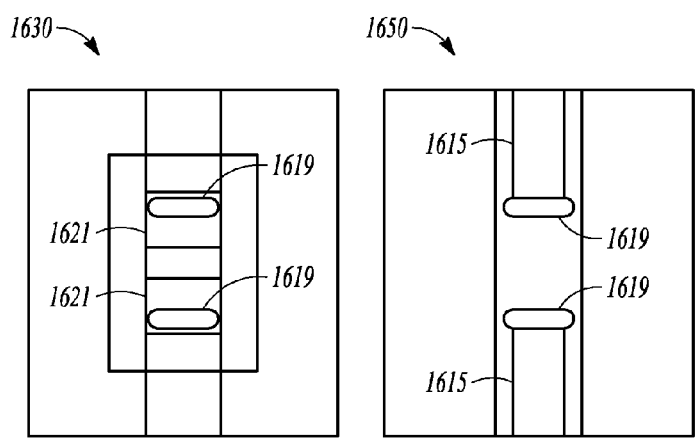

With reference now to FIG. 16A, a perspective exploded view 1600 of a lamp body is shown to include a one-piece puck 1601, an insert component in the example form of a probe insert 1603, a powder insert 1605 (i.e., a bulb insert), upper and lower cement features 1607, an upper cover plate 1609A, and a lower cover plate 1609B. The longitudinal axis of the bulb 104 is shown to be positioned in parallel to the front vertical face of the one-piece puck 1601. The puck 1601 is shown to be a unitary body. The example unitary body shown in FIG. 16A is therefore in contrast to the multiple piece lamp body shown and described above with reference to, for example, FIGS. 2, 3, and 4. A front elevational view 1630 of FIG. 16AA shows the front vertical (or upper) face of the lamp body as viewed from position "A" in the perspective exploded view 1600. Similarly, a rear elevational view 1650 shows the rear vertical (or lower) face of the lamp body as viewed from position "B."

The one-piece puck 1601 may be formed from, for example, alumina ($Al_2O_3$) or various other ceramic or dielectric materials described herein or known independently in the art. In an example embodiment, the alumina may be doped with titanium dioxide ($TiO_2$) or various other types of metal oxide dopants. The doping increases stability of the permittivity of the alumina over a wide temperature range that the lamp body may experience. For example, a wall temperature of the bulb can operate in a range of 700° C. to over 1000° C. Doping the alumina can stabilize the permittivity of the alumina from ambient room temperature (e.g., 20° C.) to the high temperatures encountered during operation of the lamp. In a specific example embodiment, the alumina is doped with 1% to 2%, by weight, of $TiO_2$.

The powder insert 1605 either may be pre-formed to form partially around the bulb 104 or may simply be a powdered material (e.g., Al$_2$O$_3$) that is later sintered in place once the lamp body is assembled. The powder insert 1605 can be adhered to the one-piece puck 1601 by the upper and lower cement features 1607 using a variety of high-temperature adhesive materials. The upper and lower cement features 1607 are then adhered to the one-piece puck 1601 and covered by the upper cover plate 1609A and the lower cover plate 1609B. As shown in FIG. 16A, the lower cover plate 1609B is notched to accept the tail of the bulb 104.

The one-piece puck 1601 includes electrically conductive strips 1615 allowing RF power to be conducted to a pair of oval slots 1619. The pair of oval slots 1619 are either internally coated or filled with an electrically conductive material to conduct the RF power to a conductive element 1621, for example, forming a dipole antenna. The conductive element 1621 may be formed by an electrically conductive coating and is formed to be proximate to the bulb 104, thus coupling the RF power to the bulb 104.

The electrically conductive coating or plating forming the electrically conductive strips 1615, the pair of oval slots 1619, and the conductive coating 1621 can be formed from a variety of electrically conductive coatings such as, for example, silver paint. Other types of electrically conductive coatings and metallization techniques known independently in the art may be used in other example embodiments. The coatings may be applied by brushing, spraying, sputtering, physical vapor deposition (PVD), or a variety of other techniques.

With continued reference to FIG. 16A, although the pair of oval slots 1619 is shown by way of example to be elliptical in cross-section, they may be formed to be of a variety of arbitrary cross-sectional shapes including circular, square, and rectangular. If the pair of oval slots 1619 is not entirely filled with an electrically conducting material but are internally plated or coated, they may be later filled with a dielectric material, such as alumina. In an example embodiment, the pair of oval slots 1619 has cross-sectional dimensions of approximately 3 mm in height and approximately 5 mm in width. In other embodiments, the pair of oval slots 1619 has cross-sectional dimensions of approximately 1 mm to 5 mm in height, 1 mm to 5 mm in width, and any dimension subsumed or included within this range.

The probe insert 1603 is shown to include a probe hole 1611 and an optional tuning hole 1613. The probe insert 1603 may be fabricated from, for example, alumina or another dielectric material with a same or different permittivity than the material used to form the one-piece puck 1601. The probe hole 1611 may be shaped and sized to accept the drive probe 170 (or any other RF feed) and/or, optionally, the feedback probe 172, discussed above (see, e.g., FIG. 9). Although not shown, one or more additional probe holes or tuning holes may optionally be added to the probe insert 1603 as well. The optional tuning hole 1613 is arranged to receive a non-ferrous tuning mechanism to adjust the resonant frequency of the lamp body. The tuning mechanism is described by way of example with reference to FIGS. 17A and 17B, below.

The one-piece puck 1601 of FIG. 16A is also shown to include a pair of notch areas 1617. The pair of notch areas 1617 provides an additional mechanism, optionally in combination with the tuning hole 1613, to adjust an input impedance and a resonant frequency of the one-piece puck 1601 to a selected operational frequency of the lamp as described herein. In an example embodiment, the one-piece puck 1601 is coated with an electrically conductive coating, and the one-piece puck 1601 may thus form a resonant waveguide. In an example embodiment, by removing small portions of the one-piece puck 1601 within the pair of notch areas 1617 (i.e., on either side of the electrically conductive strips 1615), the effective length of the electrically conductive strips 1615 is increased. As the effective length of the electrically conductive strips 1615 is increased in an example embodiment, a resonant frequency of the one-piece puck 1601 is reduced by approximately 10 MHz for every millimeter of effective length increase. Thus, in an example embodiment, the resonant frequency of the one-piece puck 1601 can be reduced by 30 MHz simply by removing three millimeters of material from the one-piece puck 1601 within the notch areas 1617. The material need only be removed near the corner of the one-piece puck 1601 within the notch areas 1617 and does not need to be "trenched" for the entire height of the one-piece puck 1601. Techniques for removing the material include, for example, laser ablation or mechanical grinding or cutting. Consequently, in an example embodiment, the resonant frequency of the lamp body may be fine-tuned by approximately 10 MHz for every millimeter of effective increased length of the electrically conductive strips 1615. Therefore, the one-piece puck 1601 can deliberately be designed to be slightly above a desired resonant frequency of the lamp and can be fine-tuned simply by removing material within the notch areas 1617. Additionally, the lamp can be fine-tuned to meet governmental and other regulatory requirements for RF operating characteristics. For example, the industrial, scientific, and medical (ISM) bands are defined by the International Telecommunications Union (ITU, based in Geneva, Switzerland) to give portions of bandwidth to applications using RF technology that are generally recognized as useful to society. ISM devices can radiate freely only within those bands, so precise frequency tuning may be used to ensure compliance. If the lamp body is not operating in accordance with the ISM bands, the resonant frequency can be tuned as necessary.

Figure 16B:
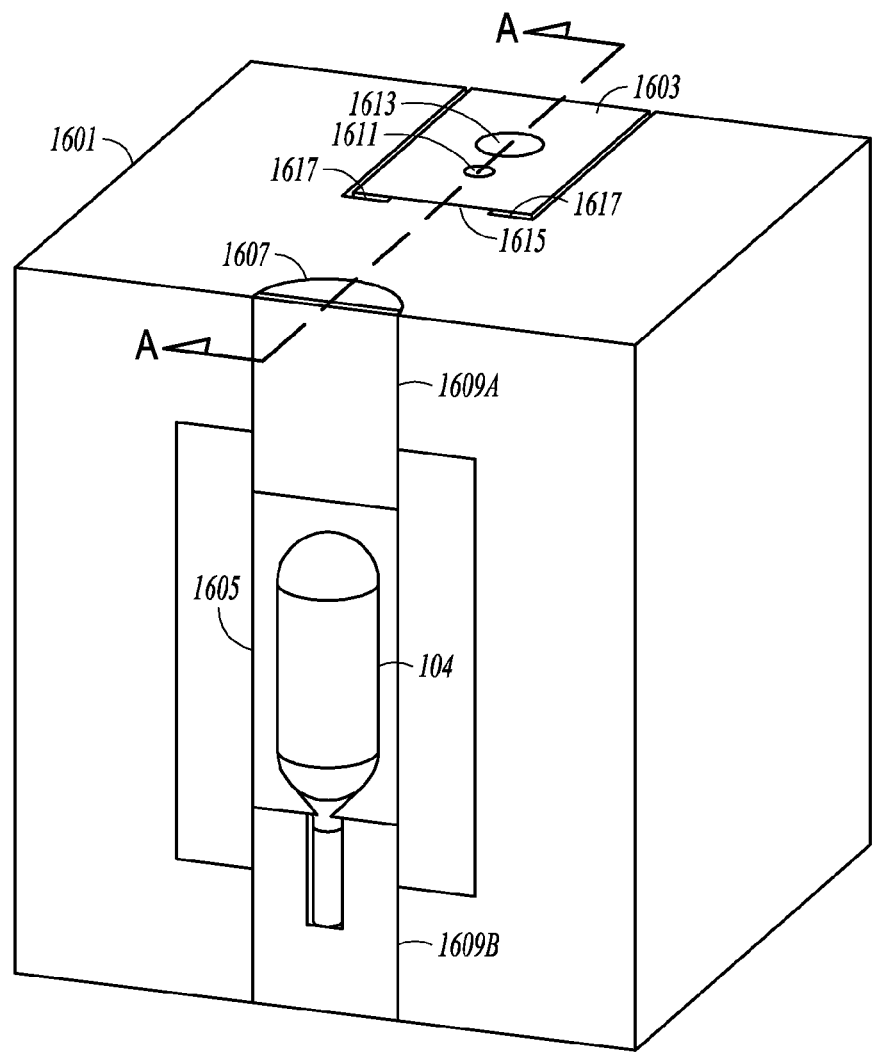
FIG. 16B shows a perspective assembled view of the lamp body of FIG. 16A.
Figure 16C:
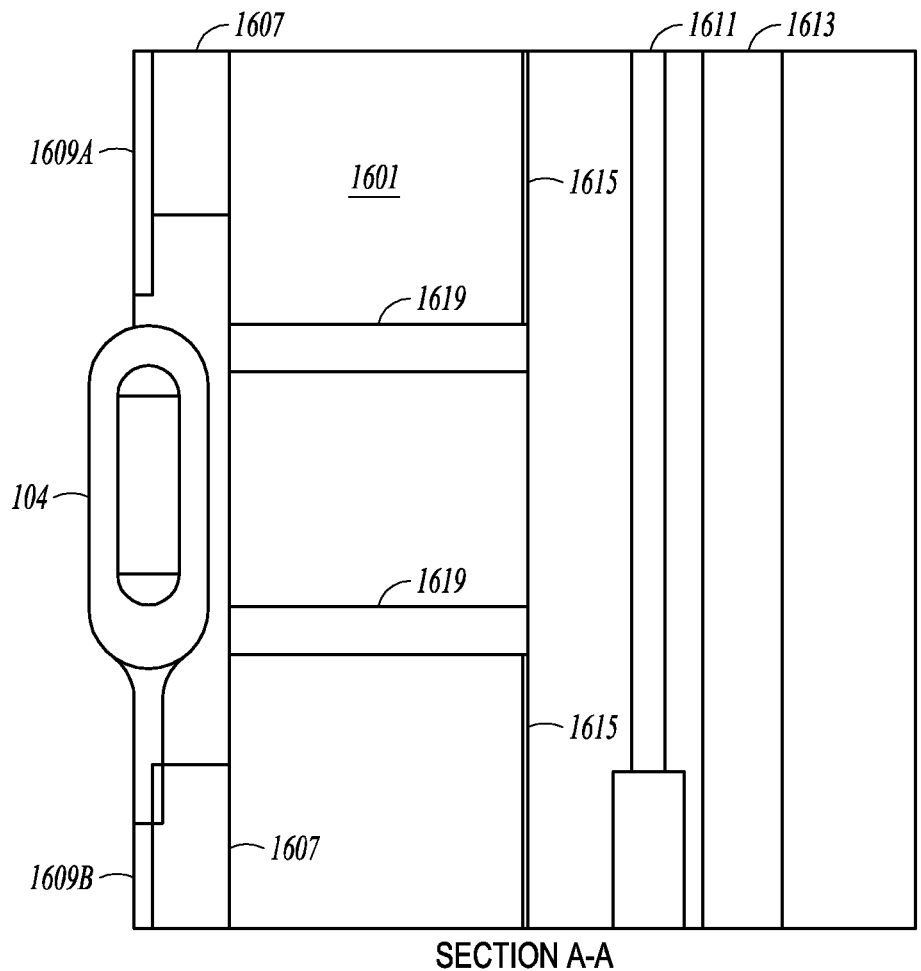
FIG. 16C shows a cross-sectional view of the assembled lamp body of FIG. 16B taken at section A-A.

Referring now to FIG. 16B, a perspective view of the lamp body of FIG. 16A is shown after the various portions described above are assembled. The probe insert 1603 has been adhered (e.g., by cement or other high-temperature adhesive) to the one-piece puck 1601. Arrows on FIG. 16B indicate a section A-A viewed from the right side (with relation to the bulb being oriented towards the front as indicated) of the one-piece puck 1601. FIG. 16C shows the cross-sectional view of the assembled lamp body of FIG. 16B.

Figure 17A:
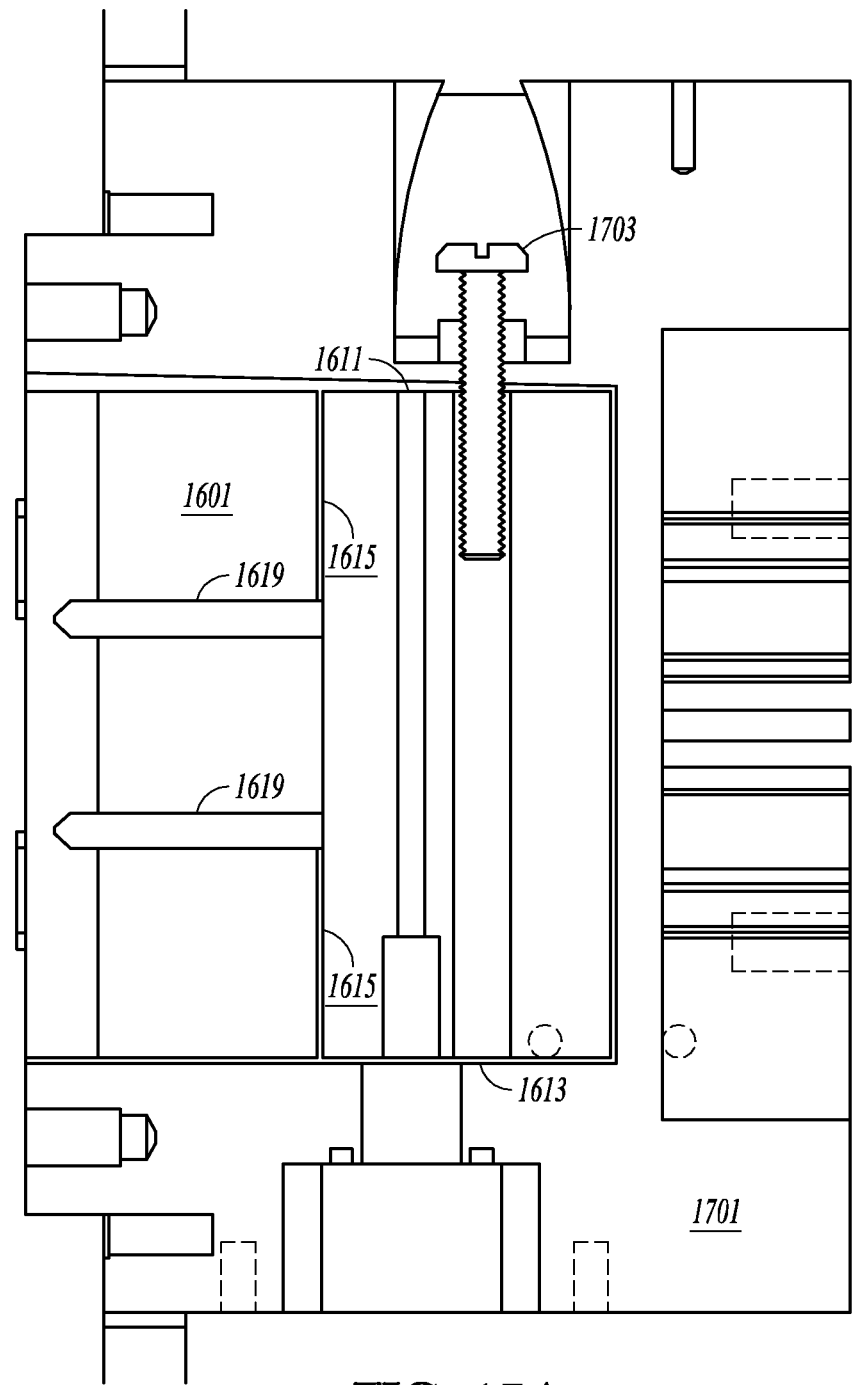
FIG. 17A shows a cross-sectional view of the assembled lamp body of FIG. 16B mounted in a heat sink with an optional tuning mechanism.

FIG. 17A shows a cross-sectional view of the assembled lamp body of FIG. 16B mounted to a heat sink 1701. An optional tuning mechanism 1703 is shown to be partially inserted into the tuning hole 1613. The tuning mechanism 1703 is physically mounted to a portion of the heat sink 1701. An example effect of the tuning mechanism 1703 is discussed with reference to FIG. 17B, below.

In an example embodiment, the tuning mechanism 1703 is an M4 brass screw held in place by one or more Belleville washers or springs (not shown). The Belleville washer provides a pre-load on the tuning mechanism 1703, thereby at least reducing any mechanical backlash effects. In other example embodiments, standard wave washers or compression springs mounted concentric with the tuning mechanism 1703 may be employed as a pre-load device. One or more concentric nuts may be used in conjunction with the tuning mechanism 1703 to lock firmly the tuning mechanism 1703 once either a desired input impedance or resonant frequency has been achieved.

The tuning mechanism 1703 can be formed or machined from any non-ferrous metal, such as brass, or brass plated with, for example, silver or another non-oxidizing, non-ferrous metal coating. The tuning mechanism 1703 can also be formed from non-metallic materials plated or otherwise coated with a non-ferrous metallic coating. For example, the tuning mechanism 1703 can be fabricated from a nylon screw plated with silver or another non- or low-oxidizing coating. Although FIG. 17A indicates that the tuning mechanism 1703 is formed, by way of example, with a head (e.g., a cross-slotted oval or pan head), the head may have little if any affect on either the input impedance or the resonant frequency and is, therefore, not necessary in all embodiments. Additionally, the tuning mechanism need not be threaded and may simply be a non-ferrous rod or dielectric rod with a non-ferrous coating that can be positioned within the tuning hole 1613.

Figure 17B:
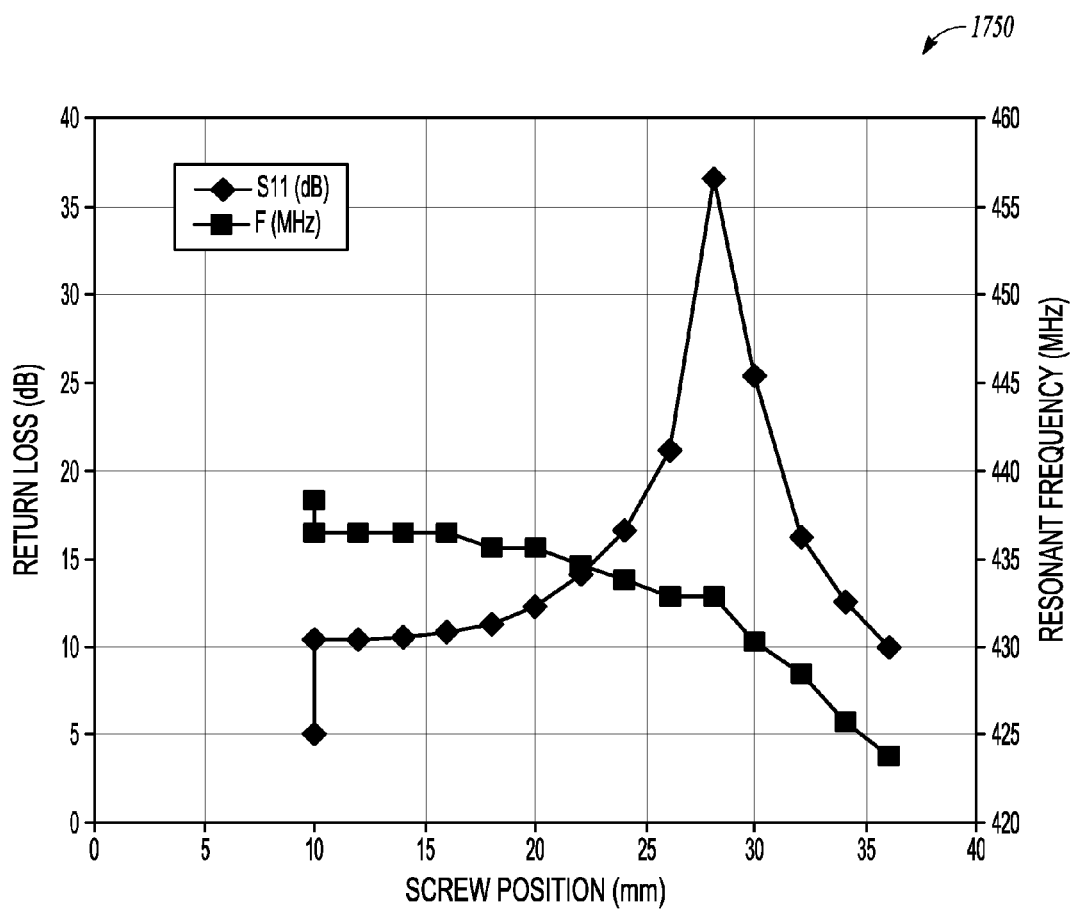
FIG. 17B is a graph indicating return losses and resonant frequencies of the example lamp body of FIG. 17B as a function of a position of the tuning mechanism.

As noted with reference to the resonance graph 1750 of FIG. 17B, the resonant frequency of the one-piece puck 1601 can be adjusted downward. For example, the frequency may shift downward by approximately 15 MHz by turning the tuning mechanism 1703 farther into the body of the one-piece puck 1601 by approximately 25 mm. In other example embodiments, the tuning mechanism can be limited to a total travel distance of 5 mm or less. Also as shown in the resonance graph 1750, a return loss of the RF driving frequency (back into the amplifier) can also be controlled by adjusting the tuning mechanism 1703. Consequently, in an example embodiment, the tuning mechanism 1703 can be a second source for tuning the lamp body when used in conjunction with the first tuning source of removing portions of the one-piece puck 1601 within the pair of notch areas 1617 (see FIGS. 16A and 16B). Additionally, the tuning mechanisms can be used separately or independently from one another.

In addition to considerations of resonant frequency of the one-piece puck 1601, other factors relating to reliability and longevity of the bulb may be assessed as well. For example, depending upon physical mounting and space considerations for a plasma lamp, each orientation of the bulb may have a higher output or longer life, or both. For example, plasma lamps may operate with a bulb temperature in the range of approximately 1000° C. to 1200° C. Due to the elevated operating temperature, thermal buoyancy forces acting on the gas fill and generated plasma within the bulb cause the gases and generated plasma to rise toward an uppermost portion of the bulb.

Ideally, a temperature of the bulb is isothermal throughout its interior surface. Under isothermal conditions, light output from the bulb increases for a given input power. The output of a high pressure discharge lamp is related to the temperature of the coldest point on the interior of the bulb surface, the so-called "cold spot," because that is the site where the dose chemicals, such as metal halides and mercury, condense. Typically, the higher the cold spot temperature, the more light output produced. A function of the input power is to heat the cold spot to a sufficiently high temperature through ohmic self-heating of the plasma such that large quantities of light are generated. A by-product of this process is that there is a corresponding "hot spot," which is the hottest point on the interior of the bulb surface. The hot spot temperature does not significantly affect the light output, but it does play a significant role in bulb failure according to two primary failure mechanisms.

The first failure mechanism is bulb melting, where the hot spot temperature exceeds the melting point of the bulb vessel material. In the case of quartz or other glass materials with a continuous viscosity curve and no definite melting point, this temperature is often referred to as the "working point" or "working temperature." For quartz, the working temperature is approximately 1100° C. The second failure mechanism relates to chemical reactions at the hot spot between the dose chemicals and the quartz materials. These reactions can form voids and other microscopic discontinuities in the quartz vessel that can ultimately lead to melting or cracking of the walls. These reactions are known to proceed more quickly at higher temperatures.

An optimum design elevates the cold spot as hot as possible, while reducing the hot spot to be as cold as possible, or in other words, brings the temperatures of the cold spot and hot spot together to create an isothermal bulb. However, as a gas is heated, the local density of the gas decreases. Consequently, the less-dense gas rises, leading to asymmetric temperature distributions that generally make isothermal operation difficult or impossible. A condition of the less-dense gas rising is known as a thermal buoyancy force acting on the gas. The thermal buoyancy force can be problematic in applications of plasma lamps where the lamp must be inverted to direct light downward, such as in street lighting. To a first approximation, in the inverted position, the greatest density of generated plasma, and hence the greatest amount of generated light, is at the top of the bulb near the reflector and not towards the exposed side of the bulb. Thus, the total output of the lamp can be reduced overall for two reasons: First, the upward-directed light must first reflect from a bulb reflector, with any losses associated with the reflector at a given wavelength. Second, the non-isothermal operation of the lamp requires that the net power supplied to the bulb be somehow limited in order that the hot spot does not exceed the working temperature of quartz. Therefore the cold spot will not be as hot as it could be for the same bulb for the same input power under isothermal conditions. Consequently, a higher light output from the bulb can be achieved as the density of the plasma distribution within the bulb becomes more symmetric with reference to the bulb wall, through the center of the bulb, to the opposite bulb wall. That is, a temperature profile for the plasma is preferred that is uniform at the quartz wall and hot in the center. A symmetric temperature distribution is therefore preferred, where the arc loses heat to the wall equally into all azimuths. One issue with thermal buoyancy is that the symmetry is disturbed, and the floating arc will dump more heat into one side versus the other.

In a typical lamp body design, a plasma arc generated within a bulb has two impingement points at each side of the gap when the bulb is in run mode. The impingement points are located near where conductive elements (for example, the conductive elements 1621 of FIG. 16A), forming a dipole antenna, are in proximity to the bulb. If the plasma arc impingement points are spread out over a larger area of the bulb, a thermal environment of the bulb is improved by reducing the hot spot power density at the arc impingement points. The arc impingement points can be affected by changing puck metallization patterns under the bulb (for example, at the puck groove area where the bulb is seated, see FIG. 16A).

Various geometries of the metalized patterns may be designed to optimize coupling RF power into the bulb such that local inner bulb wall temperatures are maintained at a sufficiently low level to minimize or prevent bulb envelope melting or other adverse chemical wall reactions discussed above. The stabilization of the plasma arc discharge can be improved using specially shaped metalized patterns to form the dipole antenna. The plasma arc ends can, as a result of the metalized patterns, be spread out or the discharge may be separated into several separate parallel discharge columns as discussed in more detail, below.

Figure 18A:
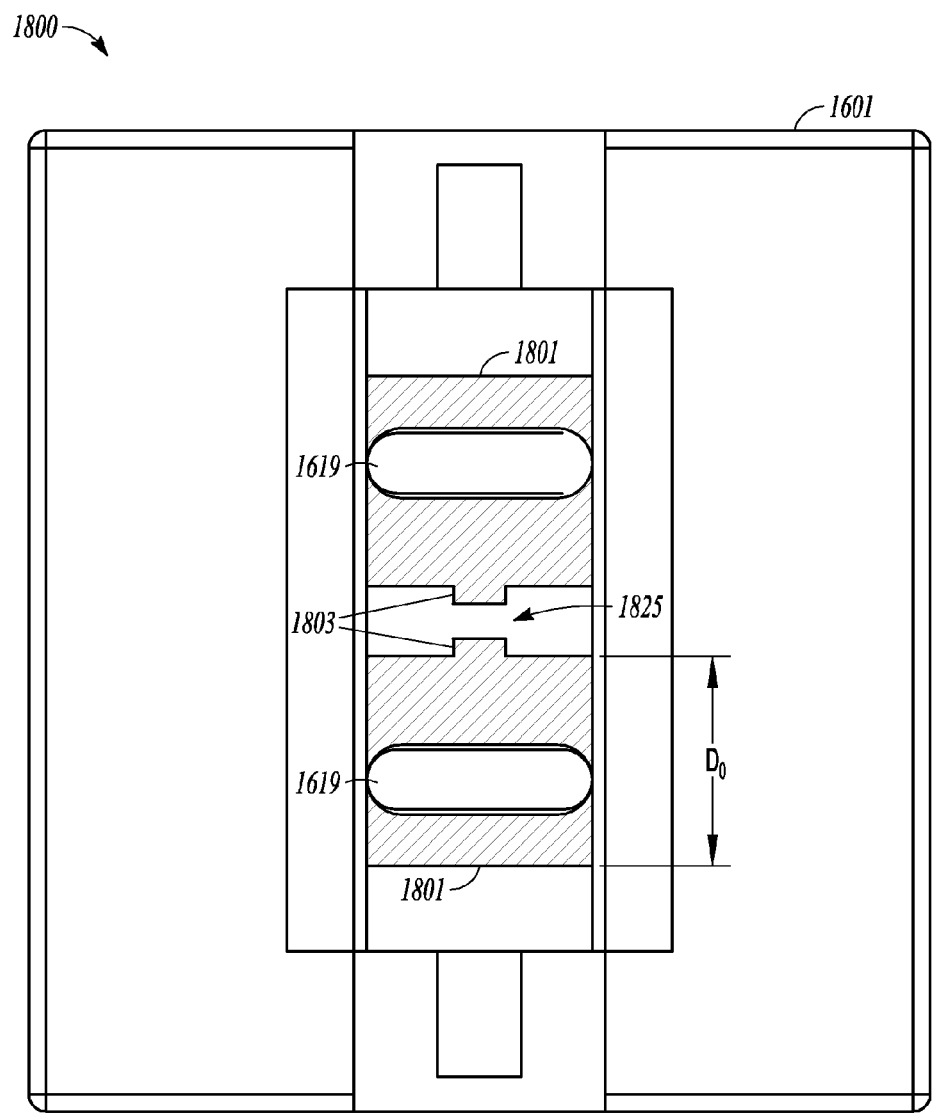
FIG. 18A is a front elevational view of a lamp body showing an example dipole metal pattern.
Figure 18A:
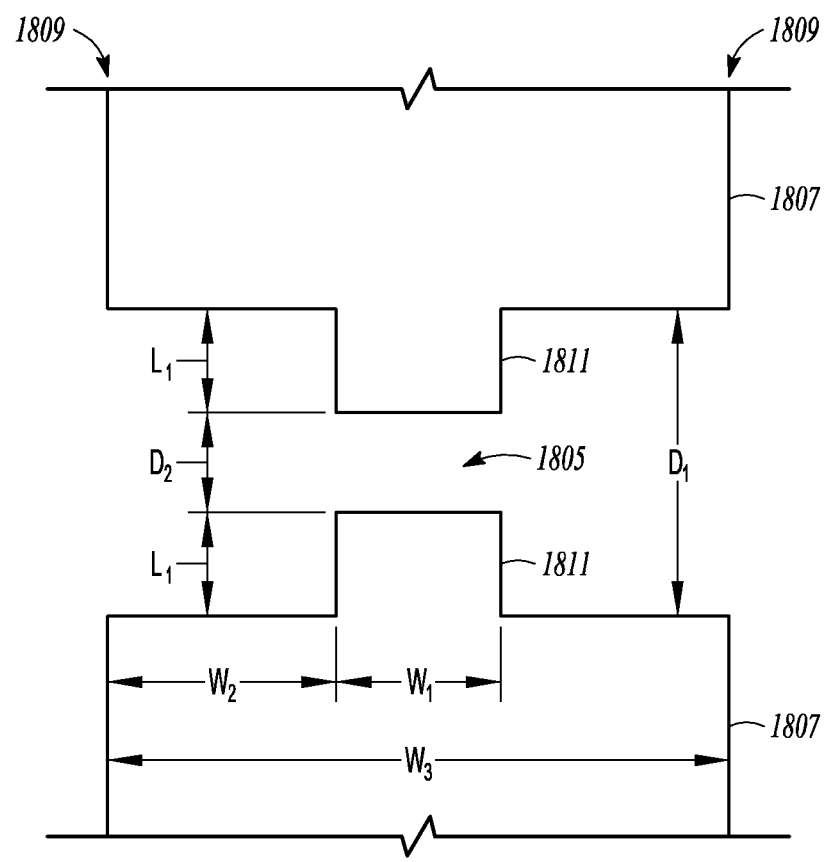

With reference to FIG. 18A, a front elevational view 1800 of a lamp body shows an example dipole metal pattern. Although the example dipole metal pattern is shown on the one-piece puck 1601, the metal pattern described in this and other example embodiments can be employed on a variety of other styles and types of electrodeless plasma lamps as well.

The front elevational view 1800 is shown to include a pair of metalized areas 1801 that form the dipole antenna as described herein. Each of the dipole antennas includes a pair of opposing metal fingers 1803 protruding into a narrow gap 1825 located between the pair of metalized areas 1801. Generalized features of the metal fingers are described in detail, below.

With reference to FIG. 18AA, a feature common to the example embodiments presented below is the presence of opposing metal fingers 1811 (or protrusions) protruding into the gap 1805 between the dipole elements 1807. In various example embodiments described below, there may be more than one pair of opposing metal fingers. The opposing metal fingers 1811 provide a localized enhancement of the dipole electric field to improve the lamp ignition characteristics. Once RF power is applied to the dipole elements 1807, the electric field will be strongest between the opposing fingers 1811, since the gap distance there is shortest. In this particular example, the gap distance $D_1$ on either side of the opposing fingers is 4 mm and the gap distance $D_2$ between the opposing fingers is reduced to 2 mm. The width $W_1$ of each of the opposing fingers is 3 mm and the length $L_1$ of each of the opposing fingers is 1 mm. An overall width $W_3$ of each of the dipole elements 1807 is 12 mm with a width $W_2$ of approximately 4.5 mm on either side of the opposing fingers. In other example embodiments, the gap distance $D_1$ may range from approximately 2 mm to 10 mm. The gap distance $D_1$ is partially dependent upon the gap distance $D_2$; as the gap distance $D_2$ increases, the gap distance $D_1$ also increases. The gap distance $D_1$ is also partially dependent on an interior length of the bulb. In one example embodiment, a ratio of the gap distance $D_1$ to the internal length of the bulb may be approximately 25% to 30%. In other example embodiments, the ratio may be approximately 10% to 40%. The gap distance $D_2$ between the opposing fingers may range from approximately 0.5 mm to 3 mm. The width $W_1$ of each of the opposing fingers may range from approximately 1 mm to 6 mm, and the length $L_1$ of each opposing finger may range from 2 mm to 4 mm. The overall width $W_3$ of each of the dipole elements 1807 is related to an outside diameter of the bulb and may range from approximately 30% to 70% of the outer circumference of the bulb. If the bulb is mounted closer to the dipole elements 1807, the overall width $W_3$ may be closer to 30% of the circumference of the bulb (thus reducing the amount of light blocked by the dipole elements 1807). If the bulb is mounted farther from the dipole elements 1807, the overall width $W_3$ may be closer to 70% of the circumference of the bulb since the dipole elements 1807 have less tendency to wrap around the bulb, and thus block light emitted by the bulb, when the bulb is mounted further away. A range in width $W_2$ on either side of the opposing fingers 1811 will be dependent upon the width $W_1$ of each of the opposing fingers 1811 and the overall width $W_3$ of the dipole elements 1807.

An advantage of the opposing fingers 1811 is that the electric field is enhanced only in the narrow portion within the gap 1805, directly between the opposing fingers 1811, and not throughout the entire gap (that is, the entire width $W_3$ of the gap between the dipole elements 1807). It is problematic for the electric field to be excessively high at the outer edges 1809 of the dipole elements 1807 due to the presence of air adjacent to those edges. The high electric field can induce arcing or dielectric breakdown in those near-air regions that can lead to lamp failures. Therefore, it is prudent to increase the field strength only proximate to and underneath the bulb (or over the bulb, depending upon the relative orientation from the bulb to the puck), where there are no air regions. The relatively stronger electric field resulting from the opposing metal fingers 1811 allows the initial plasma breakdown ionization, also known as ignition, to proceed at substantially reduced input power to the puck.

The opposing fingers 1811 have little effect on a running plasma. The fingers are primarily used to assist ignition of one or more plasma arcs, as discussed in more detail below. As long as the fingers are relatively small in comparison to an overall size of the dipole metal area, they will not significantly impact dipole impingement. The size of the fingers for aiding ignition is not critical, and the sizes given herein aid ignition of the plasma. The electric field enhancement produced by the fingers is inversely proportional to the distance $D_2$ of the narrow gap between the fingers. For example, as a distance of the narrow gap is decreased by a factor of two, the electric field enhancement is approximately doubled. The width $W_1$ of the fingers also has an effect on how much boost is provided to the electric field, but not as much as the distance of the narrow gap.

Referring again to FIG. 18A, except for the pair of opposing fingers 1803, the metalized pattern of the pair of metalized areas 1801 is similar to the conductive elements 1621 of FIG. 16A. For example, RF power is conducted through the pair of oval slots 1619. The pair of oval slots 1619 is either internally coated or filled with an electrically conductive material to conduct the RF power to the pair of metalized areas 1801 that form the dipole antenna. (The pair of oval slots 1619 is similarly arranged in FIGS. 19A through 21A to conduct RF power to the various respective conductive elements shown.) The pair of metalized areas 1801 in this example embodiment, as well as other example embodiments, may be formed by various plating, forming, or coating techniques as discussed above. For example, electroplating or a silver paint or other metallic paint or coating may be fired onto the one-piece puck 1601. Other types of electrically conductive coatings, metallization techniques, or metal components may be used in other example embodiments. When the metalized areas are coatings, the coatings may be applied by brushing, spraying, sputtering, physical vapor deposition (PVD), or a variety of other techniques. In a specific example embodiment, the metalized areas 1801 are silver (Ag) paint, approximately 50 micrometers in thickness. An overall length $D_o$ of the pair of metalized areas 1801 with respect to the overall length of the bulb is relatively unimportant as long as the length $D_o$ is sufficient to surround the pair of oval slots 1619 so that electrical contact may be made between the slots and the metalized areas.

Figure 18B:
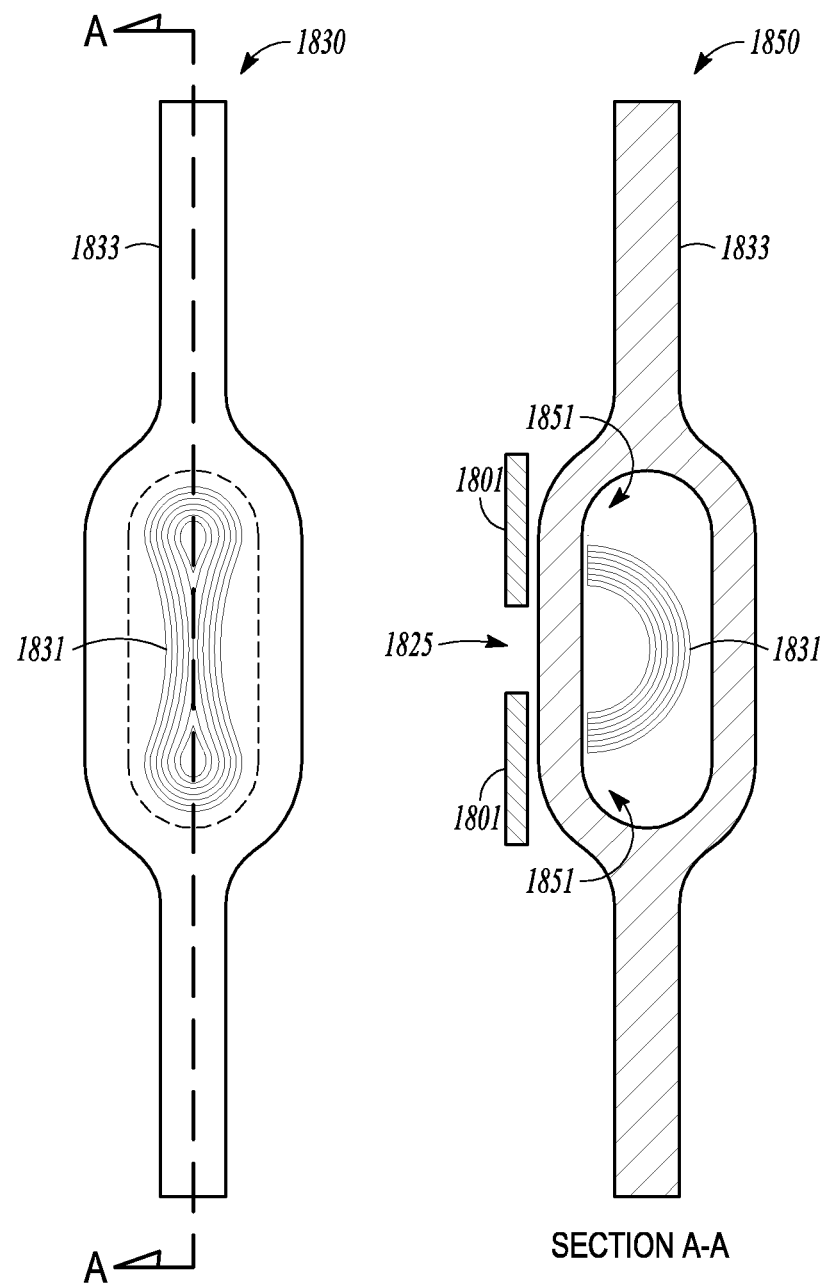
FIG. 18B is an illustration of a plasma arc distribution within a bulb of the plasma lamp placed in proximity to the dipole metal pattern of FIG. 18A.

FIG. 18B is an illustration of a plasma arc distribution 1831 within a bulb 1833 of the plasma lamp where the bulb 1833 is placed in proximity to the dipole metal pattern of FIG. 18A. The bulb 1833 may be similar to the bulb 104 discussed above with reference to other example embodiments. A plan view 1830 of the bulb 1833 shows the plasma arc distribution 1831 on a side of the bulb distal to the metalized pattern (i.e., the pair of metalized areas 1801 is located underneath the bulb 1833). A cross-sectional view 1850 of the bulb 1833 (at section A-A) shows the plasma arc distribution 1831 having two plasma arc impingement points 1851 proximal to the pair of metalized areas 1801.

Figure 19A:
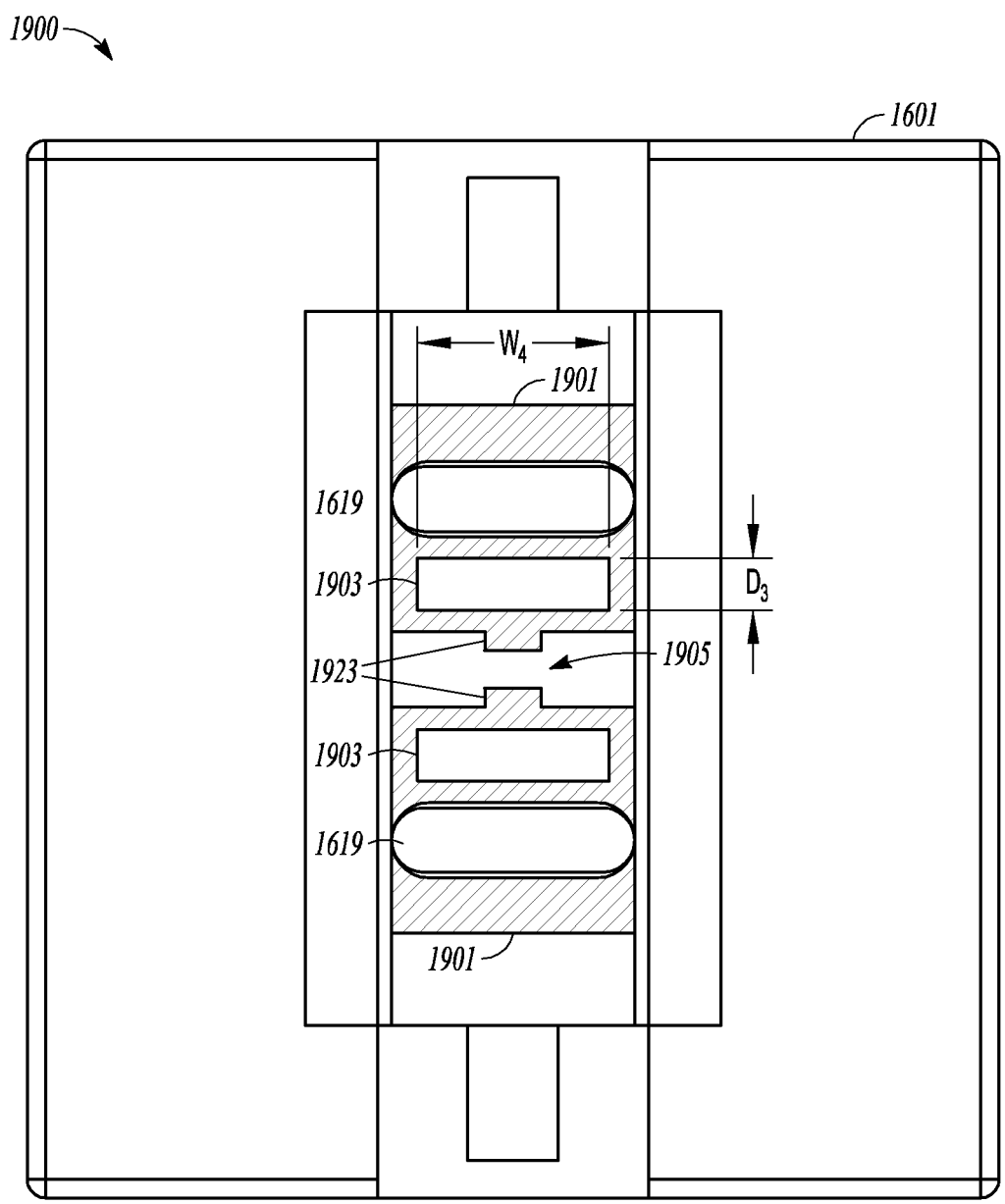
FIG. 19A is a front elevational view of a lamp body showing an example slotted design dipole metal pattern.

FIG. 19A shows a front elevational view 1900 of a lamp body showing an example slotted design dipole metal pattern. The front elevational view 1900 is shown to include a pair of metalized areas 1901 that form the dipole antenna. Each of the metalized areas includes a pair of opposing fingers 1923 protruding into a narrow gap 1905 located between the metalized areas. Each of the pair of metalized areas 1901 is similar to the pair of metalized areas 1801 of FIG. 18A. However, the pair of metalized areas 1901 shown in this example embodiment also includes a pair of slots 1903. The slots 1903 are not metalized (i.e., they are non-conductive areas) and, therefore, do not conduct RF power, and effectively create a "dead-zone" for the generated electric field. The slots 1903 therefore de-localize and spread the plasma impingement points on either side of the slots 1903. Consequently, the plasma impingement points are spread over larger areas of the bulb as shown with reference to FIG. 19B, below. The slots 1903 can be formed by either removing the conductive material within the areas defined by the slots 1903 or, alternatively, the area of the slots can be masked prior to applying the conductive material. For example, a polymeric or lithographic mask having the desired dipole metal pattern may be applied to the one-piece puck 1601. The conductive coating (e.g., silver) may then be brushed or otherwise coated onto substantially only those areas of the puck exposed by the mask. Once the conductive coating dries or is otherwise cured, the mask may then be removed. It is to be noted that the metalized areas can be formed using other techniques or methods. For example, the metalized areas may be metal plates located proximate to the bulb and shaped and dimensioned to modify the plasma arc within the bulb.

Dimensions of the slots 1903, in a specific example embodiment, are described with reference to FIG. 19C, below. In general, the slots 1903 may have a dimensional length $D_3$ that is only limited by the physical distance between the pair of opposing fingers 1923 and the pair of oval slots 1619, based on other dimensions given herein. Generally, a minimum length $D_3$ of the slots 1903 is dependent on a distance from the metalized areas to the bulb and a thickness of the walls of the bulb. As the distance to the bulb and the thickness of the wall increases, the slot length $D_3$ needs to increase to assure an effective "dead-zone" for the generated electric field. In a specific example embodiment, the slot length $D_3$ is approximately 1 mm. Based on these dimensions, additional pairs of slots may be added to the metalized areas to create additional dead-zones provided there is enough space, physically (based at least partially on the size of the puck and the size of the bulb), to place additional slots. Generally, each of the additional slots is approximately 1 mm away from any subsequent slot. The width $W_4$ of the slot may be up to 80% or more of the overall width of the metalized areas 1901 (e.g., see discussion of width $W_3$ with reference to FIG. 18AA) such that at least a portion of electrically conductive material remains on either side of the slot 1903 to conduct current from the oval slots 1619 to the opposing fingers 1923.

Figure 19B:
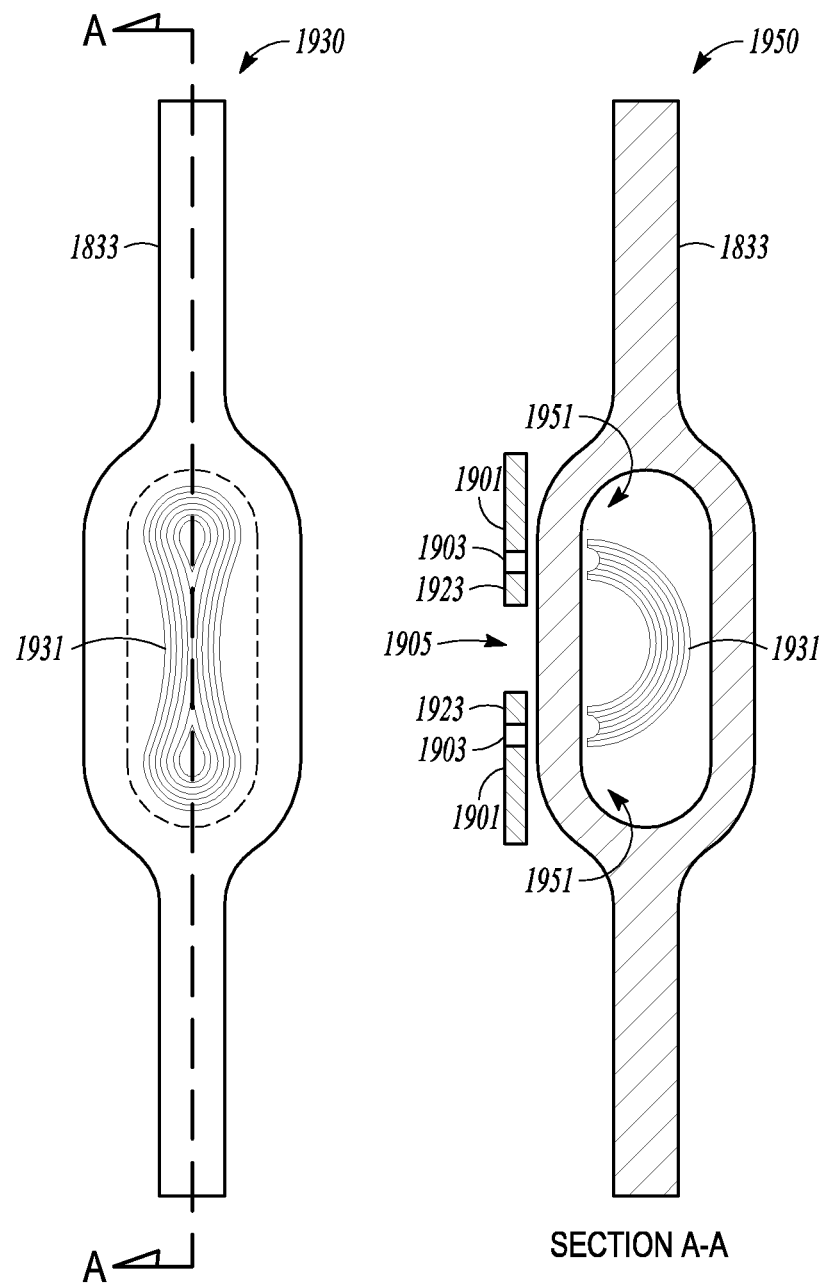
FIG. 19B is an illustration of a plasma arc distribution within a bulb of the plasma lamp placed in proximity to the slotted design dipole metal pattern of FIG. 19A.

FIG. 19B is an illustration of a plasma arc distribution 1931 within the bulb 1833 of the plasma lamp, where the bulb 1833 is placed in proximity to the slotted design dipole metal pattern of FIG. 19A. As noted in a plan view 1930 of the bulb 1833, the plasma arc distribution 1931 is spread over a greater area than comparable areas of the plasma arc distribution 1831 of FIG. 18B. A cross-sectional view 1950 of the bulb 1833 (at section A-A) shows the plasma arc distribution 1931 having multiple plasma arc impingement points 1951 proximal to the pair of metalized areas 1901. A skilled artisan will realize the plasma impingement points either do not occur or are minimized at points above the slots 1903. Each end of the plasma arc impingement point 1951 is split into two separate impingement points, thus increasing the area of where the arc is attaching to the wall of the bulb. As noted in cross-sectional view 1950, the arc tends to not attach to the bulb wall at areas proximal to where the slots 1903 are formed. Since the plasma is attached to the bulb wall in a more distributed manner, the peak power density of heat conducted from the plasma to the quartz is reduced, and there is less chance the plasma can melt through the bulb wall. Thus, the slotted design spreads the plasma arc impingement points 1951 over a larger area on the bulb 1833, as compared with the impingement area 1851 of FIG. 18B. The larger area of impingement reduces localized hot spots in the bulb and thus improves reliability and longevity of the bulb as discussed, above. For example, by spreading the impingement points over a larger area, localized heating of the bulb is more evenly distributed, thereby reducing the probability of the plasma melting the bulb wall.

Figure 19C:
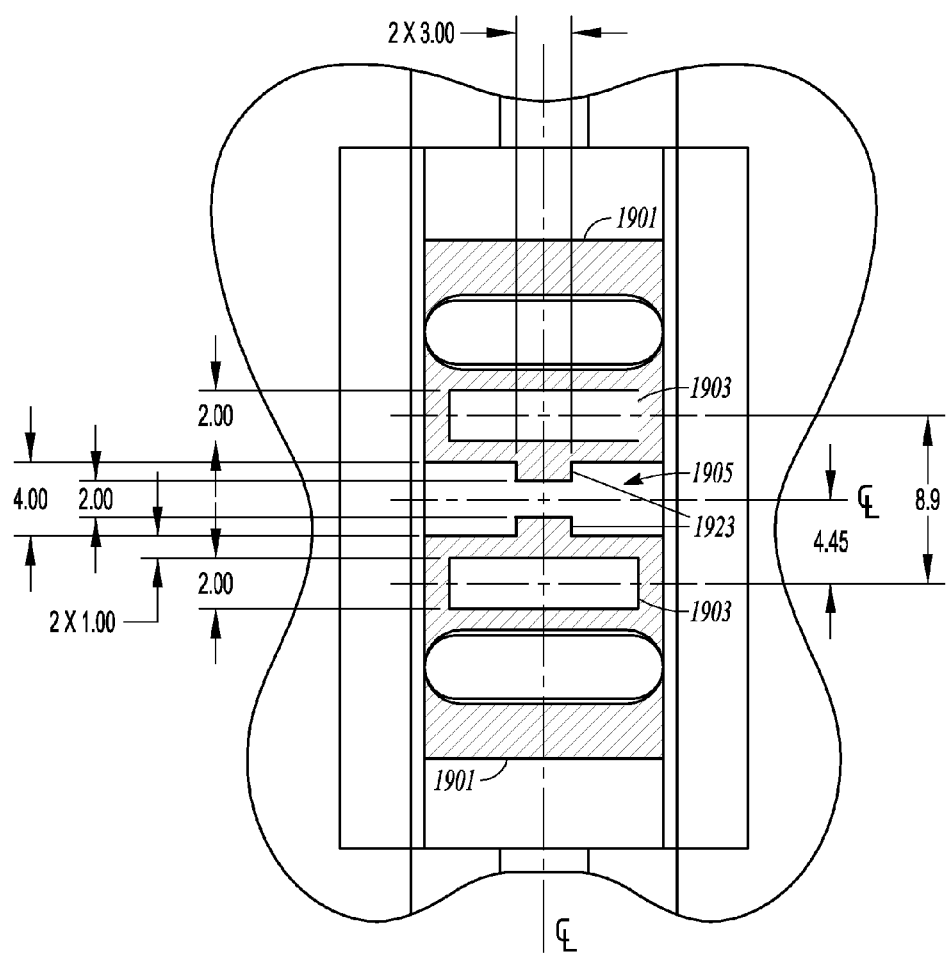
FIG. 19C is a specific example embodiment of dimensions of the slotted design dipole metal pattern of FIG. 19A.
Figure 19C:
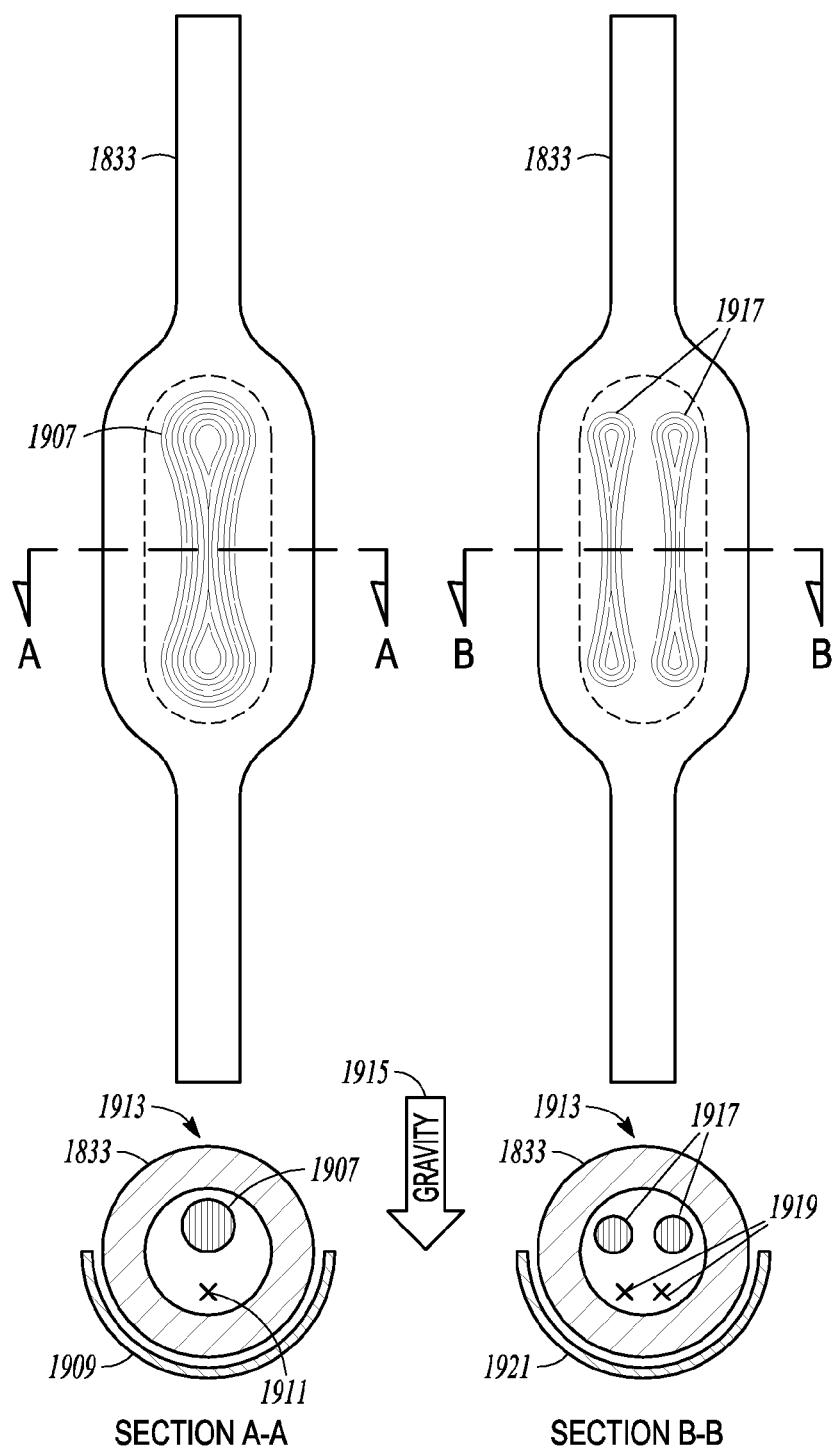

FIG. 19C is a specific example embodiment of dimensions of the slotted design dipole metal pattern of FIG. 19A. Each of the slots 1903 is 2 mm in width and the center-to-center distance between the slots 1903 is 8.9 mm (4.45 mm from the centerline of the metalized area 1901 to the center of each slot). The dimensions shown are given merely as an example and other dimensions, shapes, and geometries may be used. For example, additional pairs of slots may be added on either side of the metal gap 1905 formed between the metalized areas 1901. The number and size of the slots will be at least partially dependent on a size of the bulb to the extent that the physical size of the bulb limits the distance slots can effectively spread the plasma.

With reference again to FIG. 19A, the slotted dipole design is primarily intended for lamps operating in a vertical-down orientation. "Vertical," in this context, is taken to mean specifically that in the target application, the optical axis of the lamp is substantially aligned with the Earth's gravitational field, within +/−45 degrees. In the embodiments presented herein, that orientation is perpendicular to the surface of the puck containing the bulb. "Down" is taken to mean that the light output of the lamp is substantially directed toward the Earth from an elevated position. Typical vertical-down applications include street lights and parking lot lights. Lamps operating vertical-down will support plasmas that float up into the bulb wall nearest the dipole metal and gap region. Such plasmas are inherently stable, since the thermal buoyancy force drives the plasma into the region where the applied electric field is a maximum. These lamps contrast strongly with those operating in a vertical-up orientation. "Up" is taken to mean that the light output of the lamp is substantially directed away from the Earth. Typical vertical-up applications include architectural lighting, where light is directed from the ground substantially upward towards, for example, a building. Lamps operating vertical-up will support plasmas that float up into the bulb wall furthest from the dipole metal and gap region (described in more detail, below). Such plasmas may be inherently unstable, since the thermal buoyancy force drives the plasma into the region where the applied electric field is at a minimum. Plasma instability manifests itself by the arc moving within the bulb, and is evident to observers as flickering light. The instability may be regular, as in a periodic oscillation of the arc, which may produce dancing shadows at the edges of the lamp's light distribution. Alternatively, the instability may be chaotic, with random flickering. The underlying mechanism for lamp flicker is that the arc, having floated substantially away from the region of maximum electric field intensity, is displaced by another, smaller arc that forms in the maximum electric field intensity region. While the first arc cools and extinguishes, the second arc heats up, and rises to the top of the bulb because of thermal buoyancy. This process repeats as long as power is applied, whereby each plasma arc exists only temporarily until it is displaced by a newly formed arc. In the case of vertical-down operation, where the arc is inherently stable, the various example embodiments of the dipole are patterned to spread out the arc impingement point to achieve higher reliability by reducing the hot-spot temperature. In the case of vertical-up operation, the metal dipole patterns may include additional features, such as the slots described above, to stabilize the arc by limiting the location of the attachment point or points. In particular, the embodiments described herein make use of features that define multiple arc attachment locations such that the plasma is substantially split into two arcs. The reason for the stability of the dual-arc configuration is discussed, below.

With reference to FIG. 19CC, cross-section A-A shows the single arc 1907 for a vertical-up oriented lamp. The single arc 1907 has floated into the top 1913 of the bulb, away from the maximum electric field 1911 nearest the dipole metal 1909, because of the thermal buoyancy force, which is operating opposite to the force of gravity 1915. This arc is inherently unstable due to the reasons given above.

With continued reference to FIG. 19CC, cross-section B-B shows a stable, dual arc 1917 configuration. It is important to note that the dual arc necessarily arises from having two distinct local maxima 1919 in the electric field, near the dipole metal 1921. The dual maxima electric fields, and resulting dual arcs, might arise from a patterned dipole element described below with reference to FIG. 21A. The dual arc derives its stability from each arc mutually displacing the other. In other words, each arc is constrained in its ability to rise all the way to the top 1913 of the bulb because each arc is laterally repelled by the other. Therefore each of the dual arcs is closer to its respective maximum electric field, compared to the single arc. By careful adjustment of the dipole metal pattern that produces this dual arc, the arc's buoyant rise up into the bulb can be controlled. The arc's rise can be limited such that it is sufficiently close to its local maximum electric field that a new arc does not form, or at least does not immediately form, to displace it, giving it the required stability for vertical-up operation. Adjustment of the dipole metal pattern to control the arc's rise is given with reference to FIG. 21A, below. Additionally, it will be apparent to a skilled artisan that the dual arc results in a substantially more isothermal bulb than the single arc, as discussed in more detail below.

Comparing the cross-section A-A to B-B in FIG. 19CC, in the single arc cross-section A-A, the hot spot is at the top 1913 of the bulb, adjacent to the point where the arc grazes the quartz. In the dual-arc cross-section, each of the two arcs conducts nominally half of the same thermal power to the quartz. Additionally, the two arcs do so over a larger area because there are now two contact points between the arc and the quartz. Therefore, the heat conducted to the quartz is spread over substantially more area in the dual arc configuration than with the single arc, and the bulb wall temperature will be more isothermal.

Figure 20A:
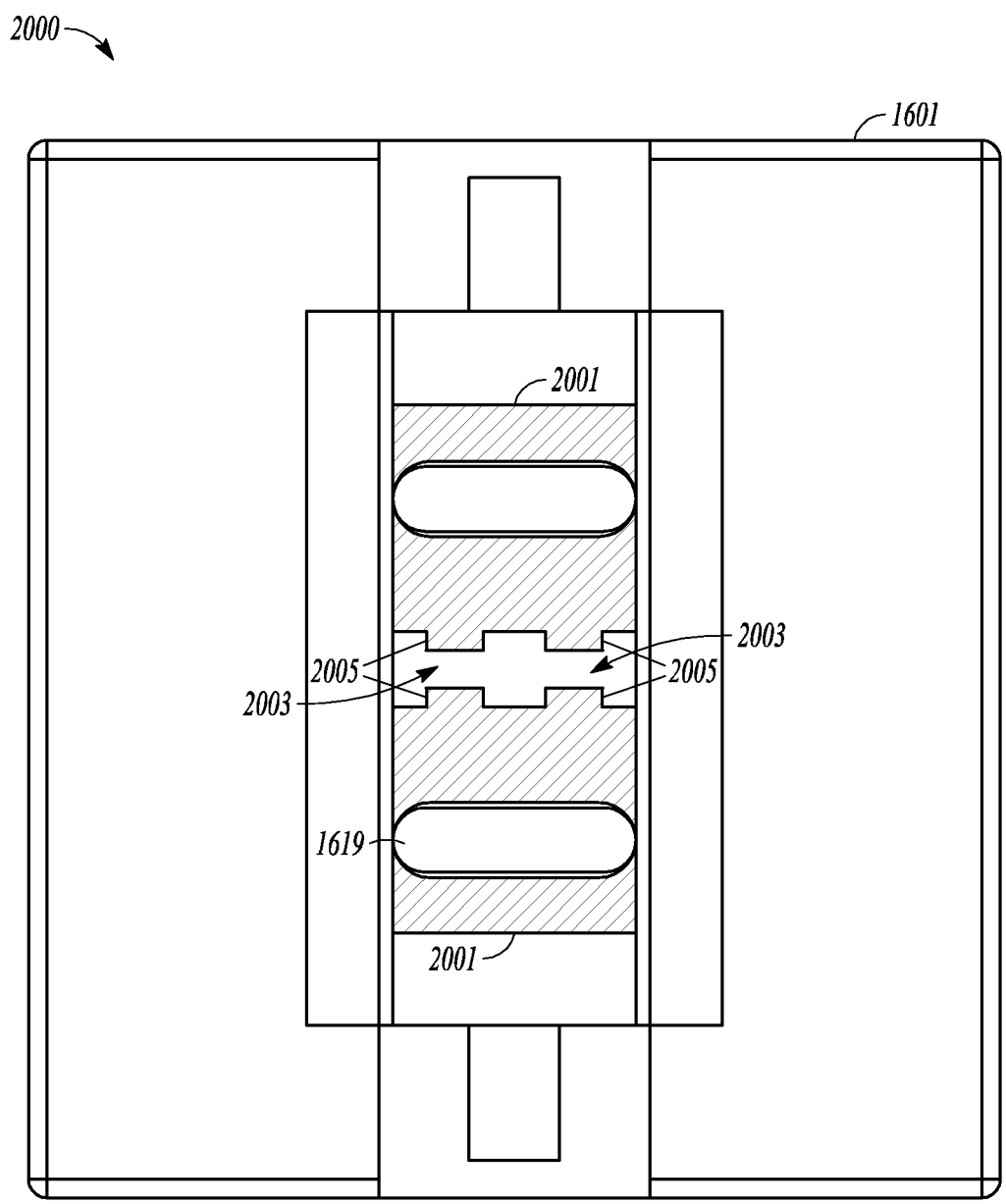
FIG. 20A is a front elevational view of a lamp body showing an example dual gap dipole metal pattern.

FIG. 20A is a front elevational view 2000 of a lamp body showing an example dual gap dipole metal pattern. The front elevational view 2000 is shown to include two pairs of metalized opposing fingers 2005 that each extend, parallel to one another, from a pair of metalized areas 2001. A portion of each of the metalized areas forms a dipole antenna. Each of the two pairs of metalized opposing fingers 2005 shown in this example embodiment includes a pair of narrow gaps 2003 located between each of the metalized areas. Once RF power is applied to the pair of metalized areas 2001, the pair of gaps 2003 may generate a double plasma arc for certain lamp orientations, as described above. The double plasma arc increases the area of arc impingement and further provides for increased stability in vertical-up orientations of the lamp, as also described above.

Figure 20B:
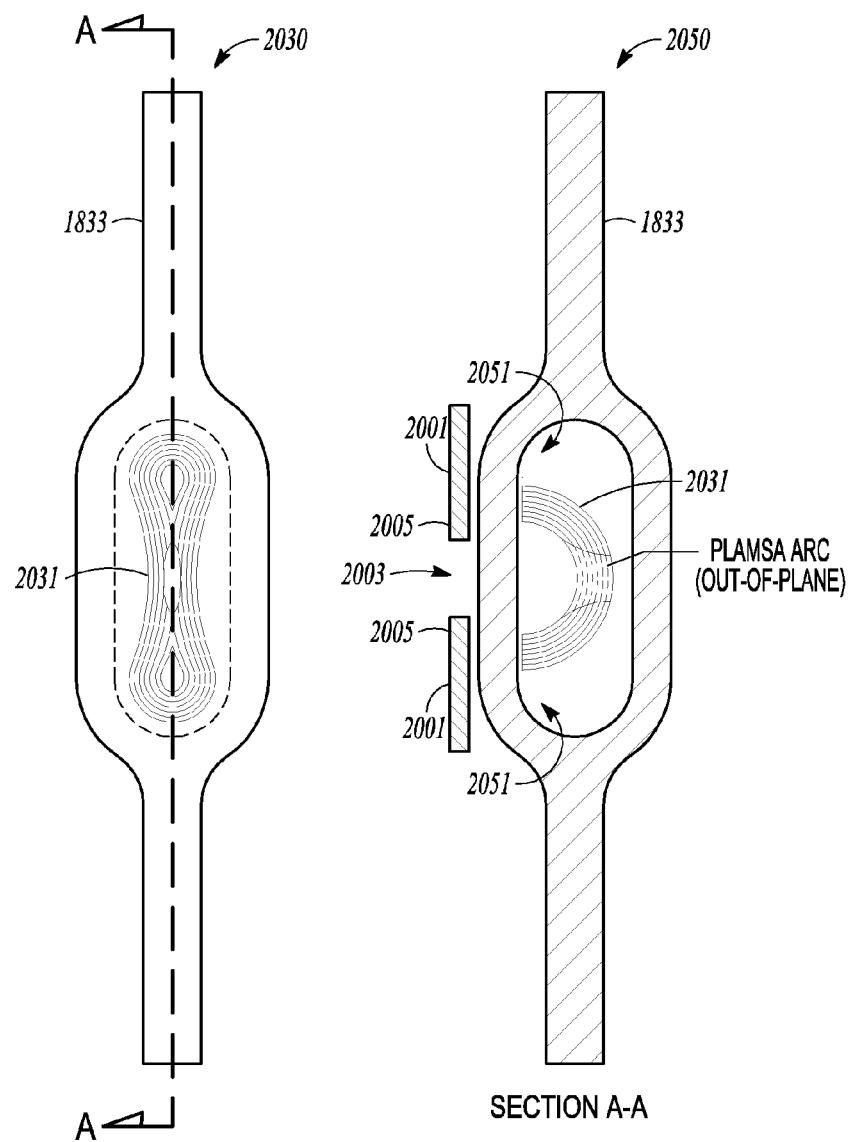
FIG. 20B is an illustration of a plasma arc distribution within a bulb of the plasma lamp placed in proximity to the dual gap dipole metal pattern of FIG. 20A.

FIG. 20B is an illustration of a plasma arc distribution within the bulb 1833 of the plasma lamp, where the bulb 1833 is placed in proximity to the dual gap dipole metal pattern of FIG. 20A. A plan view 2030 of the bulb 1833 shows the plasma arc distribution 2031 is spread over a greater area than comparable areas of the plasma arc distribution 1831 of FIG. 18B. A cross-sectional view 2050 of the bulb 1833 (at section A-A) shows the plasma arc distribution 2031 having plasma arc impingement points 2051 proximal to the pair of metalized areas 2001. The dual gap pattern gives rise to a dual arc according to the mechanism described above. The plane of cross-sectional view 2050 is between the two arms of the dual arc that is formed. So the arc as drawn in section 2050 is explicitly divided into its in-plane portion, which actually intersects the section plane, and its out-of-plane portion, which is the separate arm of the dual arc located behind the section plane.

Figure 21A:
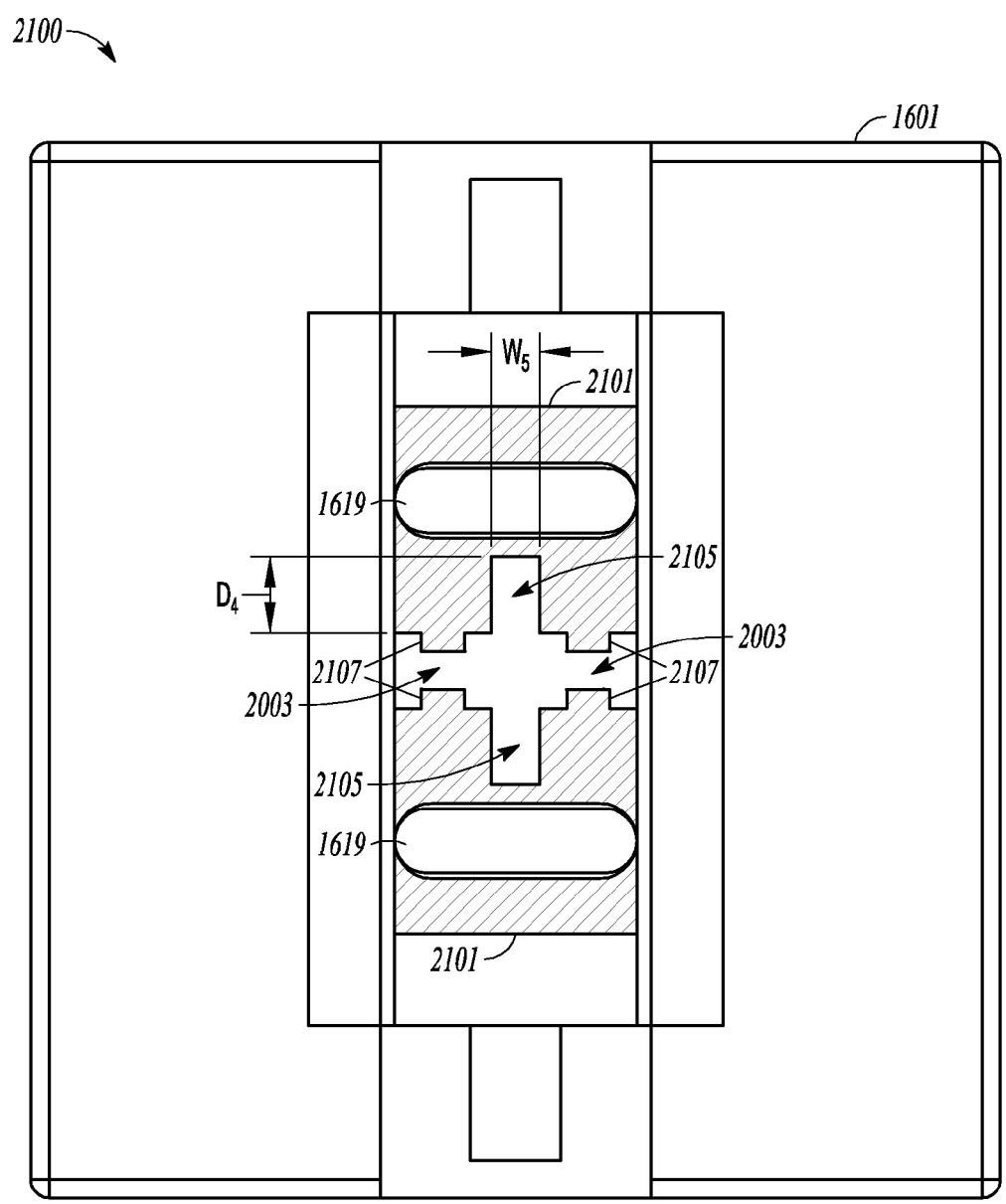
FIG. 21A is a front elevational view of a lamp body showing an example of another dual gap dipole metal pattern.

FIG. 21A shows a front elevational view 2100 of a lamp body showing an example of another dual gap dipole metal pattern. The front elevational view 2000 is shown to include a pair of metalized areas 2101 that form the dipole antenna. The front elevational view 2100 is shown to include two pairs of metalized opposing fingers 2107 that each extend, parallel to one another, from the pair of metalized areas 2101. The two pairs of metalized finger areas 2107 shown in this example embodiment include a pair of narrow gaps 2103 located between each of the metalized areas 2101. Each of the pair of metalized areas 2101 is similar to the pair of metalized areas 2001 of FIG. 20A. However, the pair of metalized areas 2101 shown in this example embodiment includes a central longitudinal slot 2105 oriented parallel to the long axis of the bulb. The central longitudinal slot 2105 may have a length $D_4$ that extends nearly to the oval slots 1619, leaving enough room between the ends of the longitudinal slot 2105 and oval slots 1619 to conduct current (based on the thickness of the metalized areas and the conductivity so as to carry a required current density). The width $W_5$ of the longitudinal slot 2105 will depend on various factors discussed herein, including a distance from the metalized areas 2101 to the bulb and the bulb wall thickness, to generate the dual arc discussed with reference to section B-B of FIG. 19CC. If the width $W_5$ is too small, the pairs of metalized fingers 2107 are too close together and only a single arc is generated. If the width $W_5$ is too large, the dual arcs may hit the internal curvature of the bulb wall too quickly and may not rise high enough in the tube to produce stable arcs. In a specific example embodiment, the width $W_5$ may be from 1 mm to 4 mm, depending on the overall width of the metalized areas 2101. In other example embodiments, three or more pairs of metalized fingers may be used depending upon an internal dimension of the bulb. With a larger bulb, more arcs can be supported without the arc merging into a single arc. Once RF power is applied to the pair of metalized areas 2101, the pair of gaps 2103 and the central longitudinal slot 2105 generate another type of double plasma arc, discussed below.

Figure 21B:
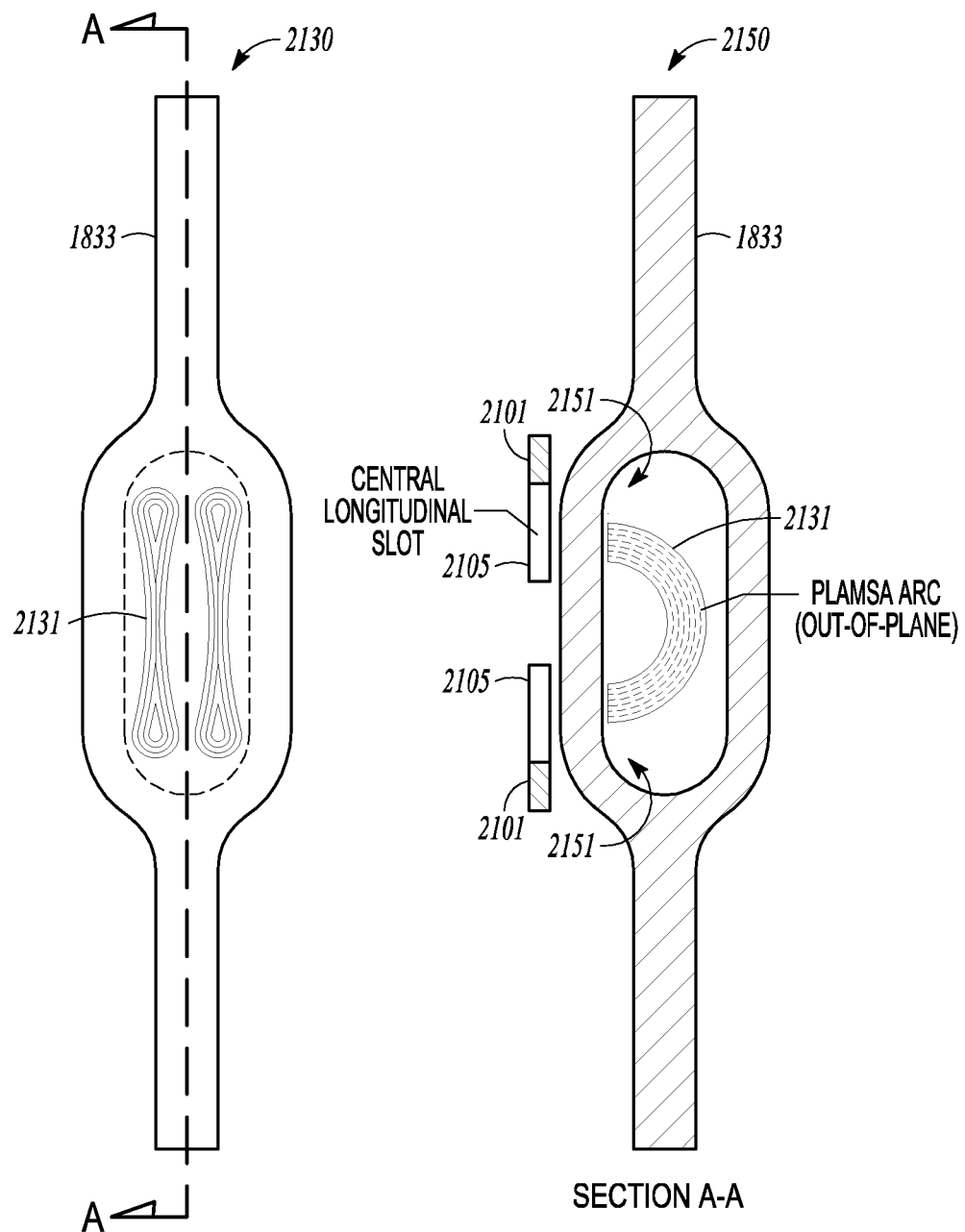
FIG. 21B is an illustration of a dual plasma arc distribution within a bulb of the plasma lamp placed in proximity to the dual gap dipole metal pattern of FIG. 21A.

FIG. 21B is an illustration of a dual plasma arc 2131 distribution within the bulb 1833 of the plasma lamp placed in proximity to the dual gap dipole metal pattern of FIG. 21A. As shown by the plan view 2130 of FIG. 21B, the central longitudinal slot 2105 splits the discharge into two parallel arcs. The parallel arcs are caused by the central longitudinal slot 2105, as indicated in the cross-sectional view 2150 of the bulb 1833 (at section A-A). The substantial difference between the dual arc configuration of FIG. 21B versus FIG. 20B is that here, in FIG. 21B, the arcs are fully separated from one another versus the in-plane and out-of-plane configuration of the arcs in FIG. 20B. The fully separated dual arc configuration shown in FIG. 21B provides improved arc stability for vertical-up lamp operations.

The above circuits, dimensions, shapes, materials and operating parameters are examples only and other embodiments may use different circuits, dimensions, shapes, materials and operating parameters.

What is claimed is:

1. An electrodeless plasma lamp comprising:
   a lamp body;
   a power source configured to provide radio-frequency (RF) power via a feed to the lamp body;
   an elongate bulb proximate the lamp body, the bulb containing a fill;
   a first conductive element including a first side with a first protrusion, the first side having a first width greater than the first protrusion's width; and
   a second conductive element including a second side with a second protrusion, the second side having a second width greater than the second protrusion's width, the first side and second side facing each other and being spaced apart by a first distance and being configured to couple the RF power via an electric field to the fill to form at least one plasma arc, the first protrusion and the second protrusion extending towards each other and being spaced apart by a second distance that is less than the first distance, the first and second protrusions to provide localized enhancement of the electric field at the first side and the second side, wherein the first side and the second side extend transverse to a longitudinal axis of the bulb.

2. The electrodeless plasma lamp of claim 1, wherein the bulb has first and second opposed ends and wherein the first conductive element is located proximate the first end of the bulb and the second conductive element is located proximate the second end of the bulb.

3. The electrodeless plasma lamp of claim 2, wherein the first and second protrusions create at least two impingement points at each end of the plasma arc and a wall of the bulb.

4. The electrodeless plasma lamp of claim 3, wherein the at least two impingement points are aligned with the longitudinal axis of the bulb, each of the first and the second conductive elements defining a non-conductive area of at least reduced electric field intensity surrounded by a conductive area, wherein the non-conductive area separates the at least two impingement points.

5. The electrodeless plasma lamp of claim 4, comprising a first and second electrically conductive slots, each slot corresponding to an associated conductive element and extending between the conductive element and a feed or grounding point.

6. The electrodeless plasma lamp of claim 4, wherein an end portion of the slot defines an associated non-conductive area.

7. The electrodeless plasma lamp of claim 2, wherein the first and the second protrusions concentrate the electric field proximate the longitudinal axis of the bulb.

8. The electrodeless plasma lamp of claim 1, wherein the first and the second protrusions that provide localized enhancement of the electric field are configured to facilitate ignition of the plasma.

9. The electrodeless plasma lamp claim 2, further comprising a dielectric body to support the bulb, wherein each of the first and the second conductive elements is provided on a surface of the dielectric body.

10. The electrodeless plasma lamp of claim 1, wherein the lamp body comprises a solid dielectric material with a dielectric constant greater than 2.

11. The electrodeless plasma lamp of claim 1, wherein the lamp body has opposed parallel side faces.

12. The electrodeless plasma lamp of claim 1, wherein the RF power is provided at a resonant frequency for the lamp body.

13. The electrodeless plasma lamp of claim 1, wherein the lamp body is a solid dielectric material, the lamp body comprising:
    an elongate channel extending along a lower face of the lamp body; and
    an insert component shaped and dimensioned to be received within the channel, the bulb being proximate an upper face of the lamp body.

14. The electrodeless plasma lamp of claim 13, wherein the lower face and the upper face are spaced and opposed parallel faces of the lamp body.

15. The electrodeless plasma lamp of claim 13, wherein the upper face includes an elongate opening to at least partially to receive the bulb.

16. The electrodeless plasma lamp of claim 13, wherein the channel is a right-angled channel extending between opposed sides of the lamp body.

17. The electrodeless plasma lamp of 13, wherein the insert component includes a bore extending longitudinally into the insert component to receive the feed, power from the power source being coupled via the insert component into the lamp body.

18. The electrodeless plasma lamp of claim 13, wherein the lamp body comprises:
    an elongate opening in the upper face to at least partially to receive the bulb;
    first and second electrically conductive slots extending between the elongate opening and an inner surface of the channel that is distal from the lower face, the electrically conductive slots at least partially defining the first and the second conductive elements to concentrate the electric field proximate the bulb.

19. The electrodeless plasma lamp of claim 18, comprising first and second electrically conductive strips extending at least partially along the inner surface of the channel that is distal from lower face, each electrically conductive strip coupled to an associated electrically conductive slot.

20. The electrodeless plasma lamp of claim 1, wherein at least a portion of the conductive elements are shaped to seat an associated end portion of the bulb.

21. The electrodeless plasma lamp of claim 1, further comprising a bulb insert shaped and dimensioned to be received in an elongate opening in an upper face of the lamp body, the bulb insert including a bulb recess to at least partially receive the bulb.

22. The electrodeless plasma lamp of claim 1, wherein the lamp body comprises a solid dielectric material having a volume greater than the volume of the bulb and less than the volume that would be required for resonance of the solid dielectric material at the frequency of the RF power in the absence of the first and second conductive elements.

23. The electrodeless plasma lamp of claim 1, wherein the volume of the lamp body is at least three times greater than the volume of the bulb.

24. The electrodeless plasma lamp of claim 1, wherein the frequency of the RF power is greater than 50 MHz.

25. The electrodeless plasma lamp of claim 1, wherein the RF feed is a probe.

26. The electrodeless plasma lamp of claim 1, wherein portions of the first and second conductive elements extends toward opposed ends of the bulb.

27. The electrodeless plasma lamp of claim 1, further comprising:

a first tuning mechanism within the lamp body to tune a resonant frequency of the electrodeless plasma lamp; and a second tuning mechanism within an insert component received within an elongate channel extending along a lower face of the lamp body, the tuning mechanism to tune the resonant frequency of the electrodeless plasma lamp.

28. The electrodeless plasma lamp of claim 27, wherein the first tuning mechanism is configured to control the resonant frequency by etching an area proximate to an end portion of at least one electrically conductive element.

29. The electrodeless plasma lamp of claim 27, wherein the second tuning mechanism is configured to adjust the resonant frequency by positioning a non-ferrous rod within the insert component.

30. The electrodeless plasma lamp of claim 1, wherein the first and second conductive elements are each formed by a conductive coating applied to the lamp body.

31. The electrodeless plasma lamp of claim 1, wherein the lamp body is a rectangular prism.

32. The electrodeless plasma lamp of claim 1, wherein the first conductive element and the second conductive element are located along a lower exterior side of the bulb.

33. The electrodeless plasma lamp of claim 1, wherein the first conductive element and the second conductive element concentrate the electric field in the lamp body proximate the bulb, and the first and second protrusions provide localized enhancement of the concentrated electric field.

34. The electrodeless plasma lamp of claim 1, wherein the first and second protrusions create at least two impingement points at each end of the plasma arc and a wall of the bulb.

35. The electrodeless plasma lamp of claim 1, wherein at least portions of the first conductive element and the second conductive element are located within the lamp body.

36. The electrodeless plasma lamp of claim 1, wherein the first conductive element and the second conductive element each include an additional protrusion, and wherein a non-conductive slot is provided between the first protrusion and the additional protrusion associated with the first conductive element, and a non-conductive slot is also provided between the second protrusion and the additional protrusion associated with the second conductive element.

37. The electrodeless plasma lamp of claim 1, wherein the first distance is between 2 mm and 10 mm.

38. The electrodeless plasma lamp of claim 1, wherein a ratio of the first distance and the internal length of the bulb is 10% to 40%.

39. The electrodeless plasma lamp of claim 1, wherein the second distance is between 0.5 mm and 3 mm.

40. A method comprising, coupling power from a power source to a lamp body, the power source configured to provide radio-frequency (RF) power via a feed to the lamp body; and coupling the power from the lamp body to an elongate bulb proximate the lamp body, the bulb containing a fill, wherein coupling power from the lamp body comprises:

coupling the power using a first conductive element including a first side with a first protrusion, the first side having a first width greater than the first protrusion's width; and coupling the power using a second conductive element including a second side with a second protrusion, the second side having a second width greater than the second protrusion's width, the first side and second side facing each other and being spaced apart by a first distance and being configured to couple the RF power via an electric field to the fill to form at least one plasma arc, the first protrusion and the second protrusion extending towards each other and being spaced apart by a second distance that is less than the first distance, the first and second protrusions to provide localized enhancement of the electric field at the first side and the second side, wherein the first side and the second side extend transverse to a longitudinal axis of the bulb.

* * * * *